(12) United States Patent
Rinaldi et al.

(10) Patent No.: US 11,927,538 B2
(45) Date of Patent: Mar. 12, 2024

(54) ZERO-POWER WIRELESS SYSTEM FOR CROP WATER CONTENT MONITORING

(71) Applicant: Northeastern University, Boston, MA (US)

(72) Inventors: Matteo Rinaldi, Boston, MA (US); Zhenyun Qian, Boston, MA (US); Vageeswar Rajaram, Boston, MA (US)

(73) Assignee: Northeastern University, Boston, MA (US)

( * ) Notice: Subject to any disclaimer, the term of this patent is extended or adjusted under 35 U.S.C. 154(b) by 412 days.

(21) Appl. No.: 17/422,857

(22) PCT Filed: Jan. 21, 2020

(86) PCT No.: PCT/US2020/014427
§ 371 (c)(1),
(2) Date: Jul. 14, 2021

(87) PCT Pub. No.: WO2020/150732
PCT Pub. Date: Jul. 23, 2020

(65) Prior Publication Data
US 2022/0061238 A1 Mar. 3, 2022

Related U.S. Application Data

(60) Provisional application No. 62/794,612, filed on Jan. 19, 2019.

(51) Int. Cl.
*G01N 21/84* (2006.01)
*G01N 21/35* (2014.01)
(Continued)

(52) U.S. Cl.
CPC ......... *G01N 21/84* (2013.01); *G01N 21/3554* (2013.01); *H01H 37/72* (2013.01);
(Continued)

(58) Field of Classification Search
CPC ............... G01N 21/3554; G01N 21/84; G01N 2021/8466; H01H 37/46; H01H 37/52; H01H 37/72
See application file for complete search history.

(56) References Cited

U.S. PATENT DOCUMENTS 7,119,337 B1 * 10/2006 Johnson ................ G01J 5/0806
250/339.13
8,211,586 B2 7/2012 Nakabuko
(Continued)

FOREIGN PATENT DOCUMENTS

CN 105973952 A 9/2016
WO WO-2017082985 A2 * 5/2017 ........... B81B 3/0029

OTHER PUBLICATIONS

Berni, J.A. et al., "Thermal and Narrowband Multispectral Remote Sensing for Vegetation Monitoring From an Unmanned Aerial Vehicle", IEEE Transactions on Geoscience and Remote Sensing, vol. 47, No. 3, Mar. 2009, pp. 722-738.
(Continued)

*Primary Examiner* — Mark R Gaworecki
(74) *Attorney, Agent, or Firm* — Verrill Dana, LLP

(57) ABSTRACT

Zero power wireless sensors, devices, and systems are used for crop water content monitoring. The sensors consume no power while monitoring for the presence of dry crop conditions. Infrared reflectance from plants is measured and when selected spectral conditions are met, a circuit is closed, activating an alarm, an RFID tag, or a radio transmitter. The deployed sensors consume no power while monitoring, reducing or eliminating the need to change batteries.

22 Claims, 34 Drawing Sheets

(51) Int. Cl.
  *G01N 21/3554* (2014.01)
  *H01H 37/72* (2006.01)
  *H01H 37/46* (2006.01)
  *H01H 37/52* (2006.01)

(52) U.S. Cl.
  CPC ..... *G01N 2021/8466* (2013.01); *H01H 37/46* (2013.01); *H01H 37/52* (2013.01)

(56) References Cited

U.S. PATENT DOCUMENTS

| | | | |
|---|---|---|---|
| 10,643,810 | B2 | 5/2020 | Rinaldi et al. |
| 2016/0099701 | A1 | 4/2016 | Rinaldi et al. |
| 2016/0253595 | A1 | 9/2016 | Mathur et al. |
| 2019/0006136 | A1 | 1/2019 | Rinaldi et al. |

OTHER PUBLICATIONS

Lin, C. et al., "A novel reflectance-based model for evaluating chlorophyll concentrations of fresh and water-stressed eaves", Biogeosciences, 12, 2015, pp. 49-66.

Rinaldi, M., "Sensing Infrared without Power", DARPA ERI Summit 2018, Poster; <https://eri-summit.darpa.mil/docs/ERIPoster_Applications_N-ZERO_Northeastern.pdf>, p. 1.

Rajaram, V., "A False Alarm-Free Zero-Power Micromechanical Photoswitch", IEEE Sensors, New Delhi, Oct. 28, 2018, pp. 1-4.

Rajaram, V., "Zero-Power Electrically Tunable Micromechanical Photoswitches", IEEE Sensors Journal, vol. 18, No. 19, Oct. 1, 2018, pp. 7833-7841.

Kang, S., et al., "Ultra Narrowband Infrared Absorbers for Omni-Directional and Polarization Insensitive Multi-Spectral Sensing Microsystems", IEEE 19th International Conference on Solid-State Sensors, Actuators and Microsystems (TRANSDUCERS), Kaohsiung, Taiwan, Jun. 18-22, 2017, pp. 886-889.

Rajaram, V., "MEMS-Based Near-Zero Power Infrared Wireless Sensor Node", 2018 IEEE Micro Electro Mechanical Systems, Belfast, Northern Ireland, UK, Jan. 21-25, 2018, pp. 17-20.

Baller, M.K. et al., "A cantilever array-based artificial nose", Ultramicroscopy, 82, (2000), pp. 1-9.

Grant, O.M. et al., Thermal Imaging to detect spatial and temporal variation in the water status of grapevine (*Vitis vinifera* L.), The Journal of Horticultural Science and Biotechnology, 91.1 (2016): 43-54.

Libelium Smart Agriculture Sensor, Smart Vineyard Lebanon Case Study, www.libelium.com/the-first-smart-vineyard-in-lebanon-chooses-libeliums-technology-to-face-the-climate-change/, Nov. 29, 2017, 13 pgs.

Hassan, M.N. et al., "Green leaf volatiles: biosynthesis, biological functions and their applications in biotechnology", Plant Biotechnology Journal, 13.6, (2015), pp. 727-739.

Fall, R. et al., "Volatile organic compounds emitted after leaf wounding: On-line analysis by proton-transfer-reaction mass spectrometry", Journal of Geophysical Research: Atmospheres, 104. D13, (1999), pp. 15963-15974.

Qian, Z. et al. "Zero-power infrared digitizers based on plasmonically enhanced micromechanical photoswitches" Nature Nanotechnology 12, (2017), pp. 969-973 (Abstract only).

Then, D.A. et al., "A highly sensitive self-oscillating cantilever array for the quantitative and qualitative analysis of organic vapor mixtures." Sensors and Actuators B: Chemical, 117.1 (2006), pp. 1-9 (Abstract only).

Harren, F.J.M. et al., "Online, real-time detection of volatile emissions from plant tissue", AoB Plants, Jan. 1, 2013, vol. 5, doi: 10.1093/aobpla/plt003, 18 pgs.

\* cited by examiner

Normally-closed switches

- Ultra-thin sacrificial layer
- Intentionaly engineered stress in contact tip
- Stay normally closed after release due to bending caused by residual stress

ZERO-POWER WIRELESS SYSTEM FOR CROP WATER CONTENT MONITORING

CROSS-REFERENCE TO RELATED APPLICATIONS

This application claims priority to U.S. Provisional Application No. 62/794,612, filed 19 Jan. 2019, the entirety of which is incorporated herein by reference.

STATEMENT REGARDING FEDERALLY SPONSORED RESEARCH OR DEVELOPMENT

This invention was made with government support under Grant Number DE-AR0001052 awarded by the Department of Energy. The government has certain rights in the invention.

BACKGROUND

The 21st century requires a long-awaited revolution in agriculture that will sustainably double the crop productivity in response to the rapidly increasing competition for arable land and exposure to climatic shocks. Genetic studies suggest that the current production yield of crops has significant upside potential. However, the average yield achieved in commercial farms is only about 12% of the theoretical maximum yield, and less than half of that demonstrated in trial fields. Yield is highly dependent on genotype, environment, and growth management, which are almost equally important. Although significant effort has been devoted to the breeding of genetically superior crops, the research outcomes can hardly be fully transformed into a boost in productivity due to the management practice: farmers typically need to make over 40 yield-impacting decisions each season, some of which can result in a swing in yield as high as 10%. The lack of comprehensive and real-time data of plant health and environmental conditions fundamentally prevents making optimal decisions. Consequently, there is a clear need to develop innovative technology suites and decision support tools that maximize sustainable economic returns by increasing yields, conserving resources, and creating new market opportunities.

The overall challenge is to monitor the physical, environmental and biological conditions that limit growth with high spatial and temporal resolution throughout production cycle and to identify interventions that relieve those constraints. Recent advancements in sensing technologies have made it possible to extract massive volumes of genetic, physiological, and environmental data from certain crops in relatively small test fields. The correlation between the collected massive data and the crop performance is currently being investigated in the undergoing Advanced Research Projects Agency-Energy (ARPA-E) Transportation Energy Resources from Renewable Agriculture (TERRA) program, and it will be processed into the knowledge needed to improve the production yield and reduce the energy cost [2]. Upon completion of the study, fully-integrated and low-cost wireless sensor networks suitable for large scale deployment on actual crop fields for effective spatiotemporal monitoring of biotic and abiotic parameters affecting the crop health will be highly desirable for the implementation of energy-smart farms with maximized yield, resource conservation, and compelling economic advantages. However, state-of-the-art sensors that rely on active electronics to operate and process signals are not suitable for the implementation of the envisioned large sensor network due to the requirement of frequent maintenance work to replace a large number of dead batteries in the sensors.

Advanced sensing technologies have been utilized in agricultural industry to increase the throughput of phenotyping and improve the automation level and productivity. Several methods of detecting plant water stress have been exploited to date, ranging from soil moisture sensors to satellite imaging [3]. Although accurate and reliable soil, plant, and remote sensing-based approaches have been investigated and are currently being used, a solution that detects crop water stress over large areas with high spatial resolution while being cost, labor and energy-effective does not exist. Ground sensors to monitor in real time the water content in the soil have been developed and provide simple, actionable an accurate irrigation decision. Nevertheless, they face the fundamental challenge associated with state-of-the-art sensor technologies: power consumption. Despite the progress in engineering energy efficient system level solutions, existing monitoring devices typically stop working after a few weeks in the ground because they run out of power [4], because these commercial devices consume power continuously to monitor the environment and their batteries cannot always be recharged in a timely manner using reasonably sized solar panels.

IR-based water content monitoring techniques are particularly attractive since they are non-destructive and can be completely automated requiring lesser complexity in measurement and data processing to accurately determine plant stress. Studies have shown that leaf moisture content is a direct indicator of plant stress that affects evapotranspiration and leaf reflectance in the short wavelength infrared (SWIR) (1.3 µm-2.8 µm) and mid wavelength infrared (MWIR) (4 µm-5.5 µm) regions [5-8]. The reduction in evapotranspiration is a result of stomatal closure in the leaves during stressed conditions, which also has a direct correlation with the temperature of the leaf by making it higher than the surroundings (up to ~10° C.) [9, 10]. The measurement of such a temperature variation via IR thermal sensing has been used as a reliable indicator of plant water stress. The reduced water content in a leaf can also be sensed remotely by monitoring the spectral reflectance of the leaf in both SWIR and MWIR spectral regions, which increases with decreasing moisture content [5]. Current IR-based methods use handheld devices (thermal and hyperspectral cameras), which are bulky, labor intensive (requiring advanced operator training) and extremely costly. Therefore, they cannot be effectively employed to continuously monitor large areas with high spatial resolution while guaranteeing a sufficient return of investment for the farmers. Satellite-based hyperspectral IR imaging is typically used to monitor larger areas, but this approach is characterized by severely limited spatial and temporal resolutions (weeks). Most recently, thermal or hyperspectral infrared cameras combined with unmanned aerial vehicles or drones have been employed for imaging large area of crop field from the air. However, the lack of granularity and the costs involved with this approach can be prohibitive for frequent inspections throughout the production cycle. Predictive and actionable information with much higher granularity is needed to determine the status of plants and translate the data into actionable items that can maximize the crop yield.

SUMMARY

The present technology provides zero-power sensors for crop water content monitoring. The zero-power crop monitoring sensors consume no power while monitoring for the presence of dry crop conditions and water stress crop conditions, using the energy of impinging IR radiation to open or close a switch. When the sensors detect water stress or detect dry crops, a circuit can be closed, thereby activating a radio transmitter, an RFID tag, or an alarm. Radio transmissions from the sensors can activate an irrigation system, which can irrigate specific plants or regions of a field until water stress is alleviated. Because the zero-power crop monitoring sensors consume no power while monitoring for crop stress, battery changing is not a requirement, and cost is minimized. Once deployed, the zero-power crop sensors can remain in place for years, enabling the efficient monitoring of large and distant crop areas with little or no maintenance.

One aspect of the technology is a device for monitoring moisture content of a plant. The device includes: (i) one or more zero power infrared (IR) sensors, each sensor including a first plasmonic absorber tuned to a selected wavelength range of IR radiation and including a switch actuatable using only energy of IR radiation absorbed by the plasmonic absorber; wherein the one or more zero power IR sensors are disposed within a circuit in series or in parallel, and wherein the circuit is interruptable by the switch of each sensor; (ii) a transmitter disposed within the circuit and activatable by a selected configuration of said switches; and (iii) optionally a battery disposed within the circuit, the battery capable of powering the transmitter. Absorption by the one or more sensors of selected wavelengths of IR radiation originating from a plant at a level that is characteristic of a selected moisture content of the plant causes the transmitter to transmit an electromagnetic radiation signal.

Another aspect of the technology is a system for monitoring plants. The system includes: (i) a plurality of devices of any of the preceding features; and (ii) a receiver or RFID reader capable of monitoring transmissions from the plurality of devices. The system may also include (iii) a processor and a memory capable of storing and/or analyzing information captured by the receiver or RFID reader. The system can still further include (iv) an irrigation system activatable by the processor in response to information captured by the receiver or RFID reader signaling low moisture content by monitored plants.

Yet another aspect of the technology is a kit for monitoring plants. The kit contains a plurality of devices of any of the above features or the system of any of the above features and instructions for deploying and using the devices or the system.

Still another aspect of the technology is a method of monitoring plants in a field. The method includes the steps of: (a) deploying a plurality of devices of any of the above features 1-20, or the system of any of features 21-30, or the kit of feature 31 in the field within a distance from the plants suitable for detecting a condition of the plants using the devices; and (b) periodically monitoring the devices. The method can further include (c) treating the plants near devices that signal a condition selected from low plant moisture content, elevated plant temperature, or pest activity.

The technology can be further summarized in the following list of features.

1. A device for monitoring moisture content of a plant, the device comprising:
(i) one or more zero power infrared (IR) sensors, each sensor comprising a first plasmonic absorber tuned to a selected wavelength range of IR radiation and comprising a switch actuatable using only energy of IR radiation absorbed by the plasmonic absorber; wherein the one or more zero power IR sensors are disposed within a circuit in series or in parallel, and wherein the circuit is interruptable by the switch of each sensor;
(ii) a transmitter disposed within the circuit and activatable by a selected configuration of said switches; and
(iii) optionally a battery disposed within the circuit, the battery capable of powering the transmitter;
wherein absorption by the one or more sensors of selected wavelengths of IR radiation originating from a plant, characteristic of a selected moisture content of the plant, causes the transmitter to transmit an electromagnetic radiation signal.

2. The device of feature 1, wherein the device comprises four or more of said zero power IR sensors, each comprising a plasmonic absorber tuned to a different selected wavelength range of IR radiation, wherein the switch of each of the four or more sensors is set to a different selected activation power, and wherein the device functions as an IR analyzer with at least 4 bit resolution.

3. The device of feature 2, wherein the radio transmission from the device is activated when said IR radiation originating from a plant satisfies selected IR spectral criteria characteristic of low plant moisture content.

4. The device of any of the preceding features, wherein the selected wavelength range of IR radiation of the one or more sensors is independently selected from a range from about 1.3 microns to about 2.8 microns (SWIR), or a range from about 4 microns to about 5.5 microns (MWIR), or a range from about 8 microns to about 14 microns (LWIR).

5. The device of feature 4, wherein the SWIR radiation is centered at about 1.47 microns with a bandwidth of about 150 nm.

6. The device of feature 4, wherein at least one sensor of the device comprises a second plasmonic absorber tuned to a different IR wavelength range than the first plasmonic absorber, and relative absorption of IR radiation by the first and second plasmonic absorbers determines an open/closed state of the sensor switch.

7. The device of any of the preceding features, wherein one or more of the sensors comprises a heater operative to reset the sensor switch.

8. The device of any of the preceding features, wherein the sensors absorb IR radiation reflected from leaves of a plant within 5 meters from the device.

9. The device of any of the preceding features, wherein the device is capable of transmitting a signal when a plant having a relative water content at or below a selected value in the range from 0% to about 70% is detected.

10. The device of any of the preceding features, wherein a sensor of the device detects LWIR radiation as a measure of a temperature of a plant.

11. The device of feature 10, wherein the device transmits a signal in response to a temperature increase of the plant of about 5° C. or more.

12. The device of any of the preceding features, wherein one or more of the sensors is insensitive to LWIR radiation.

13. The device of any of the preceding features, wherein the sensors have an OFF-to-ON switch state transition with a conductance ratio $>10^{12}$.

14. The device of any of the preceding features, further comprising a focusing lens for collecting said infrared radiation.

15. The device of any of the preceding features, wherein the one or more sensors comprise switches that are always open or always closed in the absence of said selected range of IR radiation.

16. The device of any of the preceding features, wherein the transmitter is an RFID tag activatable by an altered switch status of a sensor of the device.

17. The device of feature 16, wherein the device does not comprise a battery.

18. The device of any of features 1-15, wherein the transmitter is a radio transmitter and the device comprises said battery.

19. The device of any of the preceding features, further comprising a zero power sensor activatable by a plant-derived volatile organic compound.

20. The device of any of the preceding features, wherein a sensor of the device comprises a switch having first and second contacts with an engineered adhesion force or latching force, such that the first contact and the second contact stably adhere after the contacts close, thereby providing a memory function wherein the sensor switch remains in the closed contact position after an incoming signal dissipates.

21. A system for monitoring plants, the system comprising:
(i) a plurality of devices of any of the preceding features; and
(ii) a receiver or RFID reader capable of monitoring transmissions from the plurality of devices.

22. The system of feature 21, further comprising:
(iii) a processor and a memory capable of storing and/or analyzing information captured by said receiver or RFID reader.

23. The system of feature 22, further comprising:
(iv) an irrigation system activatable by said processor in response to information captured by said receiver or RFID reader signaling low moisture content by monitored plants.

24. The system of any of features 21-23, wherein the plurality of devices comprise at least one sensor for monitoring a solar radiation and at least one sensor for monitoring reflected IR radiation from plants.

25. The system of any of feature 21-24, wherein the plurality of devices comprise zero power IR sensor and at least one other type of sensor.

26. The system of feature 25, wherein the other type of sensor detects temperature of plants or volatile organic compounds derived from plants.

27. The system of any of features 21-26, wherein the devices of the system do not comprise any batteries.

28. The system of any of features 21-27, wherein the plurality of devices are distributed at fixed positions near a plurality of plants in a field.

29. The system of any of features 21-28, wherein the receiver or RFID reader is attached to one or more drones capable of flying over the plants and collecting information from the plurality of devices.

30. The system of any of features 21-29, wherein the plurality of devices can be deployed at fixed positions in a field and remain operative for at least 3 years, or at least 5 years, or at least 10 years.

31. A kit for monitoring plants, the kit comprising a plurality of devices of any of features 1-20, or the system of any of features 21-30, and instructions for deploying and using the devices or the system.

32. A method of monitoring plants in a field, the method comprising:
(a) deploying a plurality of devices of any of features 1-20, or the system of any of features 21-30, or the kit of feature 31 in the field within a distance from the plants suitable for detecting a condition of the plants using the devices; and (b) periodically monitoring the devices.

33. The method of feature 32, wherein said monitoring comprises detecting transmissions from the devices or probing the devices with an RFID reader.

34. The method of feature 33, further comprising:
(c) treating the plants near devices that signal a condition selected from low plant moisture content, elevated plant temperature, or pest activity.

35. The method of feature 34, wherein the treating comprising providing water, nutrients, shade, and/or pesticide to plants near devices that signal said condition.

DETAILED DESCRIPTION

Figure 1:
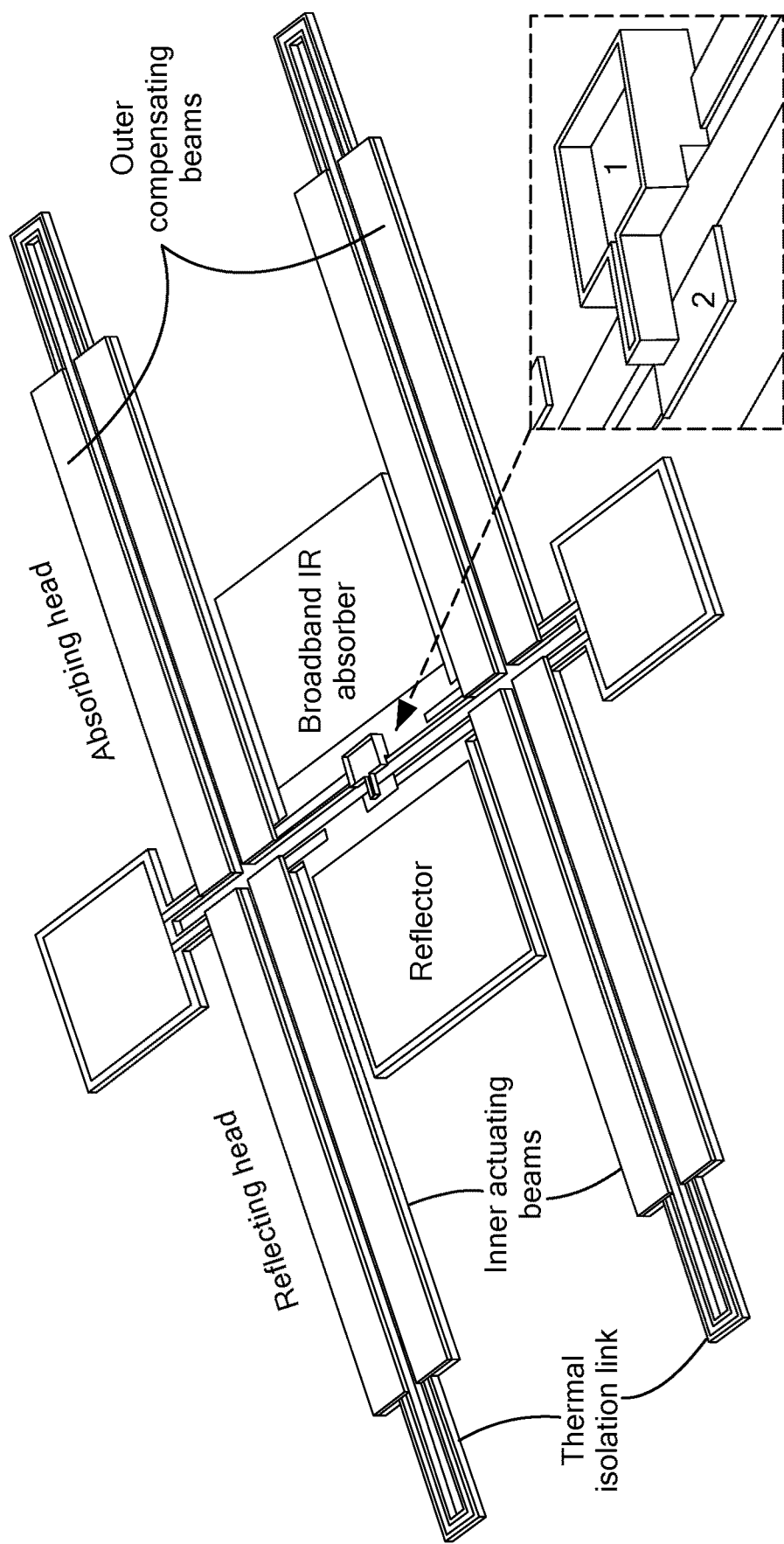
FIG. 1 shows a schematic illustration of a zero-power infrared sensor. The inset shows the contact region in which electrical contacts 1 and 2 are shown in the open position.

The zero-power crop sensors of the present technology provide passive, low-cost, and miniaturized sensors to monitor the water stress of plants in a field with a fine spatial granularity energy-smart farming. The sensors are capable of producing a quantized output bit when the water content of a target plant or group of plants drops below a predetermined value, without consuming any electrical power in standby. Such functionality can be realized by monitoring the water stress-related infrared (IR) characteristics of plants, such as leaf temperature and reflectivity, using zero-power spectrally resolving IR digitizing sensors. Thermal IR sensing can reveal temperature differences between sufficiently-irrigated and drought-stressed plants before the appearance of any visual indicators.

IR spectroscopy can reveal the reflectance change of leaves in SWIR and MWIR spectral ranges induced by the water content change in leaves of a plant. In this context, both temperature and spectral reflectance variations of the plant leaves can be adopted as indicators to guide automated irrigation with improved efficiency. Both approaches are used in the present technology for the accurate monitoring of water stress in energy crops. The present sensors act differently from state-of-the-art sensors based on solid-state devices. The present sensors are instead based on micromechanical switch structures, and utilize the energy of the IR radiation emitted or reflected from the plant leaves to measure their surface temperature or reflectivity, and compare them to a pre-determined threshold. The wireless sensors wake up, and drain power from the battery, only upon detection of changes in the irrigation indicators above pre-set alarm thresholds to transmit a radio frequency signal, or to activate an RFID circuit, indicating the need of irrigation at specific locations. The wireless sensors may be easily deployed close to plants (such as 5 meters, 3 meters, 2 meters, or 1 meter) in crop fields with a fine spatial granularity. Thanks to the complete elimination of standby power consumption, each sensor can wirelessly reveal irrigation needs for thousands of switch cycles without ever replacing a battery. Expected lifetime of an optional onboard battery is about 10 years, limited by the battery self-discharge.

The sensors described herein can be utilized to develop agricultural sensor networks for monitoring the water stress of crops, to develop fully automated irrigation systems with optimized watering management that can increase production yield while reducing total resource use, and to develop water content monitoring sensors for industries other than agriculture, such as food production and pharmaceutical companies.

Sensors of the present technology utilize the zero-power pasmonic MEMS device technology described in WO 2017/082985 A2, which is hereby incorporated by reference in its entirety. The sensor comprises: a base having a thin vertical Z dimension and larger horizontal X/Y dimensions, the base defining a horizontal base plane in the X and Y axes. Each side of the nearly symmetrical device possesses a head and two pairs of flexible "legs" or beams, each containing a substrate with a first coefficient of expansion overlayered by a second material with a second, different coefficient of expansion. Each pair of flexible resonant cantilever beams includes an outer compensating beam positioned parallel to an inner actuating beam. The proximal end of each outer compensating beam is attached to the base by a base joint; and the proximal end of each actuating beam is attached to the head. The distal end of each outer compensating beam attached to the distal end of each inner actuating beam by a thermal isolation region. The sensor comprises a first head adjacent to a second head at the horizontal base plane, each head having an affixed electrical contact, such that a sufficient vertical movement or bending of either head will bring the two electrical contacts to a closed position or alternatively will separate the two electrical contacts to open position.

The first coefficient of expansion and the second coefficient of expansion can both be coefficients of thermal expansion; the second coefficient of expansion of the second material can be larger than the first coefficient of expansion of the substrate, and the differential resonance can be differential thermal bending due to the larger second coefficient of expansion of the second material.

The first coefficient of expansion and the second coefficient of expansion can both be coefficients of expansion due to humidity. For example, the substrate can contain aluminum with a low coefficient of humidity expansion, overlayerd with a second material containing a polymer that expands and contracts in correlation to increasing and decreasing humidity. The second material can comprise, for example, polymers of a plasma-polymerized methacrylonitrile.

The second coefficient of expansion of the second material can be larger than the first coefficient of expansion of the substrate, and the differential expansion can lead to differential bending due to the larger second coefficient of expansion of the second material.

Bending of the compensating beams can provide thermal compensation, which maintains the alignment of the heads, maintaining their ability to respond to radiation absorbed by a plasmonic absorber without disturbance from environmental temperature or humidity changes.

The electrical contact affixed to the first head and the electrical contact affixed to the second head can have a gap less than about 1 micron, for example, from about 1 nm to about 500 nm in the open position.

At least one of the heads can be coated with a patterned plasmonic absorber material designed to absorb specific wavelengths of radiation, such as IR radiation. The plasmonic absorber head is operative to absorb a first target signal comprising a first bandwidth of infrared radiation and to convert at least a portion of the first bandwidth of infrared radiation to heat energy. The heat energy can be conducted from the first head through the two head joints to the two attached inner actuating beams. The heat energy can cause a thermal differential between the two inner actuating beams and the two outer compensating beams. The thermal differential can cause a differential bending between the two inner actuating beams and the two outer compensating beams, such that there can be sufficient vertical movement of the first head to close or to open the sensor.

For detection of leaf moisture the bandwidth of absorbed infrared radiation can be, for example, from about 1.3 microns to about 1.6 microns. The bandwidth of infrared radiation can comprise SWIR radiation centered at about 1.47 microns with a bandwidth of about 150 nm and a detection threshold of about 200 nW. The sensor can be utilized for zero-power water stress monitoring of crops and for digitizing increase in leaf reflectance due to water stress, and the sensor can be operative up to about 0.75 m from a leaf without a focusing lens positioned between the sensor and the leaf. With a focusing lens, the sensor can be operative distances greater than 0.75 m or greater than 1 m.

The sensor can be operative to bring the two electrical contacts to the closed position due to SWIR reflectance from a leaf having about 65.8% to about 0% relative water content (RWC).

When the sensor comprises a second plasmonic head, the second head can be a plasmonic absorber head operative to absorb a second target signal comprising a second bandwidth of infrared radiation and to convert at least a portion of the second bandwidth of infrared radiation to heat energy. The sensor can be configured such that the first bandwidth of infrared radiation comprises wavelengths in the range from about 1.3 microns to about 2.8 microns (SWIR) and the second bandwidth of infrared radiation comprises wavelengths from about 4 microns to about 5.5 microns (MWIR), such that increases in reflectivity of plant leaves due to water content reduction can be absorbed by the first head and/or the second head. The sensor can be modified to reject IR radiation in the long wavelength infrared radiation (LWIF) spectral range.

The sensor can be configured to target increases in leaf temperature due to water stress, wherein the bandwidth of infrared radiation includes wavelengths in the range from about 8 microns to about 14 microns (LWIR). Increases in temperature of plant leaves of about 5° C. or greater caused by water content reduction can be detected by the sensor. The sensor can be capable of identifying the appearance of a higher temperature leaf hot spot about 5° C. higher than the ambient temperature, at least within a distance of about 1 meter. The sensor can be configured, for example, with an electrical contact closing threshold of at least about 45 nW, required to detect a leaf temperature rise of about 5° C. at a distance of about 1 meter for an ambient temperature of about 20° C. The sensor can detect spectrally-selective absorption in the 8-12 μm IR spectral range and using an IR absorbing area of about 150 μm×150 μm. In one version of such a sensor, the sensor can further include two additional sunlight-triggered sensors to digitize impinging sunlight intensity as a window comparator, wherein a normally-open contact turns ON (closes) when the sunlight intensity exceeds a first designed threshold (lower power limit), and a normally-closed contact that turns OFF (opens) when the sunlight intensity exceeds a second designed threshold (i.e. upper power limit), and wherein both sensors can be in their closed state only when the power of sunlight is optimal for the measurement (i.e. falls within the narrow window defined by the thresholds of the two sensors).

To avoid false alarms due to vehicle exhaust plumes or blackbody radiation, the sensor described above can further contain an additional sensor, wherein the second head absorbs at about 3.5 microns ($NO_2$ emission) and the first head absorbs in a range from about 4.25 to about 4.5 microns ($CO_2$ emission). By forming a Not/And junction such that the pair of electrical contacts can be in the open position in response to exhaust plume/blackbody infrared radiation, false alarm conditions can be reduced.

Any of the sensors described herein be designed so that the sensor switch possesses a large and sharp OFF-to-ON state transition, e.g., with ON/OFF conductance ratio $>10^{12}$.

A thermal sensor for measuring leaf temperature and for detecting dry leaves can contain any one of the above sensors and a system battery connected to the electrical contacts in the sensor, to form a circuit with a radio transmitter. The electrical contacts in the sensor provides the circuit in the open position, wherein when the reflectivity of leaves in the relevant IR bands increases above a predetermined threshold (due to water content reduction) the closing of the electrical contacts in the sensor closes the circuit, activating the system battery with the radio transmitter to trigger a wireless communication signal activating an irrigation system, while keeping the radio completely disconnected from the power supply at all other times. In place of or in addition to a radio transmitter, the sensors can comprise an RFID circuit connected to the electrical contacts in the sensor to make a circuit, and that activates an RFID tag when the circuit is closed, and an RFID reader. The RFID tag can consume no power when open or closed such that power is only consumed when the RFID reader is activated to read the RFID tag.

Any of the above sensors can have electrical contacts designed for operation at the sub-micron scale. The electrical contacts can contain platinum. The first contact and the second contact can optionally contain an engineered adhesion force or latching force such that the first contact and the second contact adhere or become latched together after the open contact position is brought to the closed contact position, thereby causing a memory function wherein the sensor remains in the closed contact position after the environmental signal is dissipated. For example, to unlatch or release such electrical contacts, the first head or the second head can include a small electrical (thermal) heater operative to convert electrical energy to heat energy; the heat energy conducted from the second head to the two head joints to the two inner actuating beams, causing the temperature of the two inner actuating beams to be higher than the temperature of the outer compensating beams, and the differential in temperature causing a differential bending between the two inner actuating beams and the two outer compensating beams. The differential bending between the two inner actuating beams and the two outer compensating beams can cause the second head to lower in relation to the first head and in relation to the base plane and can cause the contact affixed to the second head to lower away from the contact affixed to the first head, opening the closed contact position, if the first and contacts were in the closed contact position, or opening the latched or adhered closed contact position with the contact, if the first and contacts were latched or adhered in the closed contact position. The electrical heater can, for example, be such that the conversion of electrical energy to heat energy in the electrical heater includes an electrical heater pulse of about 0.65V for about 300 milliseconds.

A method of detecting a dry leaf can include providing a sensor described above, such that leaves with relative water content (RWC) of about 70% to about 0% and have higher reflectivity can be targeted, and triggering a signal if the leaf is dry. Other RWC thresholds can be selected according to need. A method of detecting dry leaves, can include providing a sensor such that dry leaves with elevated temperature can be targeted, and triggering a signal if the leaves are detected to be dry.

A system for monitoring plants can include a plurality of sensors comprising radio transmitters, the sensors distributed near the plants, each sensor configured for detecting infrared radiation reflected and/or emitted by a plant's leaves in a defined area around the sensor activating the radio transmitter of the detector, and a radio receiver connected to a crop irrigation system such that the crop irrigation system will activate water supply for plants in need of water. The radio transmitters can be low power and only consume power when activated.

A system for monitoring plants can include a plurality of sensors comprising RFID tags, the sensors distributed near the plants, each sensor configured for detecting infrared radiation reflected and/or emitted by a plant's leaves in a defined area around the sensor activating the RFID tag, and the activation state can be read by the RFID reader. One or more RFID readers can be connected to a crop irrigation system wirelessly such that the crop irrigation system will activate water supply for plants in need of water.

A microprocessor can be utilized to record crop conditions over time and to provide data in the form of time-stamped maps, a timeline of irrigation events, or a movie.

The sensors can be distributed near the plants on fixed mounts such that the fixed mounts do not interfere with plant or crop planting, harvesting, or maintenance. The RFID readers can be attached to drones comprising a microprocessor, such that the drones fly over the crops and read the status of the RFID tags on the ground sensors with high granularity.

The technology can provide a kit for monitoring crops, the kit comprising instructions and the sensors with radio transmitters and receivers or with RFID tags and RFID readers. The kit can further be configured as a kit for signaling an alarm communication to a human operator when a threshold of dry leaf conditions can be met and not satiated by water irrigation, the alarm communication in the form of a text message, an email, a phone call, or a combination of communications. The systems herein can be utilized for monitoring the condition of a crop utilizing zero power until a dry leaf condition is detected.

A method of making the sensors herein can comprise: providing a substrate with a Z dimension of about 2 microns, the substrate comprising silicon dioxide, a top or device side, and a backside or bottom side; etching structures and depositing layers on the top or device side; and releasing areas of the substrate by utilizing backside release based on deep reactive ion etching or by utilizing dual doped tetramethylammonium hydroxide (TMAH) wet release.

The sensors described above can be deployed and remain active for about up to 3 years, about up to 5 years, or about up to 10 years. The agricultural sensors can monitor the water content of crops without using any electrical power. The sensors can continuously and passively monitor the water content of crops and wake-up an electronic circuit upon detection of indicators of water content dropped below a designed threshold. The zero-power multispectral leaf reflectivity sensors can utilize sunlight to digitize the reflectance change of leaf surfaces in the short wavelength IR (SWIR) (1.3 µm-2.8 µm) and mid wavelength IR (MWIR) (4 µm-5.5 µm) regions. The leaf reflectivity sensors can use a set of normally-open and normally-closed photoswitches to quantize the intensity of sunlight. The leaf reflectivity sensors can operate at multiple spectral bands to reduce the false alarm rate. Zero-power leaf temperature sensors can utilize the thermal energy from warm leaves to digitize the temperature change of leaves. The sensor nodes can utilize both temperature change and reflectance change of leaves as water stress indicators to improve the detection accuracy.

Figure 22:
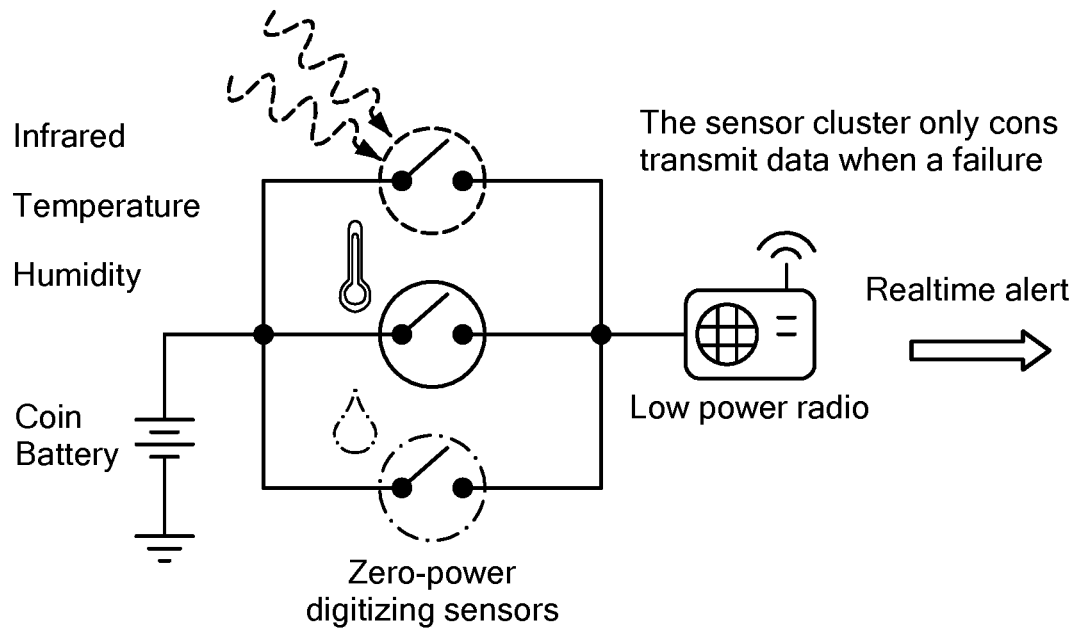
FIG. 22 shows a system for monitoring infrared reflectance, temperature, and humidity using three separate zero power digitizing sensors (one each for IR, temperature, and humidity) together with a low power radio transmitter and a coin battery. The radio only consumes power when the target IR, temperature, and humidity conditions are met, and all three switches are closed.
Figure 23:
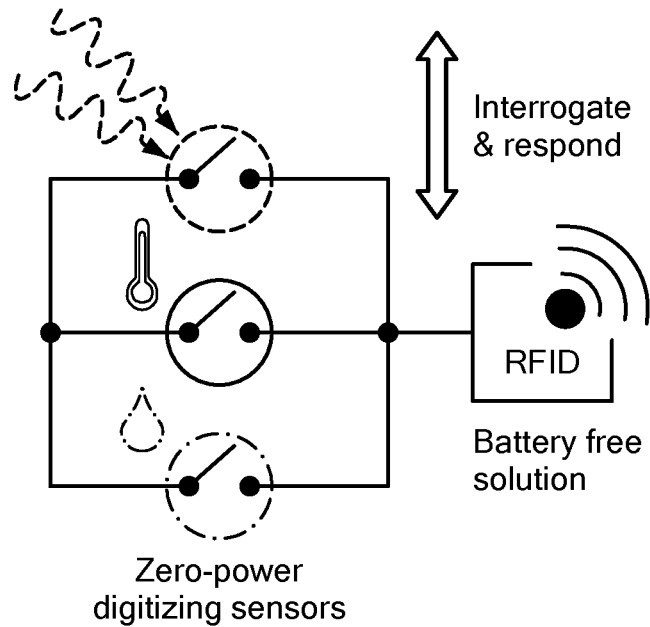
FIG. 23 shows a system for an iterrogatable, battery-less zero power sensor combining an IR sensor, a temperature sensor, and a humidity sensor, wherein only when all three close is an RFID tag operable.

As used herein, short-wavelength infrared (SWIR) refers to wavelengths from about 1.4-3 microns, frequencies from about 100-214 THz, or photon energies from about 413-886 meV. Mid-wavelength infrared (MWIR) refers to wavelengths from about 3-8 microns, frequencies from about 37-100 THz, and photon energies from about 155-413 meV. Long-wavelength infrared (LWIR) refers to wavelengths from about 8-15 microns, frequencies from about 20-37 THz, and photon energies from about 83-155 meV. Far infrared refers to wavelengths from about 15-1000 microns, frequencies from about 0.3-20 THz, and photon energies from about 1.2-83 meV. Near infrared refers to wavelengths from about 0.75-1.4 microns, frequencies from about 214-400 THz, and photon energies from about 886-1653 meV (FIG. 22). Infrared radiation is utilized herein as an example of the present technology. The present technology is not limited to IR radiation and can be applied to any radiation that can actuate the zero-power micromechanical switches herein.

As used herein, relative water content (RWC) can be calculated utilizing the equation: RWC $(\%)=[(W-DW)/(TW-DW)]\times 100$; where, W=Sample fresh weight, TW=Sample turgid weight, and DW=Sample dry weight.

Figure 4:
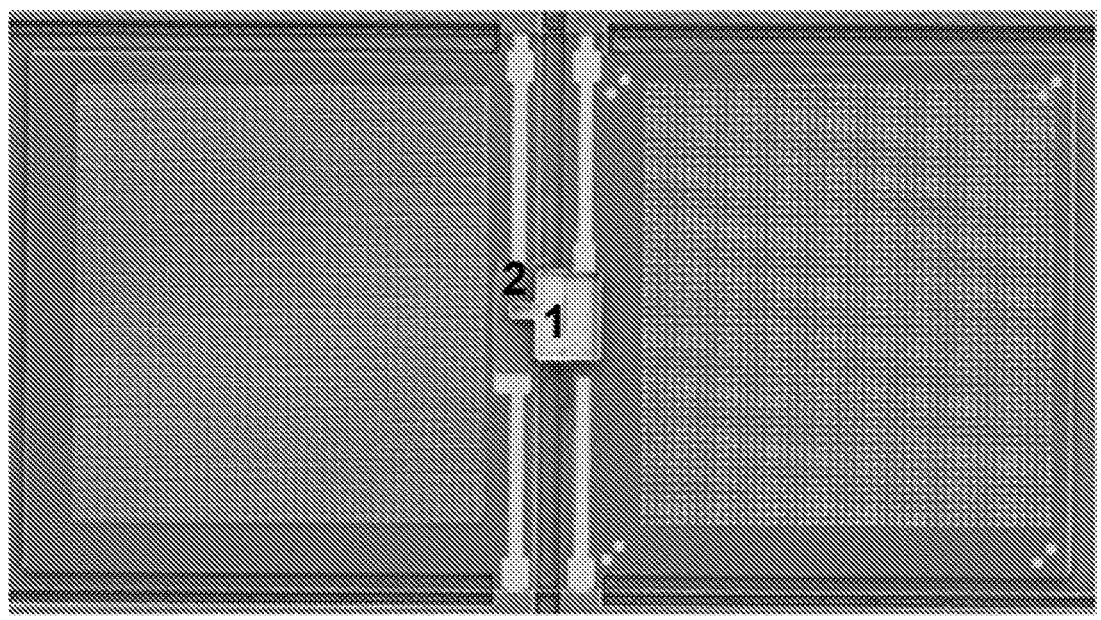
FIG. 4 shows an SEM image of two plasmonically-enhanced IR-sensing heads with attached electrical contacts 1 and 2.

An enlarged view of plasmonic absorbing heads is shown in the SEM image of FIG. 4. Electrical contacts 1 and 2 are shown affixed to two plasmonic absorbing heads, with the first electrical contact affixed to a first absorbing head, and the second electrical contact affixed to a second absorbing head.

The MPs are highly insensitive to non-targeted IR or environmental signals, thus preventing false alarms or false triggering of the MPs. Pairs of flexible resonant cantilever beams can be utilized on both sides of the absorbing heads to prevent movement of the heads and the electrical contacts in response to, for example, environmental (non-targeted) changes in temperature, non-targeted changes in IR, and physical movement.

In order to actuate without any battery power or external electrical power, the electrical contacts inside the MPs can be positioned about 1 nm to about 500 nm apart (less than a micron), enabling a small differential expansion in one or more components to open or close the electrical contacts. Thus, a small absorbance on the order of microwatts can actuate the MPs. With the electrical contacts positioned close, the contacts can be prevented from moving due to any untargeted environmental changes by utilizing the pairs of flexible resonant cantilevers comprising pairs of compensating and actuating beams (FIG. 1).

Figure 3A:
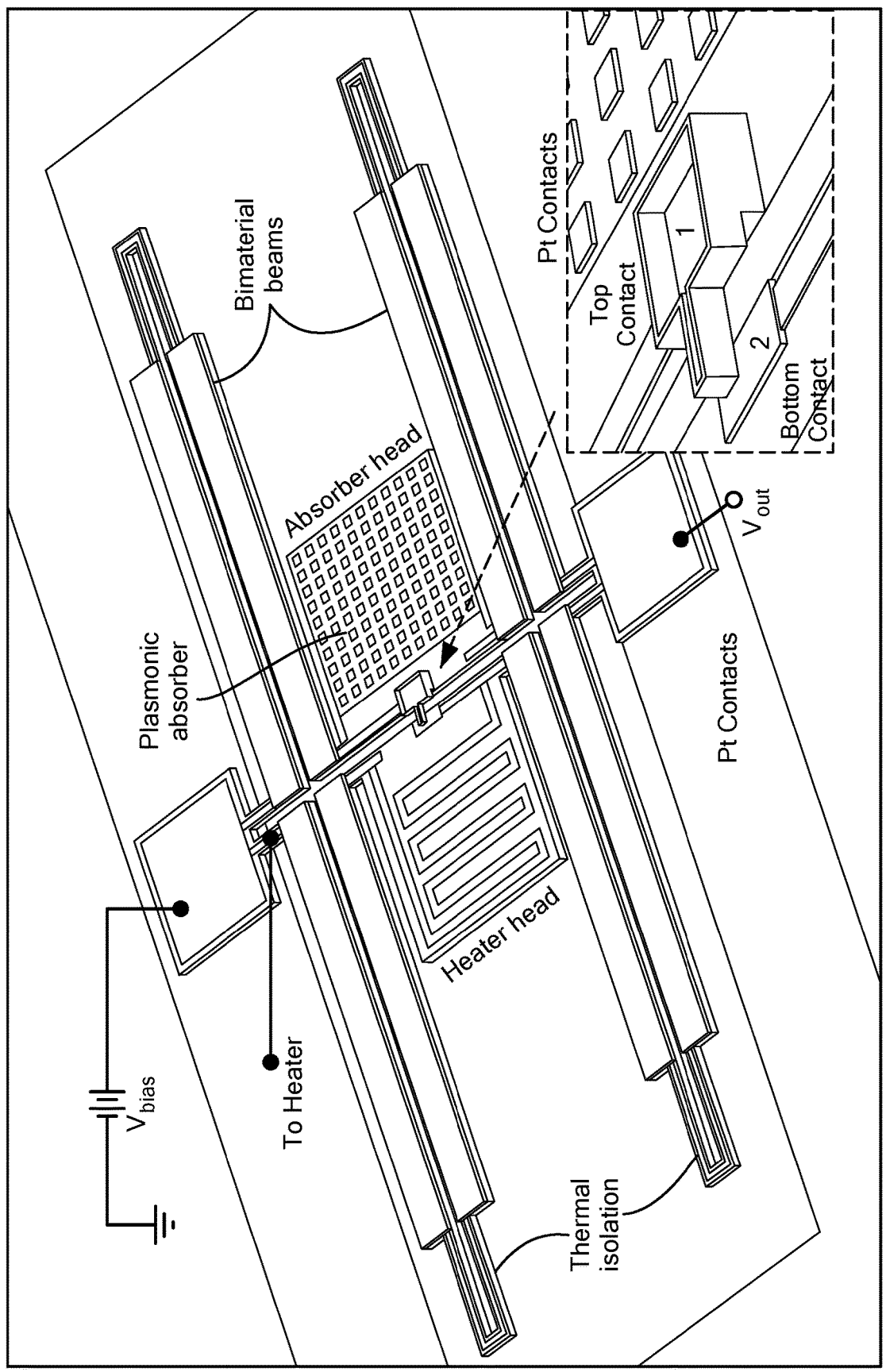
FIG. 3A shows an illustration of a zero-power infrared sensor having an electrical heater on one head and an IR plasmonic absorber on the other head. Electrical contacts 1 and 2 are shown in the open position in the inset.

The electrical contacts 1 and 2 shown in the lower right of FIG. 1 can be moved into a closed contact position or into an open contact position by differential movements of inner actuating beams relative to outer compensating beams. The enlarged 3D illustration of a zero-power infrared (ZIR) sensor shown in FIG. 1 has the two electrical contacts (1, 2) shown in the open position in the enlarged inset shown at the lower right of FIG. 1. The two electrical contacts are each mounted on a head positioned between a pair of resonant cantilevers. In FIG. 1, one of the plasmonic absorbing heads is shown as a broadband IR absorber, and an IR reflector is shown as the second head. As will be discussed in more detail, under the IR reflector, the second head can be configured with an in-built microheater for switch reset (FIG. 3A). The inner actuating beams connected to the heads can move in the Z-axis, moving the electrical contacts to open or closed position. Each cantilever is composed of a head, an inner pair of thermally sensitive bimaterial beams for actuation, and an outer pair of identical bimaterial beams for temperature and stress compensation. At the distal ends, the inner and outer beams can be connected by a thermal isolation link, which is free to move up or down in relation to the base plane.

Figure 2:
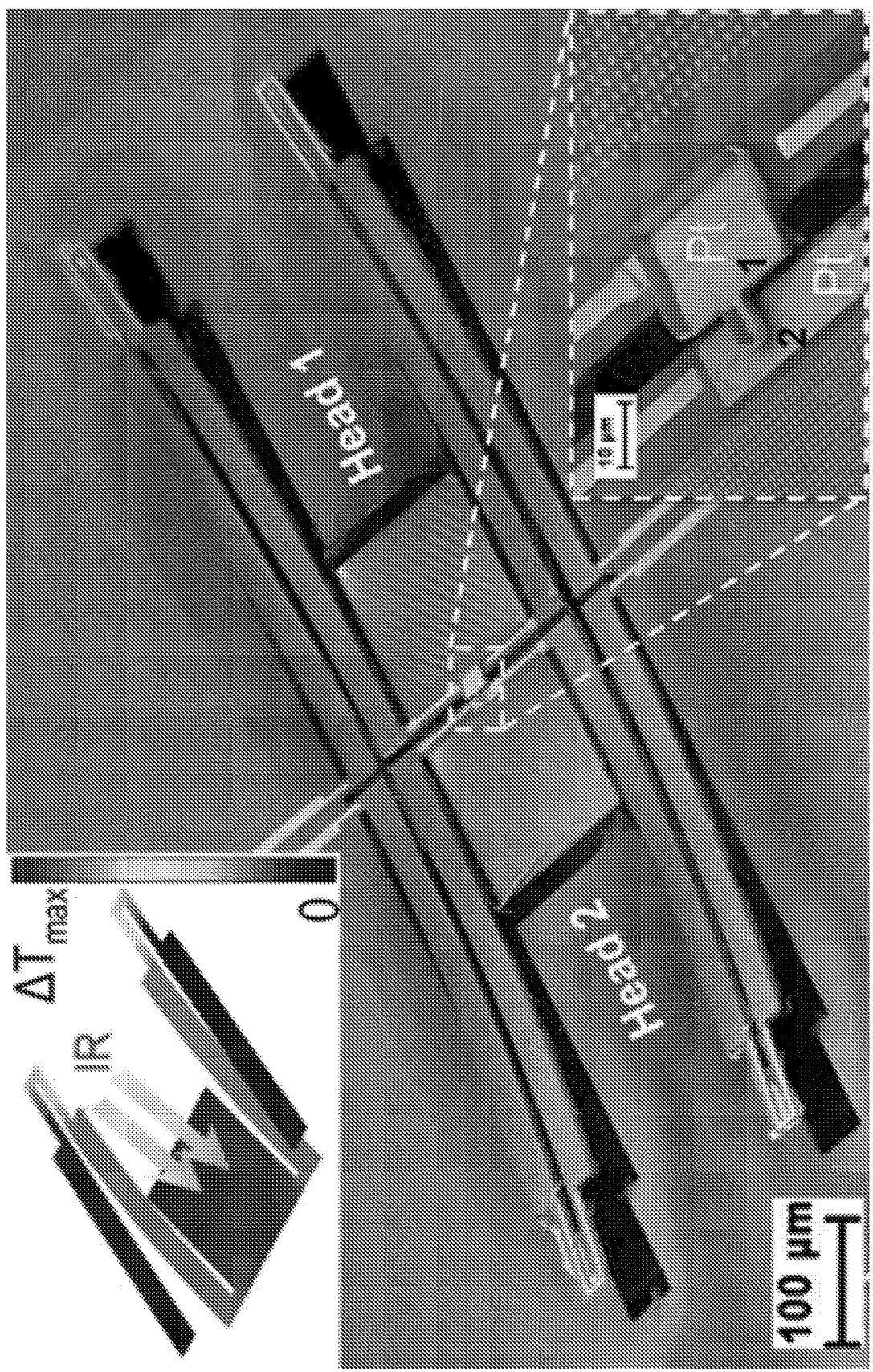
FIG. 2 shows a scanning electron microscope (SEM) image of a zero-power infrared sensor with two IR absorbing heads. The contact region, shown enlarged at bottom right, contains two platinum electrical contacts 1 and 2. The inset at the upper left illustrates how absorption of IR radiation at plasmonically-enhanced head 1 causes the inner actuating beams to bend downward relative to the outer compensating beams.

FIG. 2 shows an SEM image of a zero-power infrared (ZIR) sensor with two IR absorbing heads, with two platinum electrical contacts (1, 2, inset in lower right) shown at the gap between the two heads. The scale bar at lower left is 100 microns. The inset at the upper left of FIG. 2 illustrates absorption of IR radiation at plasmonically-enhanced head 1 causing inner actuating beams to bend downward relative to outer compensating beams. Electrical contact 1 overlaps electrical contact 2, so bending head 1 downwards would bring electrical contact 1 into contact with electrical contact 2 in this example. Distal from head 1 and head 2, the ends of the outer compensating beams and the ends of the inner actuating beams are shown bent upwards, out of the plane of the base, which is thin in the Z dimension and is shown surrounding the ZIR or MP. An outer compensating beam coupled with an inner actuating beam can form a pair of flexible resonant cantilever beams, and two pairs of flexible resonant cantilever beams can be attached to each head, a pair on each opposite side of a head. As temperature of the outer compensating beams and of the inner compensating beams changes, the distal ends can bend up or down out of the plane of the base, yet the head (and electrical contacts) remain stationary until a target signal is detected. A differential in temperature between the inner actuating beams and the outer compensating beams can cause a motion of the heads (and electrical contacts). The differential in temperature can be caused by IR absorbance at one of the plasmonically enhanced heads.

Figure 3B:
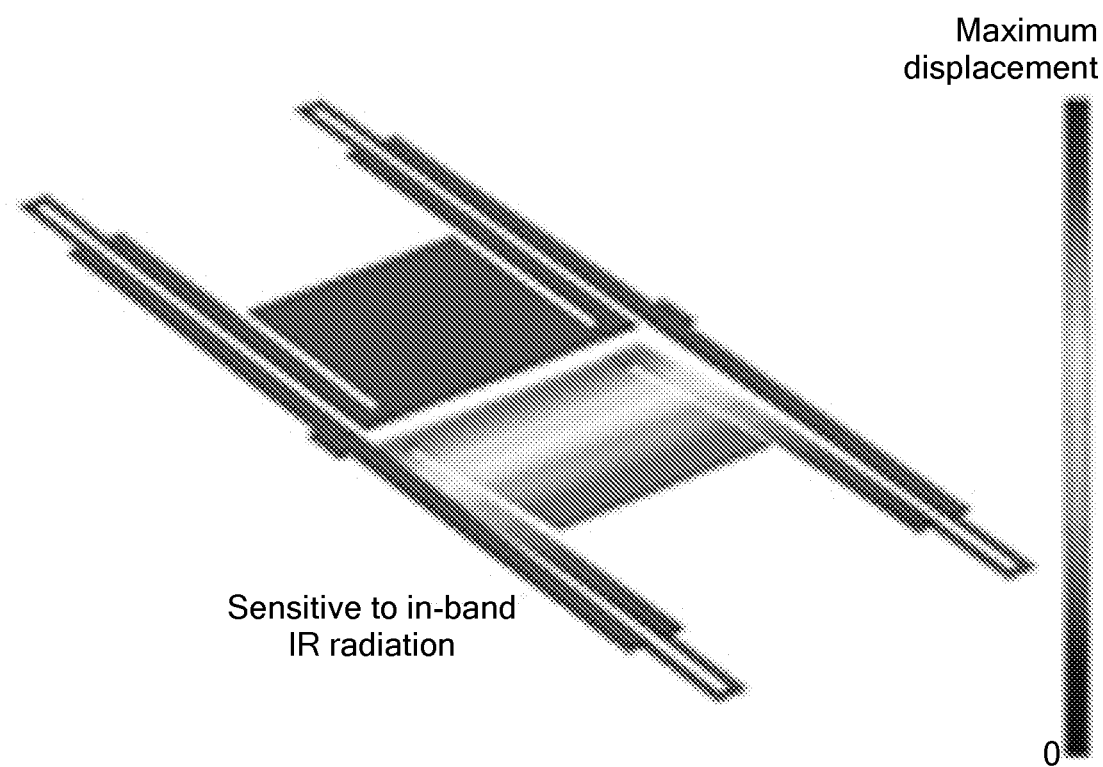
FIG. 3B illustrates a sensor in which absorption of IR radiation at a plasmonically-enhanced head causes the inner actuating beams to bend downward relative to the outer compensating beams.
Figure 3C:
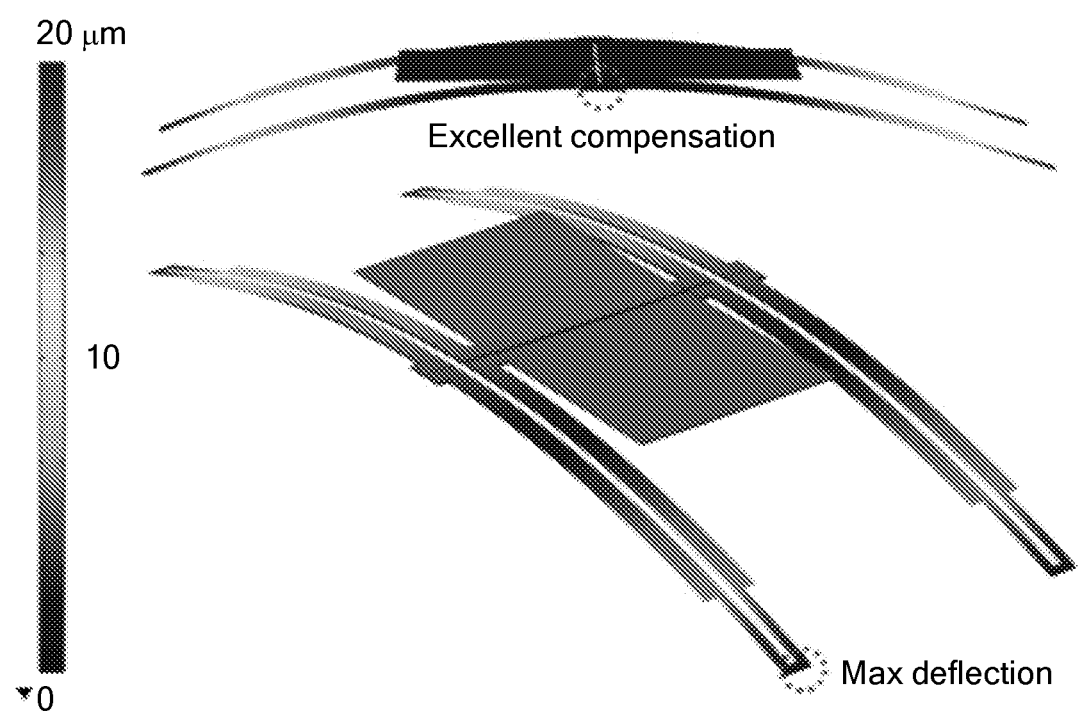
FIG. 3C illustrates temperature compensation by a sensor, in which the outer compensating beams and the inner actuating beams bend equally in response to temperature change, keeping the two heads aligned.

Heat can be conducted from a plasmonically enhanced head through the joint that mounts the plasmonically enhanced head to an inner actuating beam, the heat being conducted into the inner actuating beam. At the distal ends of the inner actuating beams and the outer compensating beams, a thermal isolation link (see FIG. 3A) prevents heat conduction between an inner actuating beam and an outer compensating beam, to maximize a temperature differential between an inner actuating beam and an outer compensating beam. For example, the thermal isolation links can include small tubular materials or can include the same material as the base or some of the same material as the inner actuating and outer compensating beams. FIG. 3B illustrates absorption of IR radiation at plasmonically-enhanced head 1 causing inner actuating beams to bend downward relative to outer compensating beams, and FIG. 3C illustrates temperature compensation, without showing the base, with the outer compensating beams and the inner actuating beams bending equally into an arc while keeping head 1 and head 2 aligned and stable. In FIG. 3C, the proximal ends of the pairs of flexible resonant cantilever beams are affixed to the heads, while the distal ends are shown in a maximum deflection.

Figure 20:
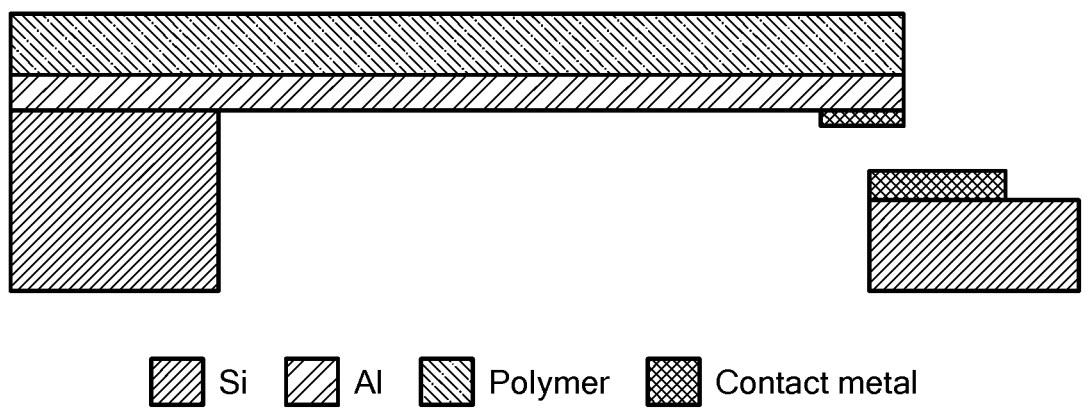
FIG. 20 illustrates a humidity sensor wherein a polymer, which expands as humidity rises, is deposited onto an aluminum layer. As the polymer expands, the beam bends and moves the contact to the closed position.

The example in FIG. 3A shows an 3D illustration of a zero-power infrared (ZIR) sensor comprising a heater head at the head 2 position and an IR plasmonic absorber head at the head 1 position. A heater head can be utilized to prevent closure of switch contacts or to bring the electrical contacts out of a contacted position. In some examples, the electrical contacts can latch together or adhere together after making electrical contact. A heater head can be utilized to unlatch the electrical contacts or to pull a pair of adhered electrical contacts apart (FIG. 6B). Latched or adhered electrical contacts can be utilized as a memory function such that once a targeted environmental signal dissipates, the electrical contacts can remain in a closed contact position until brought out of a closed contact position by a heater head or other functional component. A manual heater head was utilized to initially test the usage of a heater head, and FIG. 20 shows a plot of current versus time for a latching plasmonically-enhanced micromechanical photoswitch (PMP) test utilizing a manual heater reset of latching electrical contacts in a latching PMP.

The inner actuating beams and the outer compensating beams can be identical materials. A pair of flexible resonant cantilever beams can include an inner actuating beam and an outer compensating made of the same materials such that both react similarly to changes in temperature or other environmental conditions. In the lower left of FIG. 5, and enlarged view (SEM) of the isolation joint between an outer compensating beam and an inner actuating beam, along with layers of the beams. A substrate layer of the beams can include, for example, silicon dioxide, with a second material, shown as aluminum in FIG. 5, with a different thermal coefficient of expansion. A reflecting head (FIG. 1, FIG. 5) can be utilized to minimize temperature change in a second or first head.

Each of the first head and the second head is connected to the proximal ends of two first inner actuating beams. Each of the first inner actuating beams includes a substrate with a first coefficient of expansion, a layer with a second coefficient of expansion, and a length. Each of the first two inner actuating beams is connected at the distal end to a parallel (or lengthwise) first outer compensating beam comprising the substrate with the first coefficient of expansion, the layer with the second coefficient of expansion, and the length. The proximal end of each of the parallel (or lengthwise) first outer compensating beams is affixed to the base by a flexible joint.

Each of the first two inner actuating beams is positioned about in the base plane, and each of the lengthwise first outer compensating beams can be parallel to and in the same plane as each of the first two inner actuating beams. The inner actuating beams positioned with the outer compensating beams form pairs, such that changes in environmental temperature cause the distal ends of the first two inner actuating beams and the distal ends of the parallel first outer compensating beams to deflect out of the base plane while forming an arc extending from the distal ends to the proximal ends. Thus, the first and second head remaining positioned in about the base plane, between the two proximal ends of two first inner actuating beams, and changes in environmental temperature (or other variables) do not cause the first head to change position relative to the base plane and relative to the second head.

Figure 5:
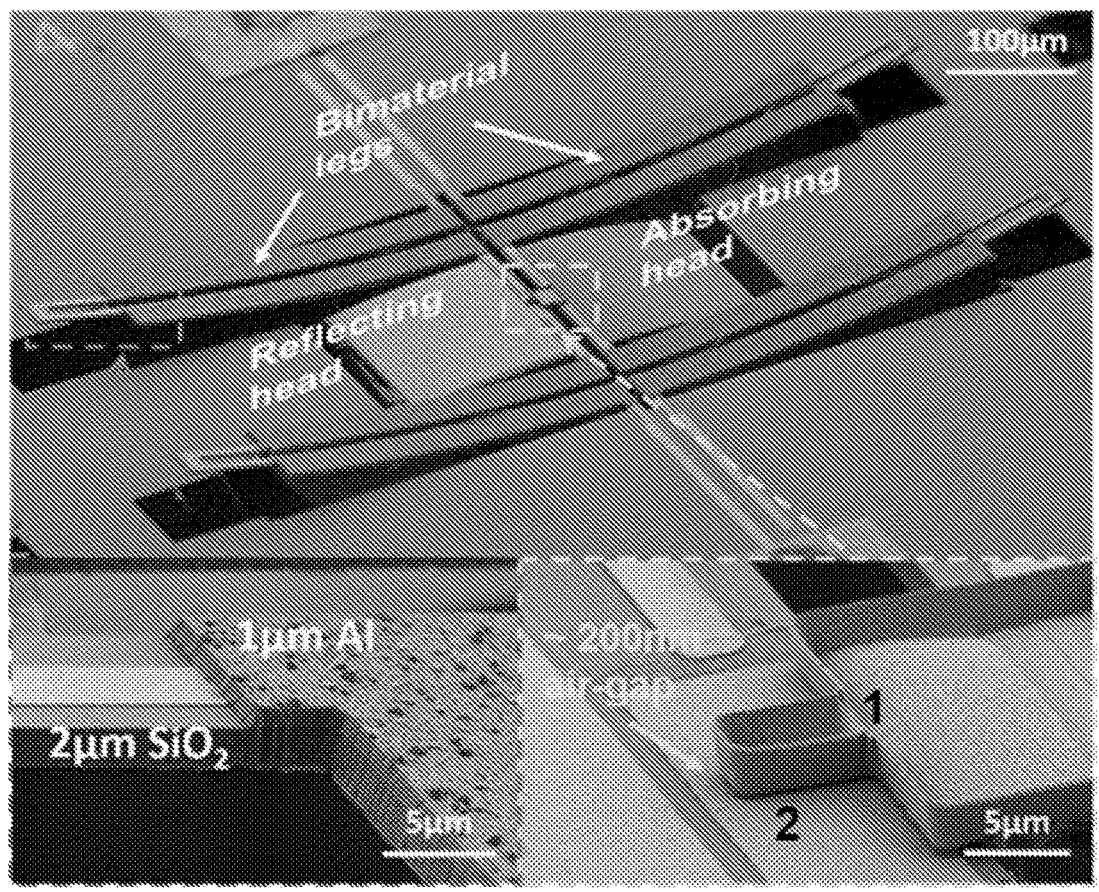
FIG. 5 shows an SEM image of a zero-power infrared sensor containing a reflecting head at and an IR plasmonic absorber head. The inset at lower left shows an enlarged view of a thermal isolation region. The inset at lower right shows the contact region having an air gap between the two contacts.

A head along with two pairs of flexible resonant cantilever beams and an electrical contact can be described as a cantilever. The present MP contains of a pair of symmetric released, resonant cantilevers, each composed of an absorbing (or null/reflecting/heating) head and an inner and outer pair of thermally sensitive bimaterial legs separated by a thermal isolation link as shown in FIG. 5. In place of a plasmonically-enhanced head, a broadband absorbing head can selectively convert impinging optical power in the LWIR regime to heat. A broadband absorbing head can include silicon dioxide with a reflector backing, for example, platinum. Upon the absorption of broadband LWIR radiation in the absorbing head, a large and fast increase of temperature in the corresponding inner pair of actuating beams can result in a downward displacement of the cantilever, bringing a high-stiffness platinum (Pt) tip into contact with the opposite terminal (FIG. 5, lower right). The switch can remain open until it absorbs LWIR radiance (e.g., from a human nearby) regardless of the change in ambient temperature, thanks to the symmetric design of the two cantilevers (FIG. 3C). The sub-micron air-gap maintained in standby translates directly into essentially zero leakage current and zero-standby power IR sensing.

Figure 18:
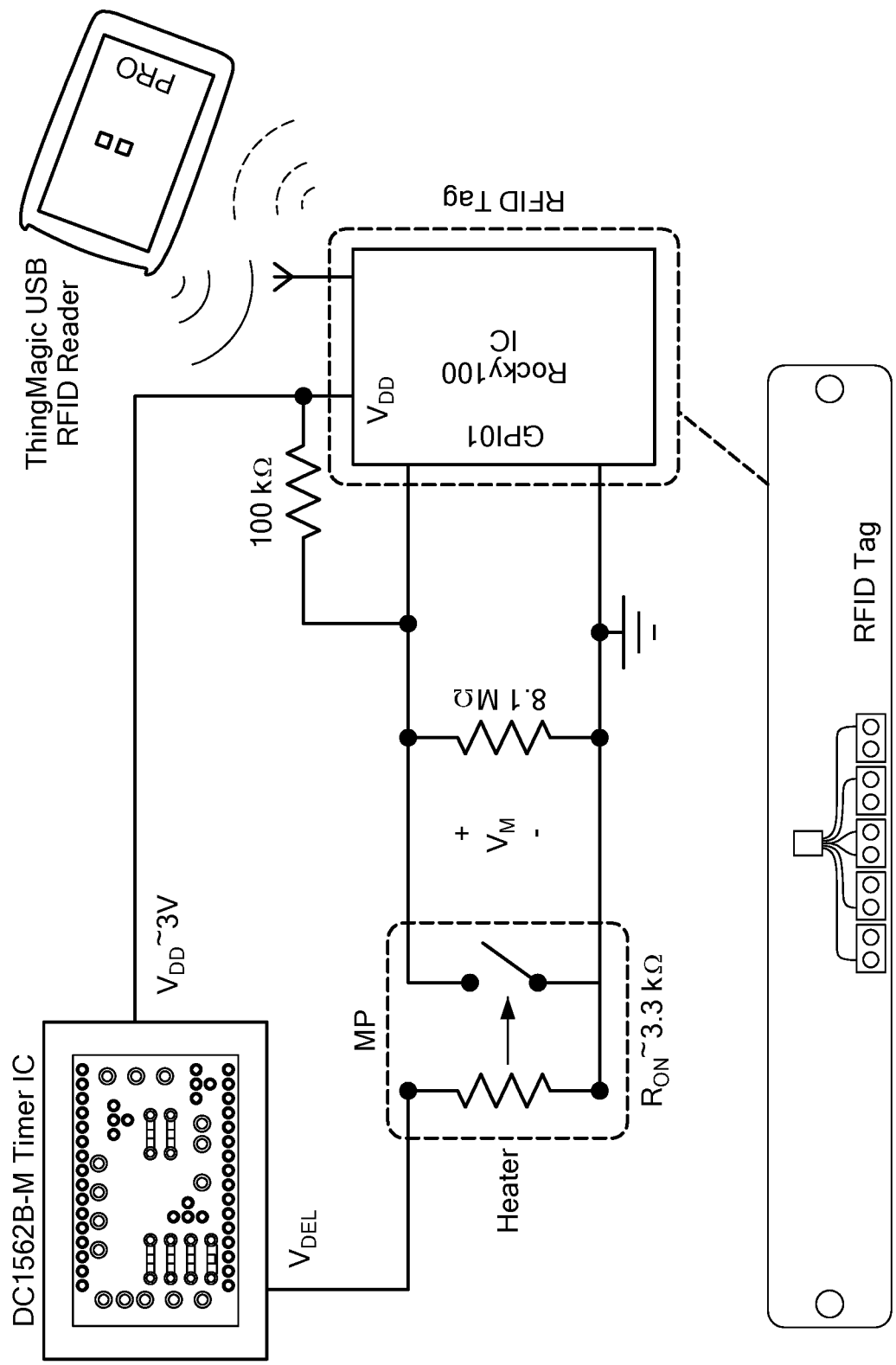
FIG. 18 illustrates a schematic of the RFID sensor tag used in FIG. 17.

The inner actuating beam and the outer compensating beam can be described as a pair of symmetric released cantilevers, each pair comprising an absorbing (or reflecting) head and an inner and outer pair of thermally sensitive bimaterial legs separated by a thermal isolation link as shown in FIG. 1. The bimaterial inner absorbing beams and outer compensating beams can include two or more materials with different coefficients of expansion or two or more materials with different reactivity towards humidity, radiation, heat, or other targeted environmental signals. As an example applied to thermal sensitivity, FIG. 18 shows a plot of thermal sensitivity (left y-axis) and beam stiffness (right y-axis) of the bimaterial legs (beams) as a function of the aluminum thickness for a fixed $SiO_2$ thickness of 2 μm. The vertical displacement, $\Delta y$, per unit absorbed IR power, is maximum for an Al thickness of 1 um.

Figure 9:
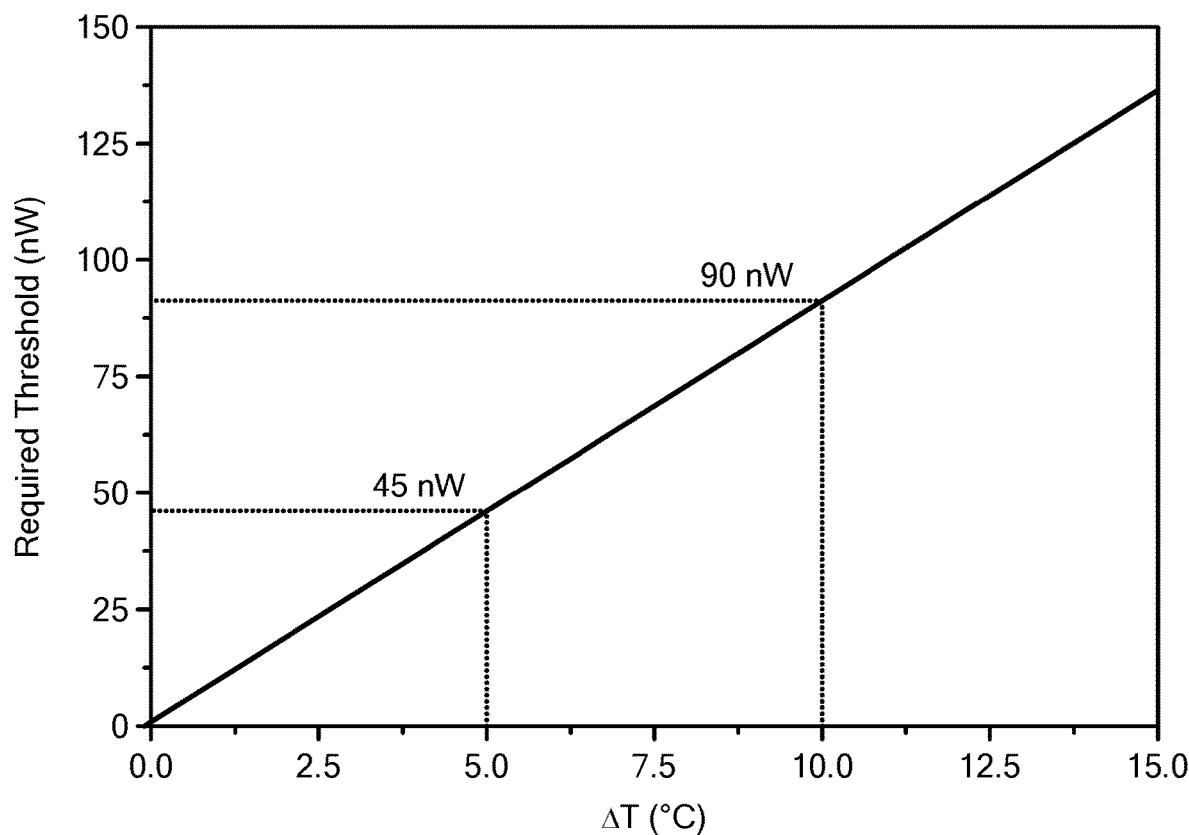
FIG. 9 shows a relationship between broadband IR detection settings and corresponding differences in leaf temperature.

By utilizing a broadband absorbing head as the first head, the micromechanical photoswitches (MPs) can be suitable for human detection with zero-power consumption while in standby. The MP can employ a highly-efficient broadband IR absorber ($\eta \sim 80\%$, $\lambda=8-12$ μm), spectrally matching with the IR radiance of a human body, for example, $SiO_2$ with Pt. An ultra-low detection threshold of ~140 nW has been experimentally demonstrated, and can be attributable to the high thermal sensitivity (~1.44 nm/nW) and stiffness (~0.033 nN/nm) of the optimized bimaterial actuating beams and the aggressively scaled nanoscale contact gap (<200 nm, FIG. 5) maintained by the built-in temperature and stress compensation mechanisms. Such low threshold enables, for example, human subject detection with a lens at a projected distance of 5.7 m (FIG. 9). Without a lens, distances up to about 0.75 m or 1 m can still be obtained.

Figure 19:
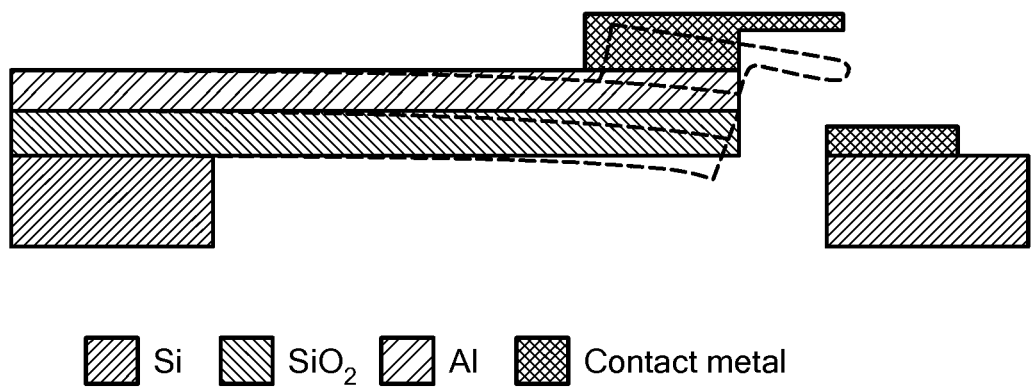
FIG. 19 illustrates a temperature sensor wherein aluminum, which has a higher coefficient of expansion than $SiO_2$, bends a beam and forces electrical contacts together as temperature rises.

FIG. 19 shows the spectral response of the broadband $SiO_2$ absorber in LWIR (bottom curve with peaks at ~4.5 and ~6.5 μm, left y-axis) and the normalized blackbody emission (human) at 37° C. (top smoother curve, right y-axis). The inset shows an example cross-section schematic of the broadband $SiO_2$ absorber with a Pt layer or reflector.

Figure 8:
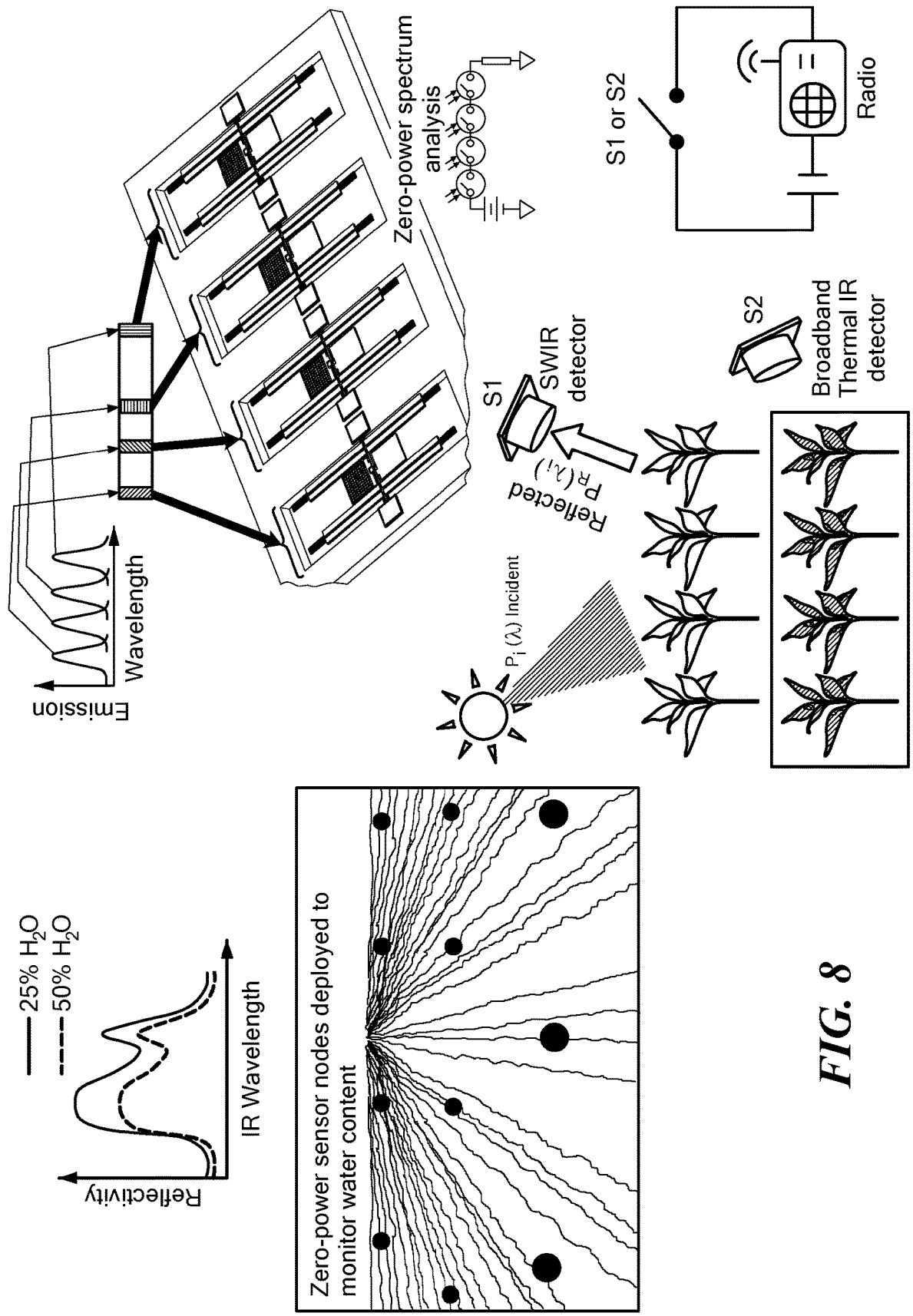
FIG. 8 shows a schematic illustration of a system for using zero-power infrared sensors with plasmonic, IR-tuned heads deployed in a field to monitor plant water content. At center, sunlight is reflected off leaves, and the reflected IR is absorbed by the IR spectrum analyzer shown at upper right, which controls array of switches S1 in a circuit containing a radio transmitter; S1 is closed if it detects a predetermined IR reflectivity spectrum corresponding to low leaf water content (inset top left). A broadband thermal IR sensor also can be utilized to monitor leaf temperature, triggering switch S2. The radio is activated if either S1 or S2 closes the circuit, such that the system responds to preset values of either dryness or high temperature of leaves.

For applications directed to human (or mammal) detection, the MPs have excellent sensitivity and can remain in the standby mode, without consuming any power, for many years. The MPs can be applied to human detection in a building (FIG. 8) to improve heating ventilation and air conditioning (HVAC) systems. It is known that HVAC systems do not necessarily need to heat, ventilate, or cool an unoccupied building, so deployment of the zero-power MPs in a building can be utilized to determine which portions of the building are occupied, and the HVAC system can be operated with greatest efficiency by directing heating, ventilation, or cooling to the areas of the building that are occupied. In FIG. 8, MPs are illustrated above human subjects, the MPs shown as small circles in the ceiling of a building. Each of the MPs can be zero-power and connected to a radio-frequency identification (RFID) tag such that closure of the electrical contacts within a MP will close a circuit connected to a RFID tag. An RFID reader can be, for example, configured in a light switch as shown in FIG. 8.

When configured to detect humans, the MPs can combine IR-based true presence sensing technology with well-developed RFID technology to realize high-accuracy, low-power and low-cost indoor people counting. The approach relies on the zero-power infrared (ZIR) digitizing sensor technology. The ZIR device can selectively harvest the energy contained in the specific IR signal of interest (i.e. the IR radiation from human body) and use it to mechanically create a conducting channel between two electrical contacts, without the need of any additional power source. Differently from PIR technology, ZIR sensors produce a binary signal directly corresponding to the presence and absence of the triggering IR radiation, and do not require any active electronics for signal conditioning. The capability of passively digitizing the presence of a specific IR radiation makes this technology work for integration with a RFID-based wireless readout: the electrical conductance of the ZIR sensor increases by 12 orders of magnitude (from an open to a closed circuit with a practically infinite subthreshold slope) when a human body is in the field of view, which effectively generates a large backscatter (i.e. a large signal reflected back towards the source) upon interrogation from the reader. Such IR-based presence sensing and wireless readout also enable people counting function when an array of sensor tags is deployed on the ceiling. Estimating the total number of people inside a room can be as simple as counting the number of activated ZIR sensors when they are densely arranged on the ceiling of a room or placed on top of each cubicles/desk in an office. The virtually zero computational requirement of this approach greatly facilitates the adoption of commercially available RFID readers with compact size and therefore the integration with existing HVAC controllers. Therefore, the occupancy sensing technology based on ZIR sensors and RFID tags represents a truly user-transparent, privacy-preserving and universally adaptive solution for people counting in commercial buildings and it has great potential to be commercialized once fully developed.

Figure 16:
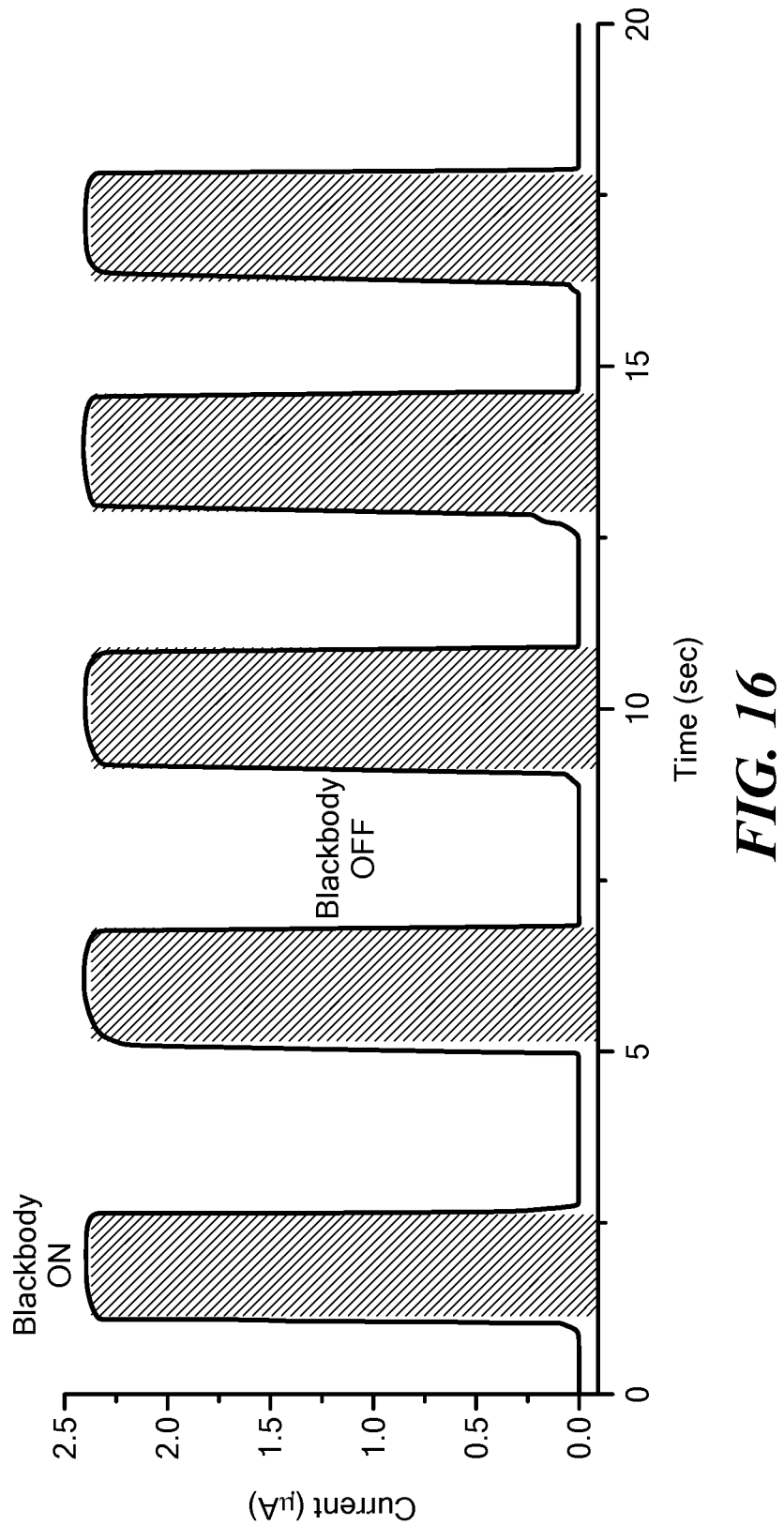
FIG. 16 illustrates measured current (using a sourcemeter with a 10 mV bias) through the zero-power infrared sensor in response to chopped IR radiation emitted by a calibrated blackbody source.

The present technology can provide a fully packaged battery-free wireless presence sensor node capable of reliably detecting human body (detection probability 95%) from 1 meter above the head and communicating with a RFID reader over 10 meters away in a typical indoor environment. Bodies of humans and other animal subjects emit IR radiation mainly at 8 to 14 μm. In order to discriminate the human body radiation from the background (i.e. radiation from the floor), the sensor is configured to capture the difference between the two emission spectra, which peaks at ~8 μm with a wide spread from 6 to 12 μm. To effectively collect most of the IR energy, broadband long-wavelength IR absorbers are used, which contain a 2-μm $SiO_2$ slab backed by a metal reflector. A ZIR sensor allows an ultra-low IR detection threshold of ~140 nW capable of detecting human body at 5.7 m distance with a focusing lens (e.g., a 25 mm diameter lens can be used, FIG. 9). When detecting a human body from above, the available IR power will inevitably be smaller due to the reduced portion of exposed skin within the sensor field of view. Therefore, device design is optimized to scale down the detection threshold to ~100 nW. The efficiency of the bimaterial thermal actuators can be optimized by varying the geometry and employing metals or alloys with high thermal expansion coefficients (such as zinc, which is characterized by 30% higher expansion coefficient and 50% larger Young's modulus than aluminum). The thermal resistance of the structure can be increased by using hollow structures for the thermal isolation links while maintaining a relatively high stiffness of the entire folded structure. Another important aspect of the ZIR sensor is its high reliability. The IR switches have a maximum lifetime higher than one million cycles based on the numerous reliability studies reported for micromechanical switches with the same contact material. Assuming the ZIR sensors switch 100 times per day, a lifetime of one million cycles is sufficient for the devices to operate ~30 years. Thanks to the built-in temperature compensation mechanism and the spectrally selective IR absorption of the device, the demonstrated prototypes are characterized by an extremely low false alarm rate. Vacuum-packaged ZIR sensors with UHF passive RFID tags can be used for wireless readout (FIG. 16).

Micromechanical photoswitches (MPs) can exploit IR signature emissions from targets of interests to form an electrical channel between the device terminals via thermomechanical coupling. An MP can be placed in between a battery and active electronics, such as shown in FIG. 16, to eliminate power consumption when there is no event of interest. It is only when the absorbed IR power exceeds the designed threshold level (e.g., ~500 nW) that the mechanical switch is closed to supply power to the active electronics.

In the present device, a 2-μm silicon dioxide ($SiO_2$) slab backed by a metal reflector is employed as the IR absorbing element in an optimized micromechanical photoswitch for ultra-low threshold IR detection in the LWIR range (FIG. 18). Replacing the plasmonic absorber used in previous devices for narrowband mid-IR absorption, this broadband dielectric absorber exploits the intrinsic absorption of the $SiO_2$ layer. The intrinsically high loss of $SiO_2$ slab due to vibrational modes of longitudinal-optical (LO) phonons leads to a consistently high broadband absorption in LWIR specifically suitable for human detection applications [9].

To improve the detection threshold, two approaches were adopted. First, the thermal sensitivity of the bimaterial actuating beams is increased by optimizing thickness ratio of aluminum (Al) and $SiO_2$. Different from previous devices, the present device employs 1-μm thick Al on a 2-μm thick $SiO_2$ material as shown in the bottom left inset of FIG. 2. This ratio in fact corresponds to the maximum thermal sensitivity (1.44 nm/nW, corresponding to more than 15% increase compared to previous demonstrations) for a fixed 2-μm $SiO_2$ layer (FIG. 3).

The contact-gap is scaled down to reduce the actuation threshold. The smaller contact-gap was defined by the thickness of amorphous silicon layer, which serves as a sacrificial layer between the Pt contact and the electrical terminal on the opposite head [4]. It is worth noting that, although the contact gap can be in principle arbitrarily scaled within fabrication limits, a small gap yields an insufficient restoring force, causing stiction of the contacts. In the present device, however, stiction-free contacts are achieved, despite the aggressive gap scaling, thanks to the optimization of the bimaterial beams, which not only increased the thermal sensitivity but also the overall stiffness of the folded beam structure (~0.033 nN/nm). Compared to the previous demonstration of narrowband MPs in [4], the optimized bimaterial design led to more than 15% increase in maximum thermal sensitivity and at the same time, the beam stiffness increased by more than 30% (FIG. 4).

Figure 7:
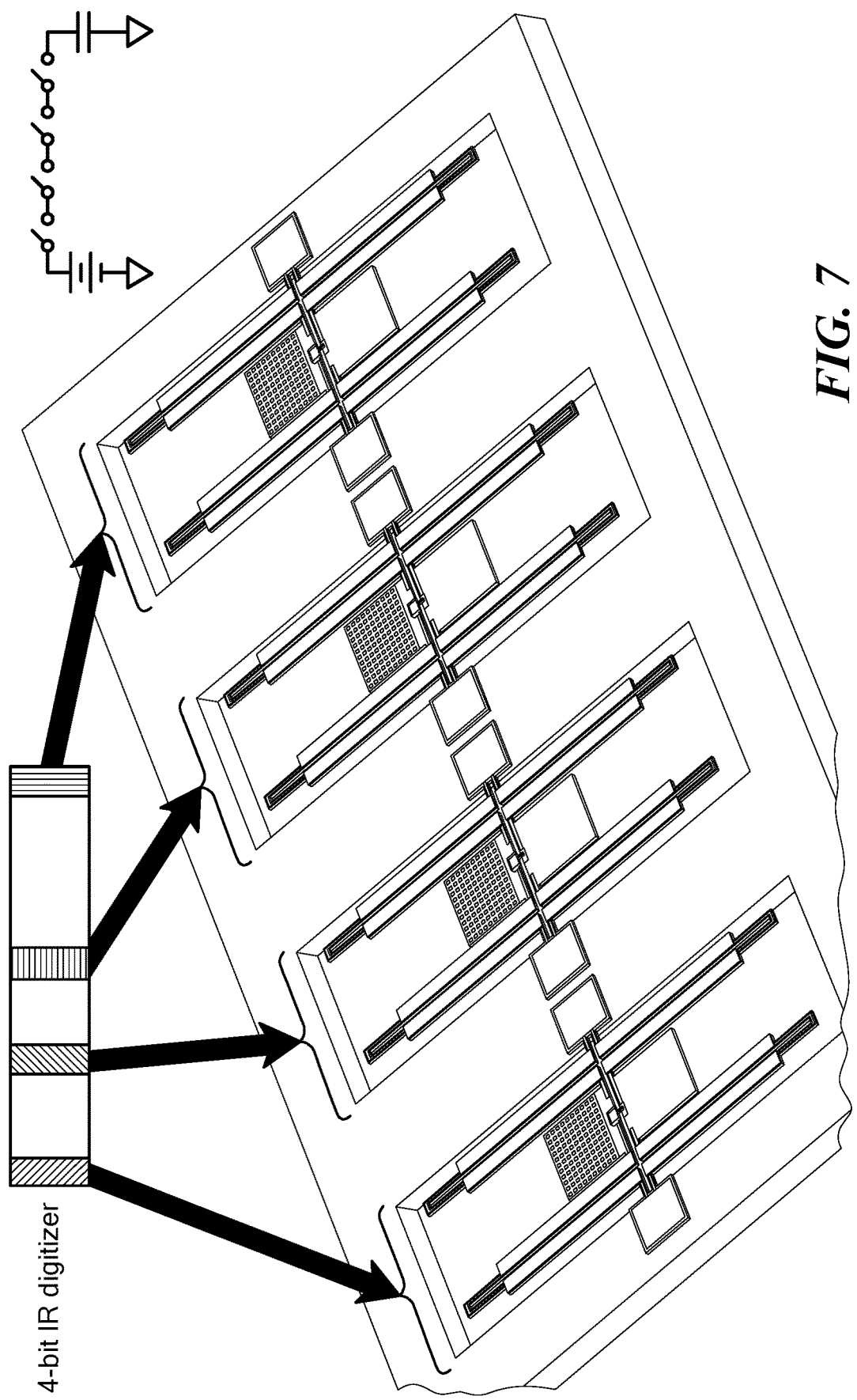
FIG. 7 is a schematic representation of a 4-bit IR digitizer containing four zero-power infrared sensors are placed in series. The plasmonic head of each of the sensors is tuned to a different range of the IR spectrum, providing 4-bit IR spectral resolution.

Engines that burn gasoline or diesel fuels emit specific compounds in their exhaust gases. Among these compounds are $CO_2$, CO, $H_2O$, various oxides of nitrogen and sulfur (NOx and SOx, respectively), and hydrocarbons such as methane. As a result, the infrared emission spectra of the heated tailpipe gases coming out of vehicles such as trucks, cars or aircraft can by themselves act as a signature specific to a vehicle type. By tuning absorption as illustrated in FIG. 7, the MPs can be utilized to detect specific types of vehicles with high sensitivity.

The MPs can be designed to detect targeted humidity conditions instead of targeted IR conditions, or both. FIG. 15 illustrates an inner actuating beam (or outer compensating beam) that has a substrate layer comprising aluminum and a second material with a second coefficient of expansion to humidity, the second material being a polymer that expands and contracts in correlation to increasing and decreasing humidity. The second material can include polymers of a plasma-polymerized methacrylonitrile. The present zero-power humidity digitizing sensor consists of a moisture-actuated micromechanical relay (FIG. 15). The cantilever bends in response to an increase in the humidity level, due the moisture induced expansion in the polymer thin film [5]. Packaging solutions similar to the ones used for MEMS microphones can be used to provide mechanical protection to the sensors while exposing it to the surrounding atmosphere. Moisture induced bending of a 350 μm long Plasma-Polymerized Methacrylonitrile (PP-MAN) beam has been demonstrated showing ~4 μm displacement in response to a relative humidity change of 1% [5]. The MPs can be designed to target changes in temperature within a range or ranges. FIG. 14 illustrates an inner actuating beam (or outer compensating beam) that has a substrate layer comprising silicon dioxide and a second material with a second thermal coefficient of expansion comprising aluminum. In the examples illustrated in FIG. 14 and FIG. 15, the first head and the second head do not require a plasmonically-enhanced absorber (FIG. 4) and can include a reflector or a neutral mount for an electrical contact. Temperature sensor: The zero-power temperature digitizing sensor consists of a temperature-triggered micromechanical switch (FIG. 2c) based on the technology platform developed by the Rinaldi group. The temperature sensor can be sealed in a hermetic package thermally connected to the surrounding environment. Thermally-sensitive bimaterial beams with a sensitivity of 500 nm/° C. were demonstrated, which is sufficient for the scope of this project: the critical temperature of a transformer indicating impending failure (~200° C.) would induce a vertical displacement of the cantilever head sufficient to close the switch contacts.

Figure 17:
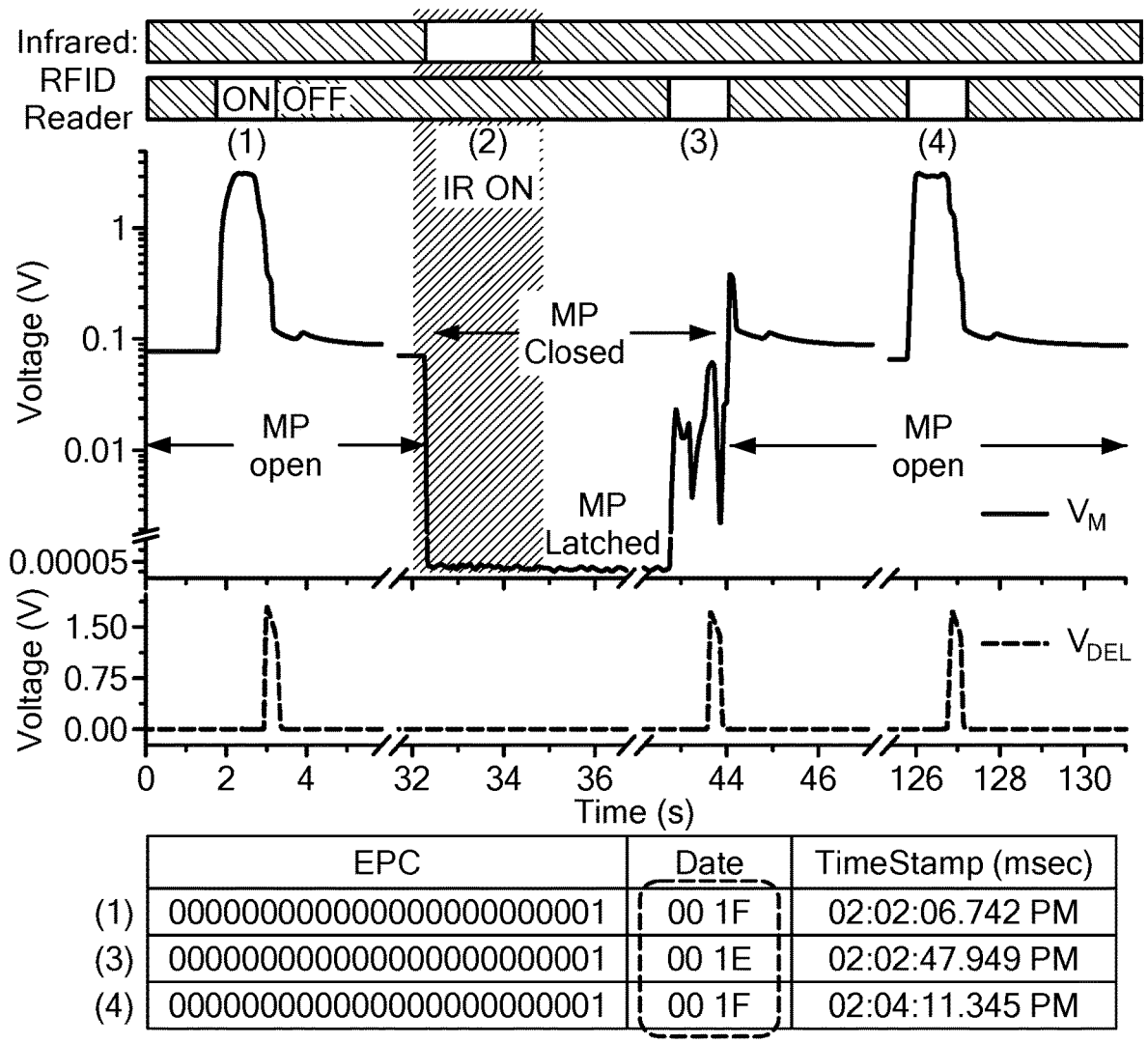
FIG. 17 shows a plot (top) illustrating latching of the electrical contacts and unlatching using a heater.

By utilizing a combination of, for example, humidity, temperature, and IR sensing, complex monitoring of equipment can be accomplished in far away or hard to reach places. FIG. 17 illustrates monitoring of a power station or a power distribution station. Battery-less (FIG. 17, right) power substation and switchyard monitoring utilizing infrared sensor tags, temperature sensor tags, and humidity sensor tags. At the top left of FIG. 17, zero-power digitizing sensors (IR, temperature, and humidity) are illustrated with a low power radio and a coin battery, with the radio only consuming power when the target IR, temperature, and humidity conditions are met.

The present technology includes a single-chip zero-power sensor cluster capable of responding to variations in the intensity of infrared radiation, temperature and humidity above alarm thresholds, which are the three major contributing causes of failure in an electrical grid (over 50% of grid failures) [1]. Such a single chip, zero-power digitizing sensor suite can be used to implement: (1) A zero-standby power battery-powered wireless sensor, with >10 year lifetime, that broadcasts real time alert wireless signals in response to the environmental signal induced OFF-to-ON state transitions of the switches (i.e. upon detection of a signal intensities above the alarming thresholds). In this configuration, the switches separate the system battery from a low power wireless radio transmitter (FIG. 1). When the switches are in the OFF state (i.e. failure indicator intensity levels below alarm thresholds) the battery is completely disconnected from the wireless transmitter (the switch contacts are physically separated by an air gap) resulting into a zero-leakage current (i.e. zero-standby power consumption, differently from any existing solid-state sensors). When the intensities of the monitored environmental signals equal or exceed the predetermined alarm thresholds the micromechanical relays are exposed to actuation forces sufficient to mechanically close the device electrical contacts and create a low-resistance electrical path between the battery and the radio transmitter, which triggers the transmission of a RF wireless alert signal. Therefore, the sensor consumes power to transmit data only when useful information is presents (i.e. appearance of a failure indicator) without wasting any energy when the monitored equipment is in good health. Thanks to the complete elimination of the standby power consumption, this approach results in the implementation of "deploy-and-forget" wireless sensors capable of revealing 1000s of failure events without ever replacing the battery. (2) A battery-free sensor RFID tag (FIG. 1) that, when interrogated with a wireless RF signal, reveals the appearance of failure indicators by backscattering to the RFID reader information about the OFF/ON states of the switches (i.e. information about whether the intensities of the environmental failure indicators are above or below the alarming thresholds). This approach results in the implementation of completely passive, "deploy-and-forget" tags that do not require the installation of batteries inside the panel of the energized equipment and that can be remotely interrogated, at a distance of few meters, to reveal information about the health of the monitored equipment without requiring the operators to physically access and shut down the equipment. Both systems will be packaged in completely self-sustained coin-size wireless units that can be easily retrofitted inside the panels of energized equipment without the need of electrical or optical feedthroughs. Thanks to the unique combination of small footprint, low manufacturing cost, nearly unlimited lifetime, and wireless communication capability, many of such wireless sensor units can be deployed nearly everywhere throughout the power grid enabling continuous and ubiquitous health monitoring with minimum deployment and maintenance costs.

In addition to monitoring power substations or power stations, the single-chip zero-power sensor clusters can be distributed in a factory, an airliner, a remote building, a large piece of heavy machinery, a ship, an oil platform, a petroleum refinery, a pipeline, a railway, an airliner, a drone, an antennae, or a beacon.

Figure 10:
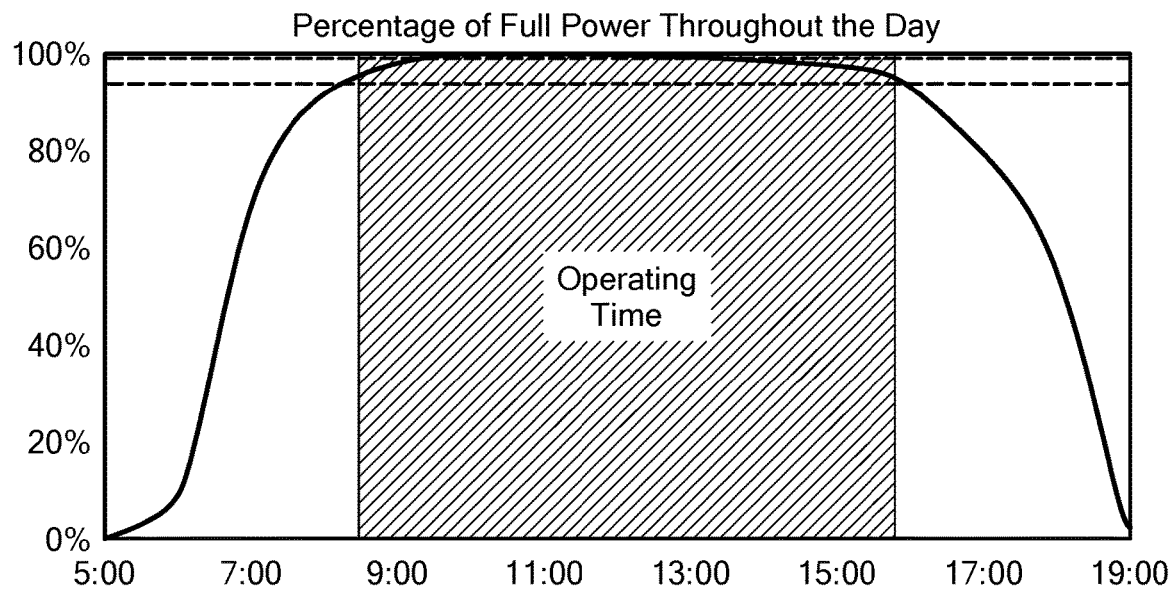
FIG. 10 illustrates a schematic representation of a system for monitoring leaf IR reflectivity as a measure of plant water stress. Sun-exposed IR sensors having normally-open and normally closed switches arranged in series establish the lower and upper power limits, respectively, while a sensor protected from direct sunlight and having a normally open switch measures reflected IR from leaf surfaces. The system operates only during hours of sufficient illumination power, as shown in the graph on the left.
Figure 10:
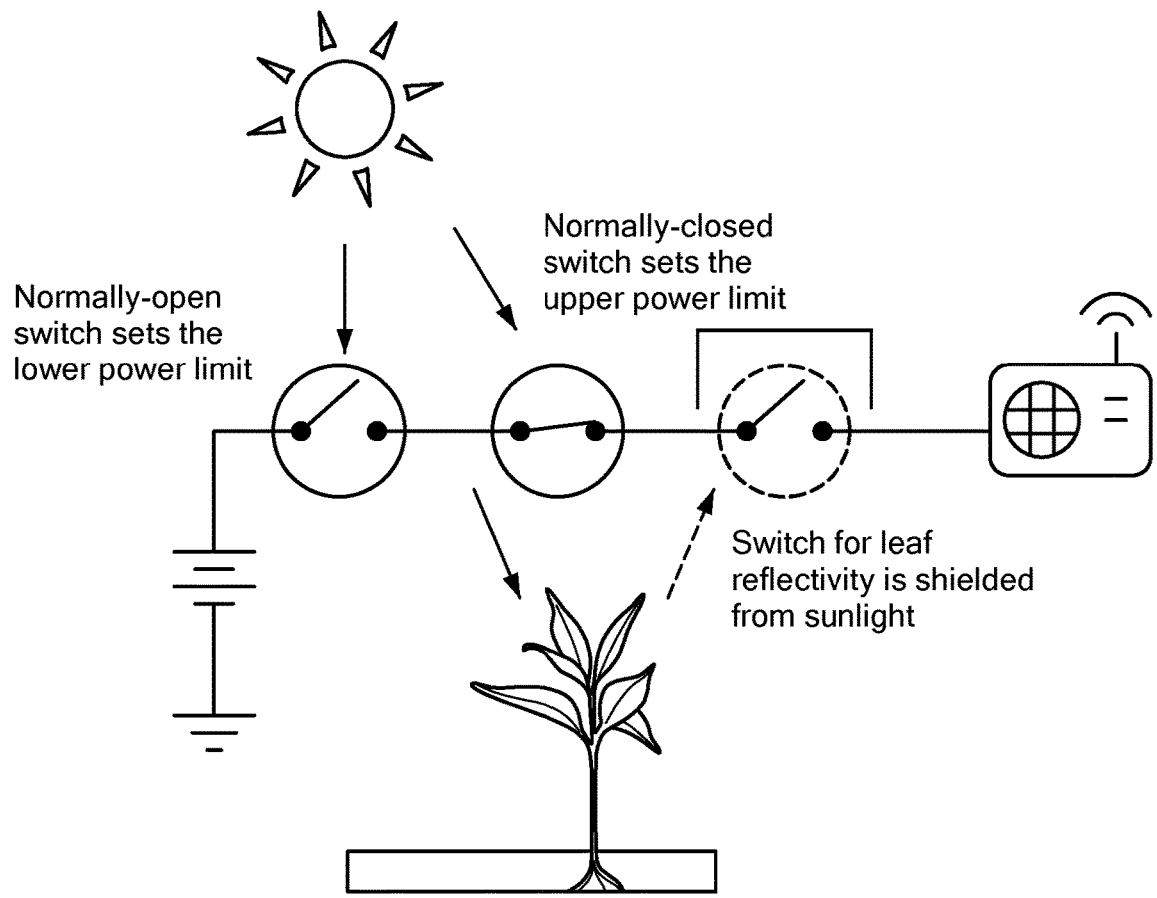

The MPs' contacts (FIG. 1) are typically designed to reopen themselves when above-threshold IR radiation is removed, which is accomplished using a sufficiently-large contact gap to ensure a restoring force larger than contact adhesion forces. The spectral response of a fabricated device was characterized using a Fourier Transform Infrared Spectroscopy (FTIR) microscope. The reference was first measured on the gold reflecting head, then the reflection (R) of the $SiO_2$ dielectric absorber on the absorbing head was measured. Since the optically-thick (~100 nm) continuous Pt plate underneath efficiently suppress the transmitted power (transmittance, T), the absorptance (A) can be calculated as follows assuming negligible transmittance: $A=1-R-T\approx 1-R$. The fabricated dielectric absorber exhibits the absorption as high as $\eta$~98.8% at $\lambda$=11.3 µm and consistently high absorption ($\eta$>80%) in the wide LWIR regime ($\lambda$=8-14 µm) (FIG. 19). The measured absorption shows a good spectral overlap with the emission spectrum of a blackbody at 37° C. (closely representing a human body), which guarantees an effective sampling of the emitted IR power from a human body. FIG. 10 illustrates measured current (using a sourcemeter with a 10 mV bias) through the zero-power infrared (ZIR) sensor in response to chopped IR radiation emitted by a calibrated blackbody source.

Figure 6A:
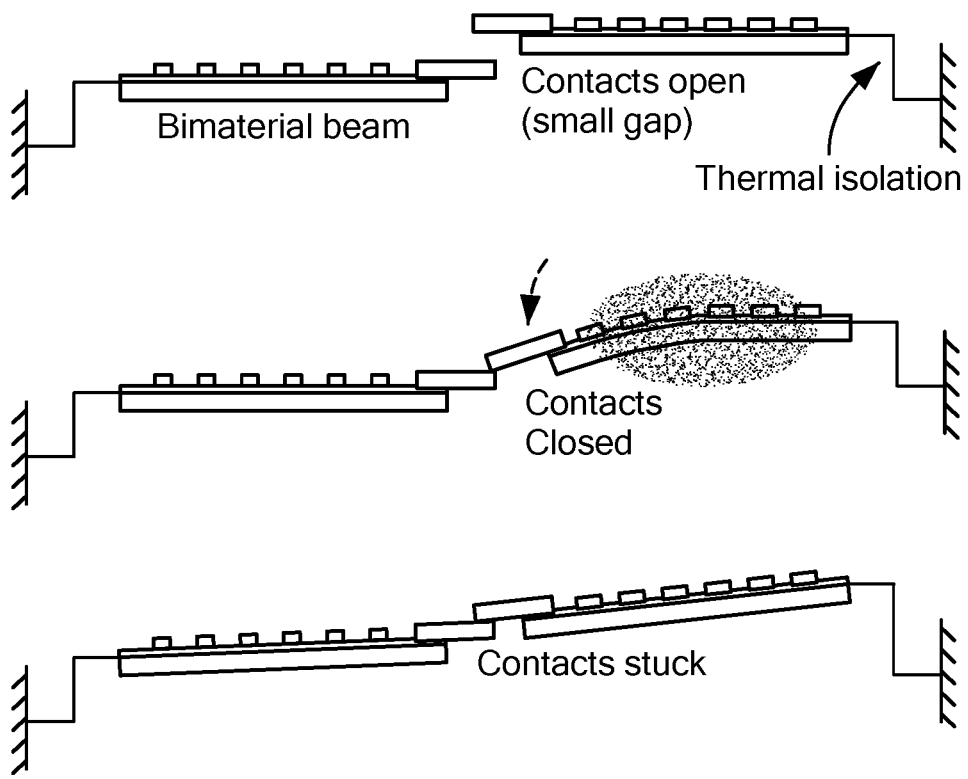
FIG. 6A illustrates a switch closing process in which the contacts close in response to IR radiation absorbed by one head, after which the contacts remain stuck together due to adhesive forces or due to latching together.
Figure 6B:
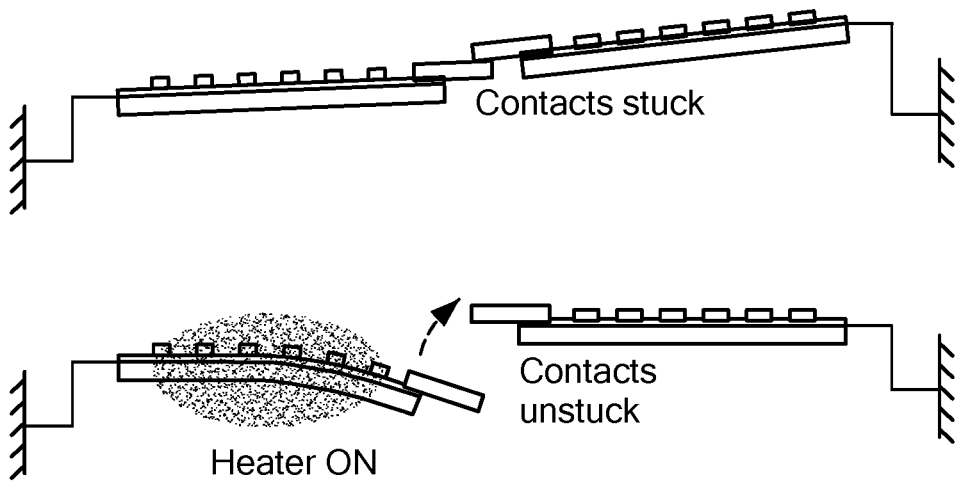
FIG. 6B illustrates a process of releasing the contacts through activation of an electrical heater in the other head of the device, causing the actuating beams to bend downward and open the contact junction.

In the present technology, the contact gap is intentionally reduced (~340 nm, which can be controlled by a sacrificial layer) allowing the adhesion force to latch the contacts after the MP's exposure to targeted IR radiation (FIG. 6A). This latching MP can be connected to the general purpose-input/output (GPIO) port of a commercially-available RFID microchip [3] and can be programmed to return the GPIO state when the tag is interrogated by a reader [4]. Furthermore, a timer-circuit [5] powered by the energy harvested from the reading signal is used to generate a delayed pulse to activate a micro-heater integrated in the MP to auto-reset the contacts after data extraction.

The fabricated latching MP was tested with filtered blackbody radiation in a vacuum chamber. It was connected to the RFID tag while a USB-powered RFID reader was used to interrogate the tag remotely (~3 m away) and detect the backscattered RF signal containing GPIO port state ('1'-open, '0'-closed). A sourcemeter was connected across the MP to verify its state. When interrogated by the reader before and after above-threshold IR exposure (~830 nW), the tag returned '1' and '0' respectively (FIG. 4). A subsequent interrogation, without additional IR exposure, resulted in a returned state '1'-open indicating that the auto-reset reopened the MP at the end of the previous interrogation as designed (FIG. 11).

Figure 11:
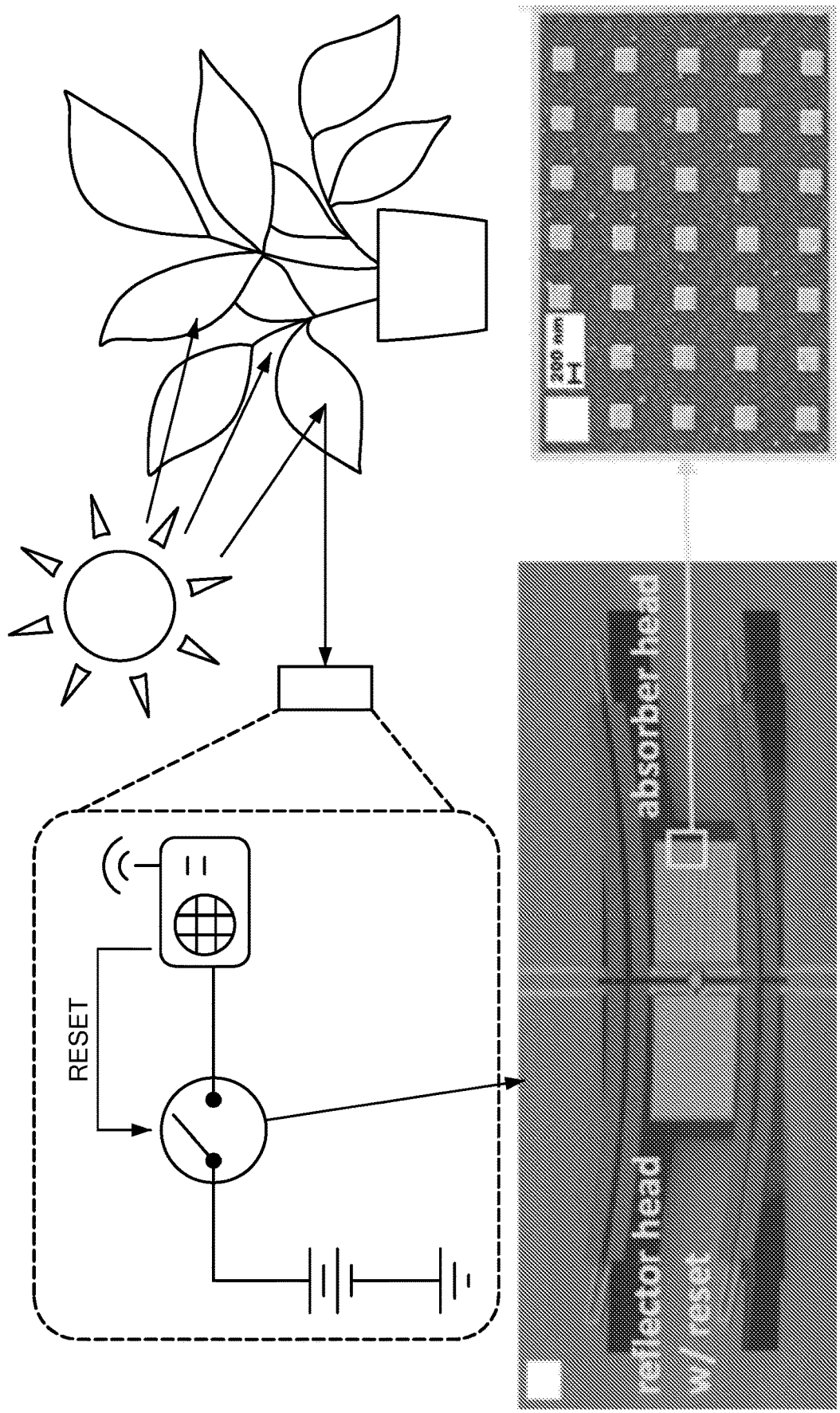
FIG. 11 shows a schematic representation of a resettable system for monitoring plant water content using field deployed zero-power infrared sensors, each having an IR-tuned plasmonic absorber head and a reflector head outfitted with a heater for reset. According to the circuit shown at upper left, the IR-activated switch connects the battery to a wireless transmitter, which can be used to trigger an automated irrigation system. The switch remains otherwise OFF, extending battery life. After the watering cycle, the IR sensor is reset using the reset mechanism (heater). At bottom left, an SEM image shows a suitable zero-power infrared sensor is shown for use with the system; a close-up of the absorber head is shown at lower right.

FIG. 11 is a plot (top) illustrating latching of the electrical contacts and unlatching using a heater at the head 2 position; at time (1) the IR is OFF, the RFID reader is ON, and the micromechanical photoswitch (MP) is open; at time (2) the IR is ON, the RFID reader is OFF, and voltage drops and remains at ~50 µV as the MP (3.3 kΩ) is now latched indefinitely (until reset) and in parallel to 8.1 MΩ; at time (3) IR OFF, reader ON, the $V_{DD}$ is activated and $V_M$ rises but is within the voltage range interpreted as input ON (i.e., close to 0V); the heater resets the MP to open at the end of the read; at time (4) IR OFF, reader ON—the MP is open. At the center plot of FIG. 11, the measured heater voltage $V_{DEL}$: appears as ~0.2 s pulses since $V_{DEL}$ is asserted only 1 s after power-up and the timer is powered only until the end of the read duration (1.2 s). At the bottom of FIG. 11 is a screen shot of the screenshot of the RFID reader software on a laptop showing the GPIO port data (see FIG. 12).

Figure 12:
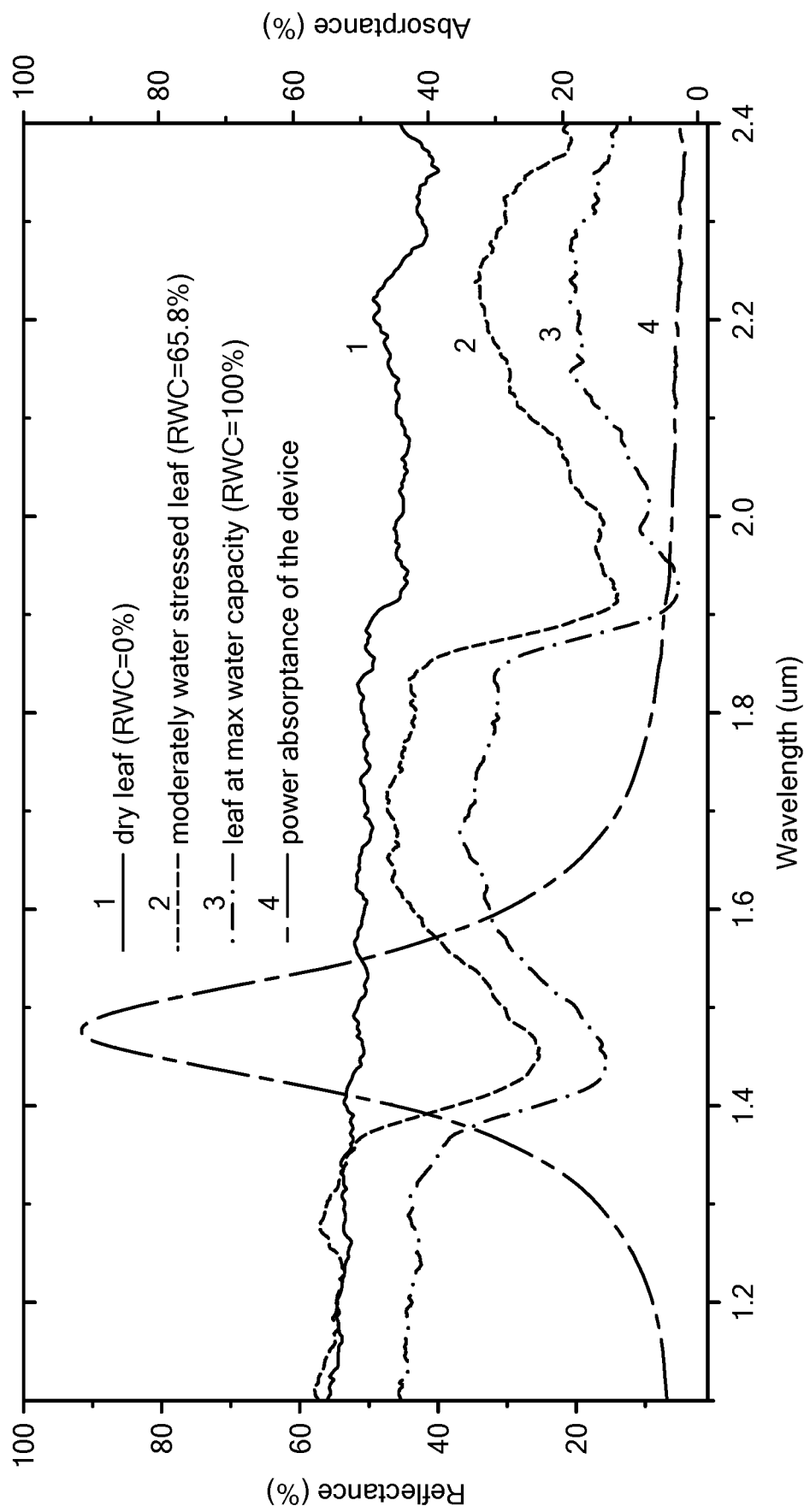
FIG. 12 shows Fourier transform-IR (FTIR) spectrometer measurements of the absorptance of a zero power IR sensor of the present technology (93% at 1.47 µm, spectrum 4) and of the reflectance spectra of dry (RWC=0%, spectrum 1), moderately water stressed (RWC=65.8%, spectrum 2) and non-stressed (RWC=100%, spectrum 3) leaves. The absorption peak of the device matches the water valley region of the leaf spectra.

FIG. 12 illustrates a schematic of the RFID sensor tag used in FIG. 11. The MP is connected to one of the 5 GPIO ports of the microchip. A sourcemeter is set to source 10 nA across the port while measuring voltage $V_M$. This, in parallel with the 8.1 MΩ resistor helps in observing the MP status change when the tag is unpowered. The 100 kΩ acts as a pull-up and current-limiting resistor for the MP. Thus, the GPIO port has a value 001F (11111) for MP open and 001E (11110) for closed. The timer-circuit shares the same supply and when turned ON, sends a 3 V pulse to the heater after a 1 s delay to automatically reset the MP.

Figure 21:
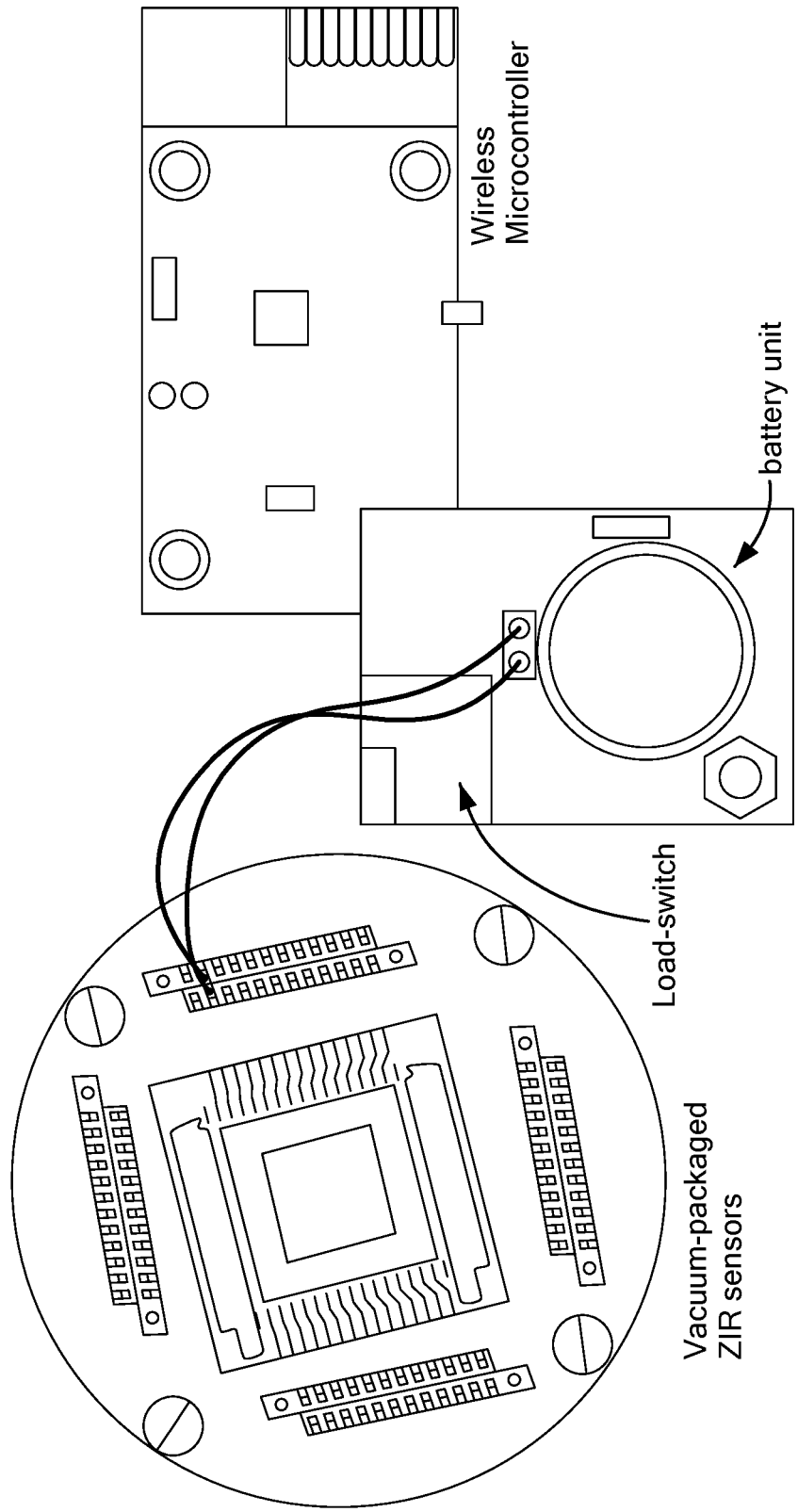
FIG. 21 shows a zero power IR sensor system. The sensors are placed inside a vacuum package. A battery unit is illustrated at center with a load-switch. A wireless transmitter is illustrated at right.

The ZIR sensors can be provided with RFID circuits or with batteries and transmitters, for example. FIG. 16 illustrates a ZIR sensor on the left. The ZIR sensor can be placed inside a vacuum package. A battery unit is illustrated at center with a load-switch. A wireless microcontroller is illustrated at right. When plasmonically-enhanced absorbing heads are utilized, broadband or narrow-band absorbance can be used, and FIG. 21 illustrates some examples of wavelengths that can be specifically absorbed by plasmonic heads. As a non-limiting example, FIG. 22 illustrates various IR wavelengths useful for ZIR sensors.

EXAMPLES

Example 1: Zero-Power Leaf Temperature Sensors

When leaves suffer water stress, their stomata are closed, which results in a reduction in evapotranspiration. Consequently, heat is trapped in the leaf making its temperature higher than the surroundings (up to about 10° C.). It would be ideal to measure the temperature difference, indicating an irrigation need, in a non-contact manner by detecting the radiation emitted by the water-stressed leaves in the long wavelength infrared (LWIR) spectral range. To attempt the measurements, zero-power (LWIR) thermal sensors were prepared. The thermal sensors were planned and then designed to selectively harvest the energy contained in the broadband LWIR radiation and to use it to mechanically create a conducting channel between two electrical contacts (i.e. a large and sharp OFF-to-ON state transition with ON/OFF conductance ratio $>10^{12}$ and a practically infinite subthreshold slope) when the strength of the leaf heat signal is above a predetermined threshold, without the need of any additional power source.

Zero-power IR digitizing sensors with an ultra-low IR detection threshold of about 100 nW have been experimentally demonstrated [12, 13] and exploited for a first prototype of a palm-sized IR wireless sensor node with near-zero standby power consumption of ~2.6 nW (>1900× improvement overstate-of-the-art) [14]. The demonstrated prototypes have already been proven to be sufficiently reliable for an application of the present technology, and over 8000 consecutive on/off cycles without failure were demonstrated [11]. These capabilities were utilized for the design and implementation of a zero-power thermal sensor capable of identifying the appearance of a temperature hot spot, 5° C. higher than the ambient temperature, (a hot spot temperature difference compared to ambient temperature), within a short distance (≤1 meter). To maintain a large thermal isolation, the device was vacuum packaged in a hermetic package with an IR transparent window.

Figure 24:
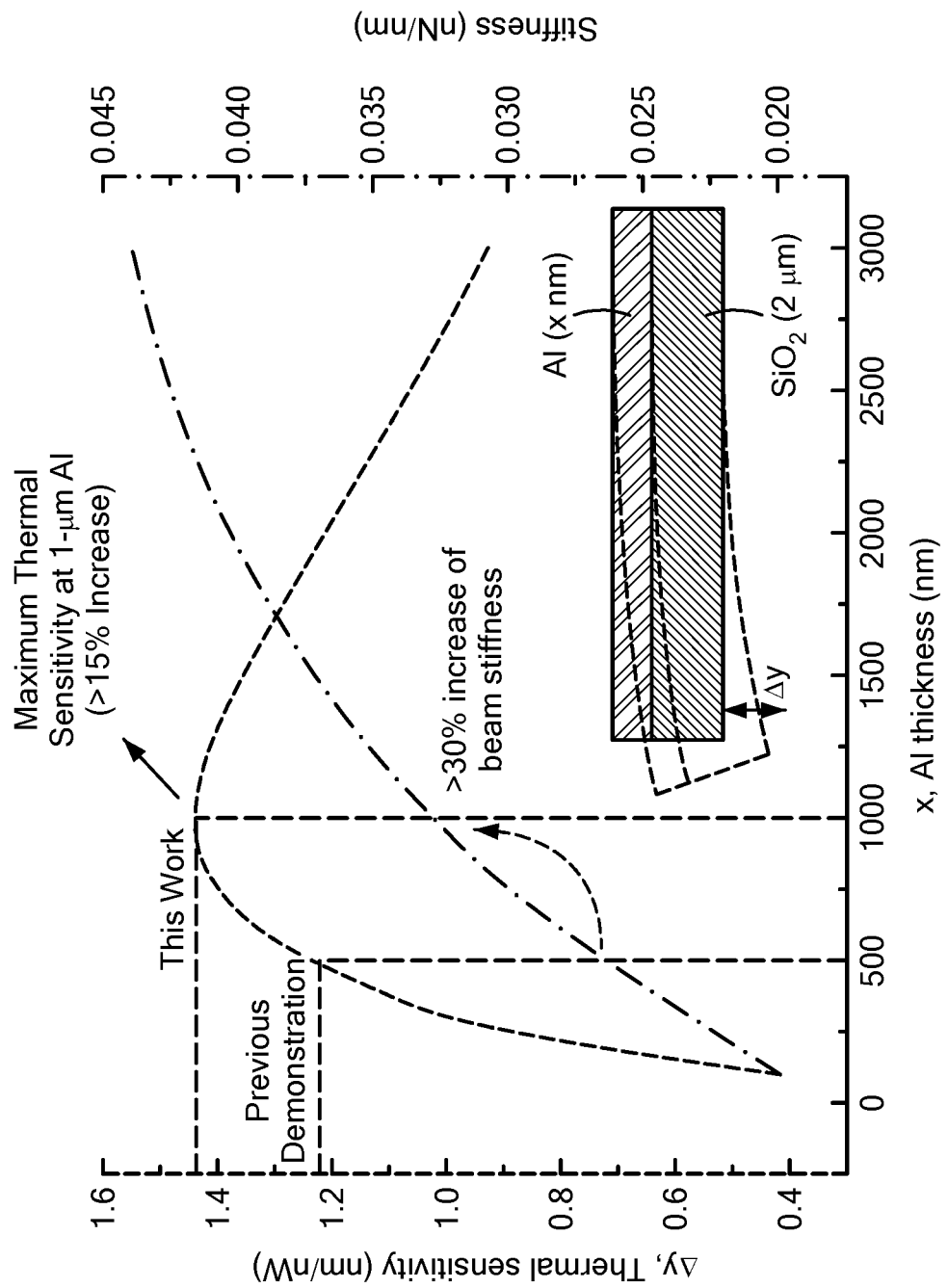
FIG. 24 shows a plot of thermal sensitivity (left y-axis) and beam stiffness (right y-axis) of the biomaterial legs as a function of the Al thickness for a fixed $SiO_2$ thickness of 2 µm. The vertical displacement, Δy, per unit absorbed IR power, is maximum for an Al thickness of 1 µm.
Figure 25:
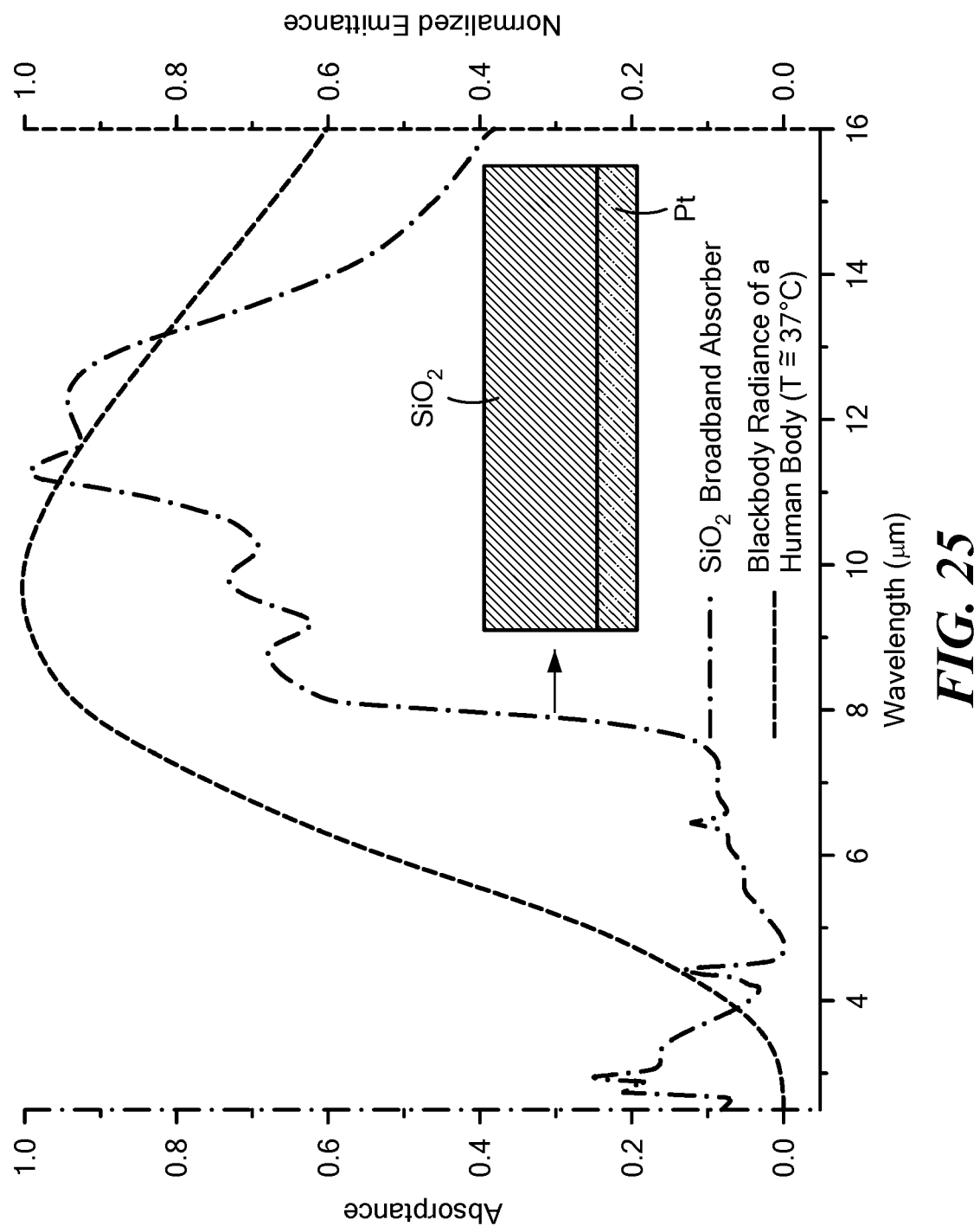
FIG. 25 shows the spectral response of the broadband $SiO_2$ absorber in LWIR (bottom curve with peaks at about 4.5 and about 6.5 µm, left y-axis) and the normalized blackbody emission (human) at 37° C. (top smoother curve, right y-axis). The inset shows the cross-section schematic of the broadband $SiO_2$ absorber with Pt layer.

A theoretical analysis was conducted. Based on radiative and conductive heat transfer between plant leaves (1 m² in area), the sensor, and the environment, the analysis showed that a switch triggering threshold of ~45 nW would be required to detect a leaf temperature rise of 5° C. at a distance of ~1 m for a given ambient temperature of 20° C. FIG. 9 shows a plot of required threshold (nW) versus difference in leaf temperature, above ambient. For design of the photoswitch, it was assumed that the photoswitch has a nearly-perfect spectrally-selective absorption in the 8-12 μm IR spectral range (around the emission peak) with an IR absorbing area of 150 ×150 μm². The performance level already achieved with existing prototypes (threshold ~100 nW and absorptance ~80%) had indicated that the performance metrics required for leaf temperature monitoring could be achieved with technology optimization and development testing. For example, the device design was optimized to scale down the detection threshold to ~40 nW. Efficiency of the bimaterial thermal actuators was optimized by varying the geometry and employing metals or alloys with lager thermal expansion coefficients (such as zinc, which is characterized by 30% higher expansion coefficient and 50% larger Young's modulus than aluminum). The thickness and coating of a second material on the biomaterial thermal actuators was optimized, along with the thickness of the first, substrate material, and FIG. 24 shows a plot of the maximum thermal sensitivity achieved for aluminum at a thickness of about 1 micron. Thermal resistance of the structure was increased by exploring hollow structures for the thermal isolation links while maintaining a relatively high stiffness of the entire folded structure.

Figure 34A:
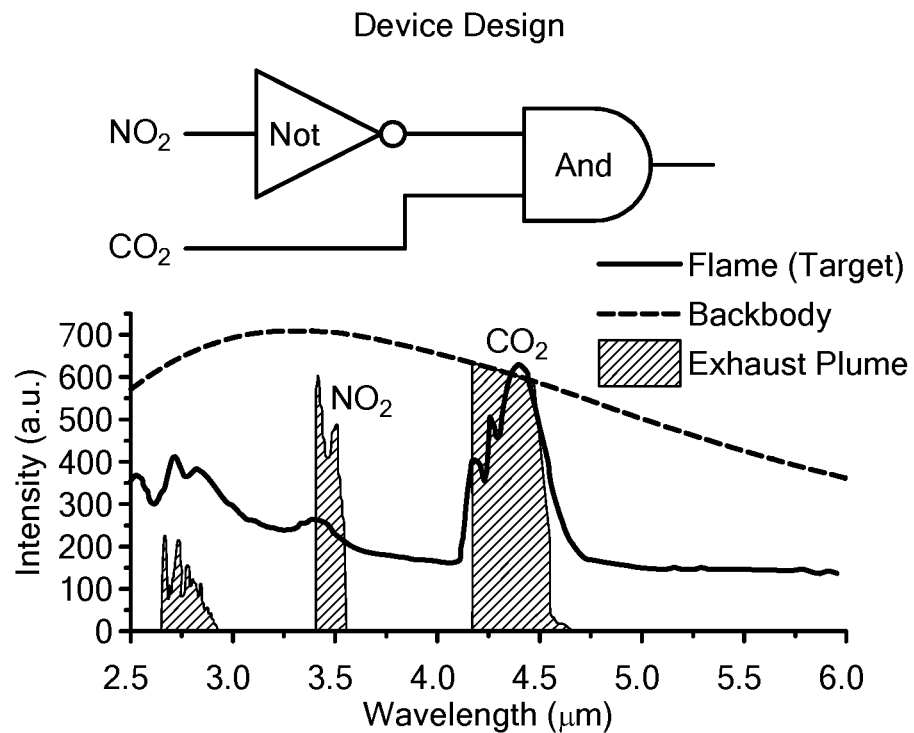
FIG. 34A shows an embodiment of a device containing a logic circuit utilizing two zero power IR sensors. The circuit diagram at the top shows that the device detects the absence of $NO_2$ combined with the presence of $CO_2$, useful for detecting flame but not an exhaust plume of an internal combustion engine. Infrared emission spectra in the MWIR region (3-8 µm) are shown for a flame, an exhaust plume, and a blackbody.
Figure 34B:
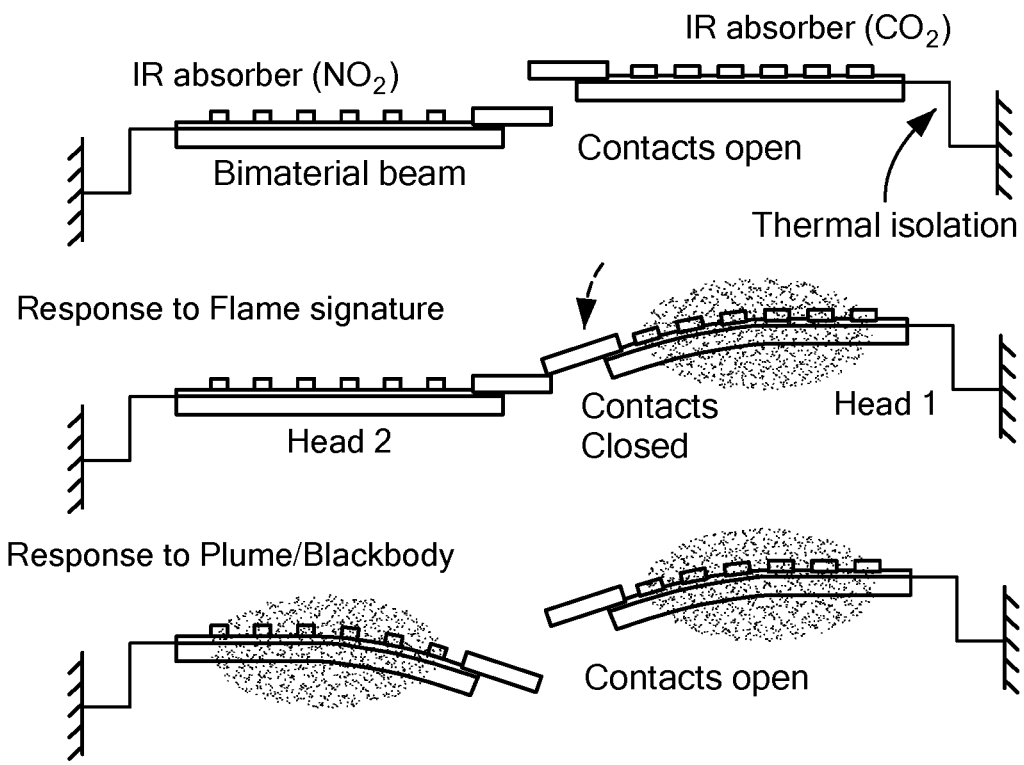
FIG. 34B illustrates the beam and contact configurations of a single zero power IR sensor that performs the logic operation depicted in FIG. 34A. The device has one plasmonic head responsive to IR emissions from $CO_2$ and a second plasmonic head responsive to IR emissions from $NO_2$. At the top panel of FIG. 34B, no IR has been absorbed. In the middle panel of FIG. 34B, IR from $CO_2$ emissions has been absorbed but not from $NO_2$, and the contacts have closed. In the bottom panel of FIG. 34B, IR has been absorbed from both $CO_2$ and $NO_2$, causing the contacts to remain open.

It is worth noting that the potential presence of other heat sources in the crop field (e.g. animals and exhaust plume of fuel burning vehicles) could cause false alarms. In order to reduce possible interferences from high temperature sources with unique IR signature such as exhaust plumes, the spectral selectivity of the photoswitch can be engineered to reject IR radiation in the MWIR spectral range (FIG. 34A, FIG. 34B). Several photoswitches can be connected in series (or parallel) to avoid false alarms (FIG. 8, top right). The possible interference from animal heat signatures can be mitigated by using proper optics and data processing at the receiver end. For example, by exploiting the differences in size between different kind of warm objects (mice/marmot vs leaves on brunch) and the hot spot appearance pattern (sudden and isolated in scattered locations vs slowly developing in relatively large and correlated areas). At the bottom center of FIG. 8, a schematic illustration of leaves with the hot spot appearance pattern is shown. At the bottom right of FIG. 8 is illustrated a focusing lens for a broadband thermal IR detector directed towards the leaves with the hot spot appearance patterns. A schematic of the broadband thermal IR detector's switch is shown at the bottom right of FIG. 8 in series with a radio transmitter.

Example 2: Zero-Power Multispectral Leaf Reflectivity Sensors

Leaf moisture content is a direct indicator of plant stress that affects leaf reflectance in the short wavelength IR (SWIR) (1.3 μm-2.8 μm) and mid wavelength IR (MWIR) (4

μm-5.5 μm) regions [5]. The reflectivity of the leaves in SWIR spectral range increases by 20% when the water content reduces from 50% to 5% [7]. Therefore, spectral IR imaging of leaves can reveal the irrigation need of plants. Nevertheless, hyperspectral cameras are bulky, require advanced operator training, and they extremely costly (tens of thousands of dollars per unit). Therefore, they cannot be effectively employed to continuously monitor large areas with high spatial resolution while guaranteeing a sufficient return of investment for the farmers.

Low-cost small arrays of plasmonically-enhanced micromechanical photoswitches designed herein are capable of performing a spectral analysis of the IR light reflected by the leaves without consuming any electrical power (FIG. 10). As shown in FIG. 10, the switch array separates the system battery from the radio. When the reflectivity of leaves in the relevant IR bands increases above an alarm threshold (due to water content reduction) the switch array connects the system battery to the radio to trigger a wireless communication signal activating the irrigation system, while keeping the radio completely disconnected from the power supply at all other times (i.e. zero-power consumption when the water content is within the acceptable level). The system can be operated either using an IR thermal source as an external probe to reveal the water content (i.e. the crop field could be scanned using a drone or other automated vehicles), or by exploiting the sunlight as a source of the IR radiation. The latter, greatly reduces system complexity (i.e. no external probes are needed) but it requires knowledge of the intensity of the impinging sunlight radiation to calibrate the switch triggering threshold since the radiation reflected by the leaves is function of both water content and the impinging sunlight intensity. Since the intensity of the impinging sunlight radiation varies depending on the time of the day and the atmospheric conditions, an in-situ calibration technique was required to guarantee that the zero-power sensor is operational only when exposed to a predetermined intensity of sunlight radiation.

Regarding the detection threshold, calculations based on solar irradiance data [20], show that, within the IR spectral range affected by water stress (e.g. 1.35-1.87 μm), for an average leaf reflectance increase of ~30% due to water stress [21], a power of ~480 nW would be delivered to a photoswitch having an IR absorber area of 150×150 μm². This is well above the minimum threshold demonstrated to date (~100 nW), allowing the use of these photoswitches for such an application.

Example 3: Measuring Leaf Reflectance as an Indicator of Plant Water Stress

A short wavelength IR (SWIR) micromechanical photoswitch (MP) operating at 1.47 μm with ~200 nW threshold was tested for capability of producing a digitized output bit when a soybean leaf starts showing an indicator of early-stage water-stress (e.g., surface reflectance reduced by 3.4%). The MP remains at zero-power consumption when the leaf has no indicator of early-stage water stress (when the leaf is healthy). An illustration of a system for measuring leaf IR reflectance is shown in FIG. 11. At the top left of FIG. 11 is a schematic illustration of the SWIR MP used for non-contact water stress detection in plants and an illustration of a wireless transmitter with the electrical contacts of the SWIR MP. Upon detection of IR radiation indicative of water stress, the switch connects the battery to a wireless transmitter to potentially trigger an automated irrigation system. The switch remains otherwise OFF, extending battery life. An SEM image of the fabricated MP is shown in the lower left of FIG. 11. The right cantilever has a SWR plasmonic absorber while the left one reflects IR and has an in-built microheater for resetting the electrical contacts, which latch after closing. At bottom right of FIG. 11 is a closer view of the plasmonic absorber.

Non-water-stressed plants have low leaf-reflectance in the SWIR region (1.3-1.6 μm) due to strong IR absorption by water in their leaves. This reflectance increases when the water content in leaves (widely quantified by their relative water content—RWC [2]) decreases. The increased IR energy in the light reflected off leaves was investigated as an indicator of plant water stress (FIG. 12) [3]. FIG. 12 shows a Fourier transform-IR (FTIR) spectrometer measurement of the absorptance of the fabricated device (93% at about 1.47 μm) and of the reflectance of a dry (RWC=0%), moderately water stressed (RWC=65.8%) and non-stressed (RWC=100%) leaf as a function of the wavelength. The absorption peak of the device (~1.47 μm) perfectly matches the water valley region of the leaf's spectra. Plasmonically-enhanced MP technology is suitable for monitoring such a slowly evolving optical indicator due to zero standby power and abrupt ON/OFF transition.

Example 4: Micromechanical Photoswitch Applied to Plant Reflectance Testing

Figure 13:
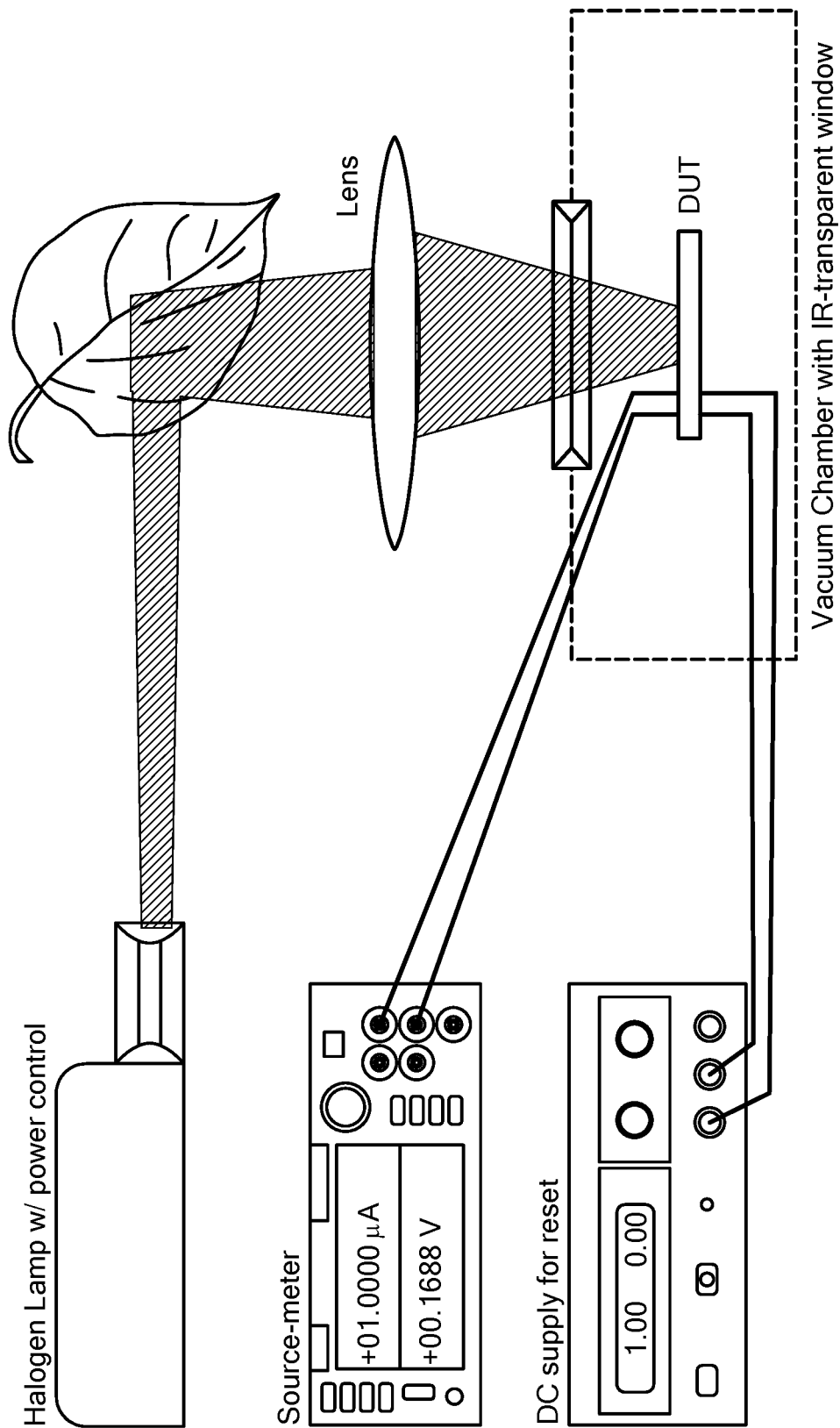
FIG. 13 shows a schematic of system for demonstrating the zero standby power SWIR leaf water stress detection. At top left is a quartz tungsten halogen lamp (sunlight simulator) used to illuminate a soybean leaf (diameter approx. 33 mm) placed at 45° to direct light to a lens and into a vacuum chamber containing a zero-power infrared sensor, the device-under-test (DUT). The DUT is connected to a source meter (used to apply a bias voltage, e.g., 11.21V, while monitoring the switch current, internally limited to 1 ρA) and to a DC supply used to power the on-device heater for reset.

The IR power reflected from a soybean leaf with varying RWC was first characterized (FIG. 13) using a halogen lamp as a sunlight simulator and a commercial IR sensor, from which the required MP threshold was found to be ~209 nW corresponding to an initial water-stressed state (RWC=65%). A fabricated MP with threshold fine-tuned to 209 nW by applying a bias voltage [6] was then used to replace the commercial sensor and sequentially exposed to soybean leaf samples with RWC from 100% to 0% while the current in the device was monitored. A schematic illustration of the experimental setup used to demonstrate the zero standby power SWIR leaf water stress detection is shown in FIG. 13. At the top left of FIG. 13 is illustrated a quartz tungsten halogen lamp (sunlight simulator); at the top right of FIG. 13 is a soybean leaf (of diameter ~33 mm) placed at a 45° angle to direct light to the MP, a lens and a vacuum chamber where the device-under-test (DUT) is placed (lower right, FIG. 13). The DUT is connected to a sourcemeter to apply the bias voltage of 11.21V while monitoring the switch current (internally limited to 1 μA) and to a DC supply to reset.

Figure 14A:
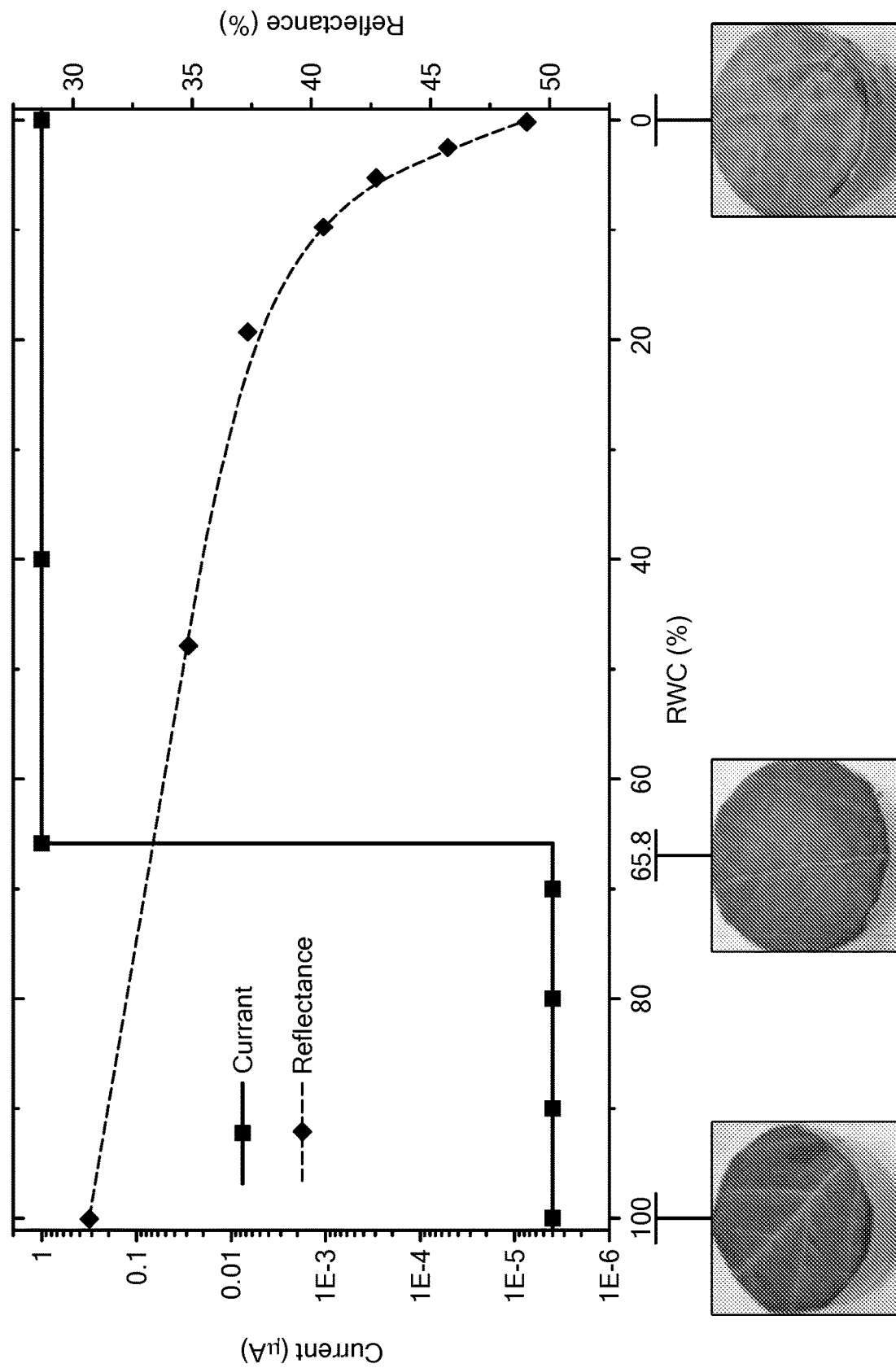
FIG. 14A shows experimental results of the current flowing through the shortwave-infrared (MR) micromechanical photoswitch and reflectance of the leaf as a function of the relative water content (RWC, X-axis) of the leaf. The reflectance was characterized, using an IR power sensor, as the ratio of the power received by the sensor from the leaf to the power received by the sensor when the leaf is replaced by a 99% spectralon reflectance standard. The photoswitch turns ON only when the leaf reaches the water stress level at which the soybean plant needs to be watered (RWC=65.8%). At bottom, is shown the tested soybean leaf at different RWCs (100%, 65.8%, and 0%).
Figure 14B:
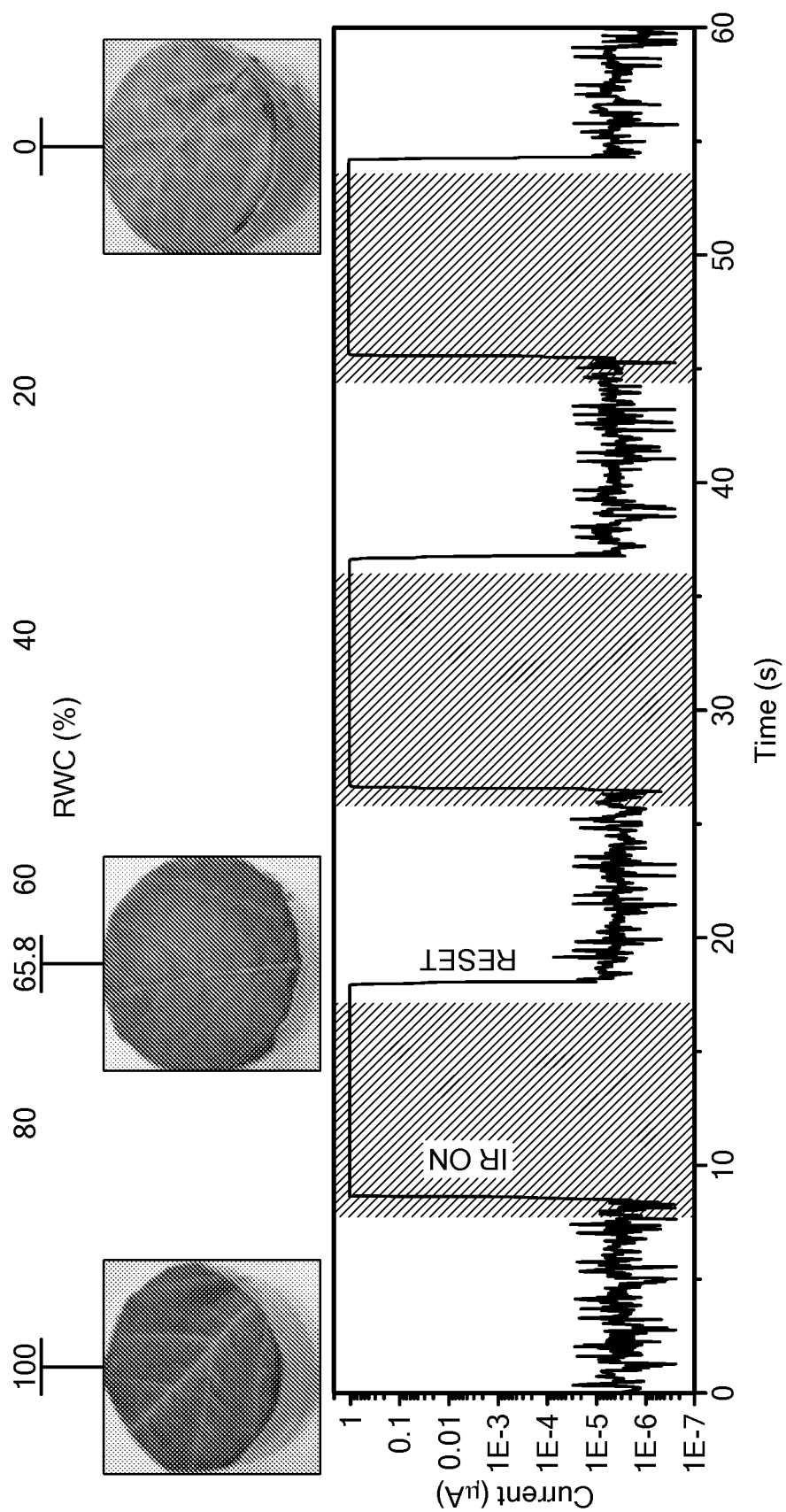
FIG. 14B shows the tested soybean leaf (from FIG. 14A) at different RWCs (100%, 65.8%, and 0%); measured current through the micromechanical photoswitch (MP) in response to chopped IR radiation reflected off the leaf at RWC=65.8% is shown at bottom. The photoswitch latches ON after each detection (pull-in voltage effect). A 1V pulse (~100 ms) applied to the reset heater (~50 kΩ) returns the switch to an OFF state until triggered ON again by above-threshold IR.
Figure 15:
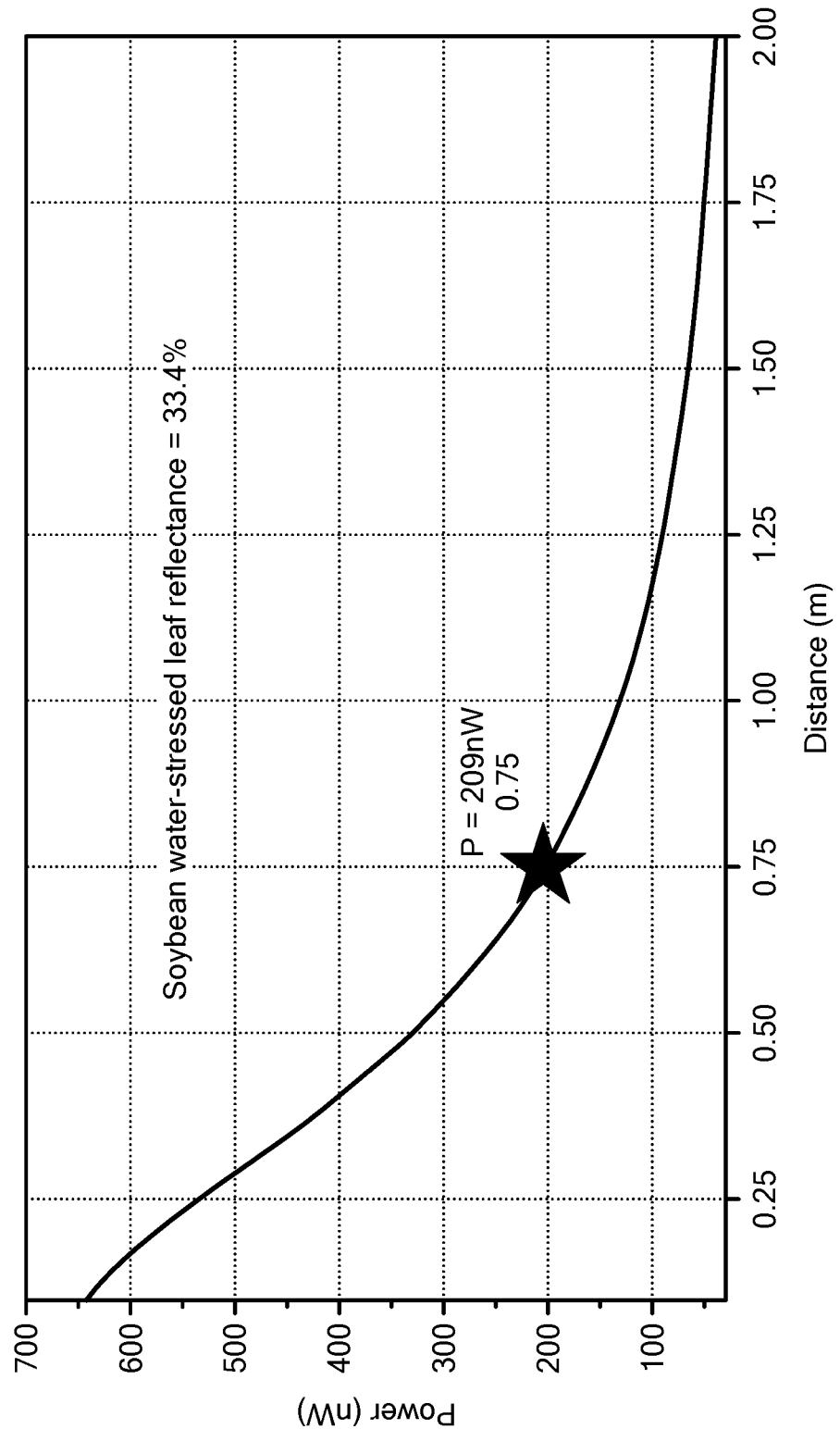
FIG. 15 shows predicted power reaching the micromechanical photoswitch as a function of distance from a leaf.

Though the reflectance change was small (ΔR about 3.4%) from 100% to 65% RWC, the device reliably turned ON only when exposed to samples with RWC 65% (FIG. 14A, FIG. 14B). An analytical model was also developed to assess the feasibility of deployment of the reported water-stress detector in crop field showing a working distance of about 0.75m without using any optics (FIG. 15). FIG. 14A shows the experimental result of the current flowing through the MP and reflectance of the leaf as a function of the RWC of the leaf (X-axis). The reflectance was characterized, using an IR power sensor, as the ratio of the power received by the sensor from the leaf to the power received by the sensor when the leaf is replaced by a 99% spectralon reflectance standard. The MP turned ON (square curve, FIG. 14A) only when the leaf reached the water stress level at which the soybean plant needs to be watered (RWC=65.8%).

At the bottom of FIG. 14A is shown the tested soybean leaf at different RWCs (100%, and 0%). The precision of the response was tested as shown at the bottom of FIG. 14B as the measured current through the MP in response to chopped IR radiation reflected off the leaf at RWC=65.8%. The MP latched ON after each detection (pull-in voltage effect). A 1V pulse (~100 ms) applied to the reset heater (~50 kΩ) returned the switch to an OFF state until triggered ON again by above-threshold IR. Even at threshold RWC conditions, precision was stable.

FIG. 15 shows the predicted power reaching the MP as a function of distance from a leaf as part of an analytical model. The developed analytical model assumes a leaf reflectance of 33.4% (RWC=65.8%). Solar irradiance in the targeted SWR band (28.3 W/m²) and a circular leaf region of 0.5 m radius are considered to simulate a realistic scenario. The model also incorporates atmospheric attenuation of SWR by water vapor. For an MP threshold of 209 nW, the device needs to be placed about 0.75m from the leaves to detect a water stress level of RWC=65.8%. Surprisingly, an MP with improved thermal sensitivity, latching and reset functions, and its integrated plasmonic absorber [5] tailored to selectively absorb SWR radiation centered at 1.47 μm (93% efficiency, 150 nm bandwidth) was demonstrated to verify the zero-power water-stress sensor concept.

Figure 27:
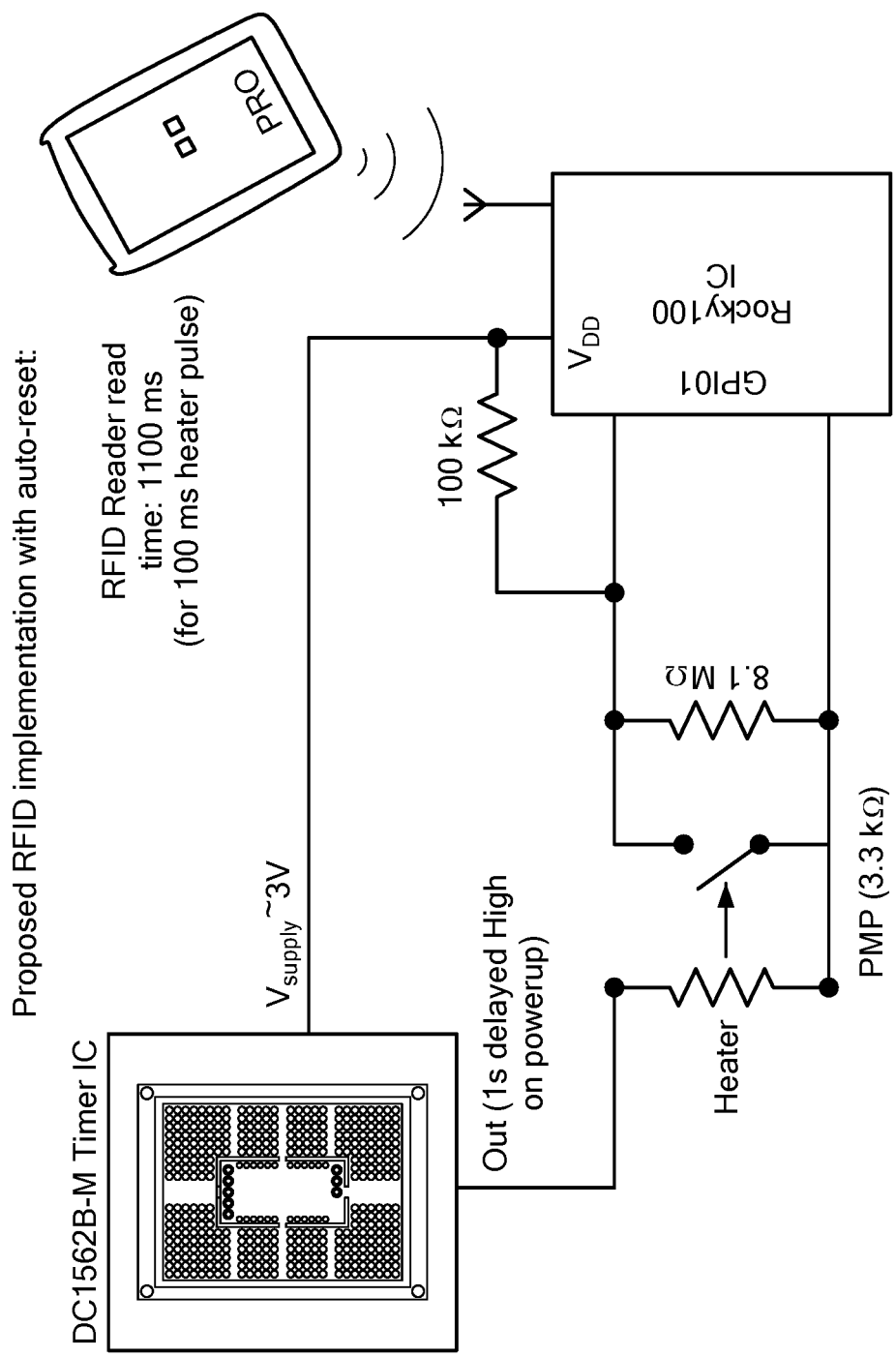
FIG. 27 shows an RFID implementation with an auto-reset provided by a heater in the reflector head position of the zero-power infrared sensor connected to a timer. An RFID tag connected to a latching sensor is used to passively record IR detection events between reads. The heater resets the sensor to open with a delayed pulse from the timer; about 2 ρJ is required to open the contacts (~1 V pulse for ~100 ms).

Example 5: RFID Tag and Reset Timer Connected to a Micromechanical Photoswitch with Latching Contacts The RFID reader shown at the upper right of FIG. 27 was connected to a micromechanical photoswitch (MP) comprising latching electrical contacts. The timer at the upper left of FIG. 27 was utilized to test RFID reading of latched electrical contacts, with a delayed pulse to the (unlatching) heater from the timer. In FIG. 27, the $V_{DD}$ indicates an RFID tag with a closed (activated) circuit; as $V_{DD}$ rises it indicates the RFID tag is activated. The MP had a reflector and an electrical heater at the head two position. The electrical contacts were closed by turning on an IR source incident to the MP. The heater on the reflector head was used to reset the MP to the open position.

FIG. 16 illustrates the results of the experiment. At the top of FIG. 16, numbers (1), (2), (3), and (4) indicate time points for discussion, while time in seconds is shown on the X-axis. At time (1) the IR was OFF, the RFID reader was ON, and the micromechanical photoswitch was open; at time (2) the IR was ON, the RFID reader was OFF, and voltage dropped and remained at ~50 μV as the photoswitch (3.3 kΩ) became latched indefinitely (until reset using the heater) and in parallel to 8.1 MΩ; at time (3) IR OFF, RFID reader was ON, the $V_{DD}$ was activated and $V_M$ rose (FIG. 17) but was within the voltage range interpreted as input ON (i.e., close to 0V); the heater reset the photoswitch to open at the end of the read; at time (4) IR OFF, reader ON—the MP was open. The RFID tag connected to a latching MP was successfully tested as a way to passively record IR detection events between reads. At the center plot of FIG. 17, the measured heater voltage $V_{DEL}$: appeared as approximately 0.2 s pulses since $V_{DEL}$ was asserted only 1 s after power-up and the timer was powered only until the end of the read duration (1.2 s). The heater on the reflector head was used to reset the MP to open with a delayed pulse from the timer shown at the upper left of FIG. 17. The delayed pulse included about 2 μJ, which was required to open the contacts (~1V pulse for ~100 ms). At the bottom of FIG. 17 is a screen shot of the screenshot of the RFID reader software on a laptop showing the GPIO port data. The GPIO pin register when open is 001F (11111), and with one input switch closed the register is 001E (11110). A sourcemeter with $I_{source}$=10 nA was used to measure Vx when the reader was not present (on). The GPIO port is illustrated in FIG. 18. The experiment demonstrated that the latching electrical contacts can be unlatched through use of a delayed pulse after passive reading. The results also indicate that RFID reading can be delayed utilizing latching contacts, and the contacts can be reset after a time delay.

FIG. 18 illustrates the general-purpose input/output (GPIO) connections utilized to test the configuration shown in FIG. 27. In FIG. 18, the MP is shown connected to one of the 5 GPIO ports of the microchip. A sourcemeter was set to source 10 nA across the port while measuring voltage $V_M$. This, in parallel with the 8.1 MΩ resistor, helps in observing the MP status change when the RFID tag is unpowered. The 100 kΩ acts as a pull-up and current-limiting resistor for the MP. Thus, the GPIO port had a value 001F (11111) for MP open and 001E (11110) for closed. The timer-circuit shared the same supply and when turned ON, sent up to a 3V pulse to the heater after up to a 1 s delay to automatically reset the MP.

Figure 32:
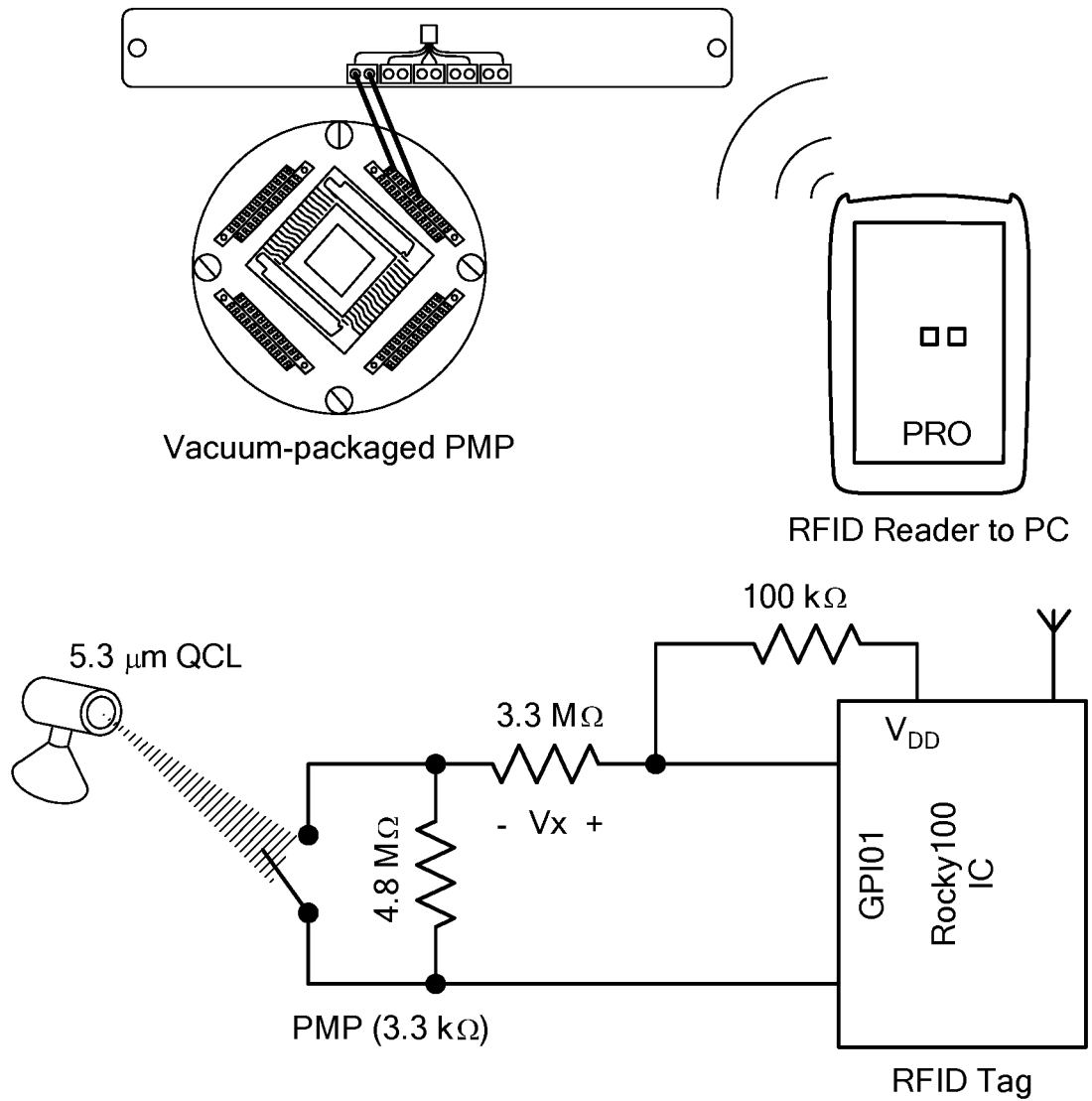
FIG. 32 shows a schematic illustration of an embodiment of an IR-triggered RFID system. The system includes one or more zero-power infrared switches (vacuum packaged PMP) connected through an auxiliary circuit to an RFID tag. The resistances in the auxiliary circuit are chosen to reduce the voltage levels across the PMP (to prevent pull-in) while preventing excess current through the PMP. An infrared light source can be used to test the system.

Example 6: Digitized Reading of Micromechanical Photoswitch Utilizing RFID Tag and GPIO As shown at the top of FIG. 32, a vacuum-packaged plasmonically-enhanced micromechanical photoswitch (PMP) was utilized to test reading of the closed/open electrical contacts utilizing an RFID tag and digitization. A quantum cascade laser (QCL) at about 5.3 microns (left, FIG. 32) was utilized to close the electrical contacts of the PMP. The RFID reader is shown at the top right of FIG. 32, and a schematic of the RFID tag, in circuit connection to the electrical contacts of the PMP is shown at the bottom of FIG. 32. Testing results of the system shown in FIG. 32 are illustrated in FIG. 33.

Figure 33:
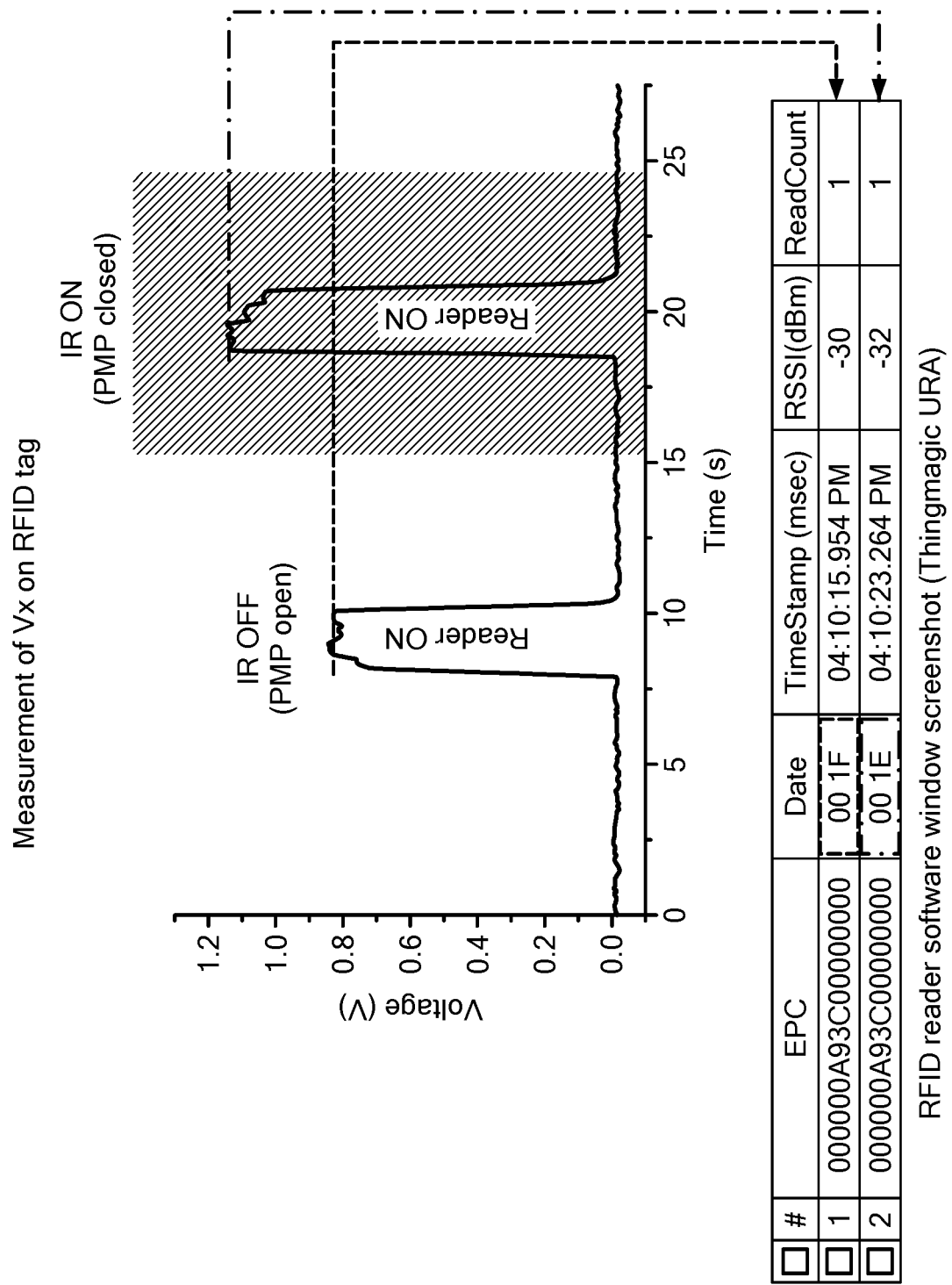
FIG. 33 shows a test of the RFID system depicted in FIG. 32.

In FIG. 33, voltage Vx across a 3.3 MOhm resistor was measured when the reader interrogated the RFID Tag. Vx varied with the state of the PMP: when it was OPEN (when IR from QCL is OFF), most of the voltage was dropped across the 4.8 Mohm resistor and Vx was small; when the PMP was closed (i.e., when IR from QCL was ON), since $R_{PMP}$<<4.8 MOhm resistor, most of the voltage dropped across the 3.3 MOhm resistor and Vx was larger. The Vx measurement demonstrates that there is a difference in the voltage across the terminal general-purpose input/output 1 (GPIO1) with and without exposure of the PMP to IR. This voltage across GPIO1 sets one bit on the IC's 5 bit GPIO register (5 bits for 5 such available GPIO terminals). When the voltage across GPIO1 is large (when PMP is OPEN), the GPIO register value is 001F (binary: 11111). When the voltage across GPIO1 is smaller (when PMP is CLOSED) the GPIO register value changes to 001E (binary: 11110). This is reflected in the GUI window of the software used to control the RFID reader and display the returned data: Initially with the IR OFF, the Data column reads 001F; about 8s later, when PMP is exposed to IR, the Data column reads 001E, thus demonstrating the function of the PMP interfaced with RFID Tag for batteryless RFID based sensor networks.

Example 7: Experimental Design and Measurements of Absorbers

Figure 35:
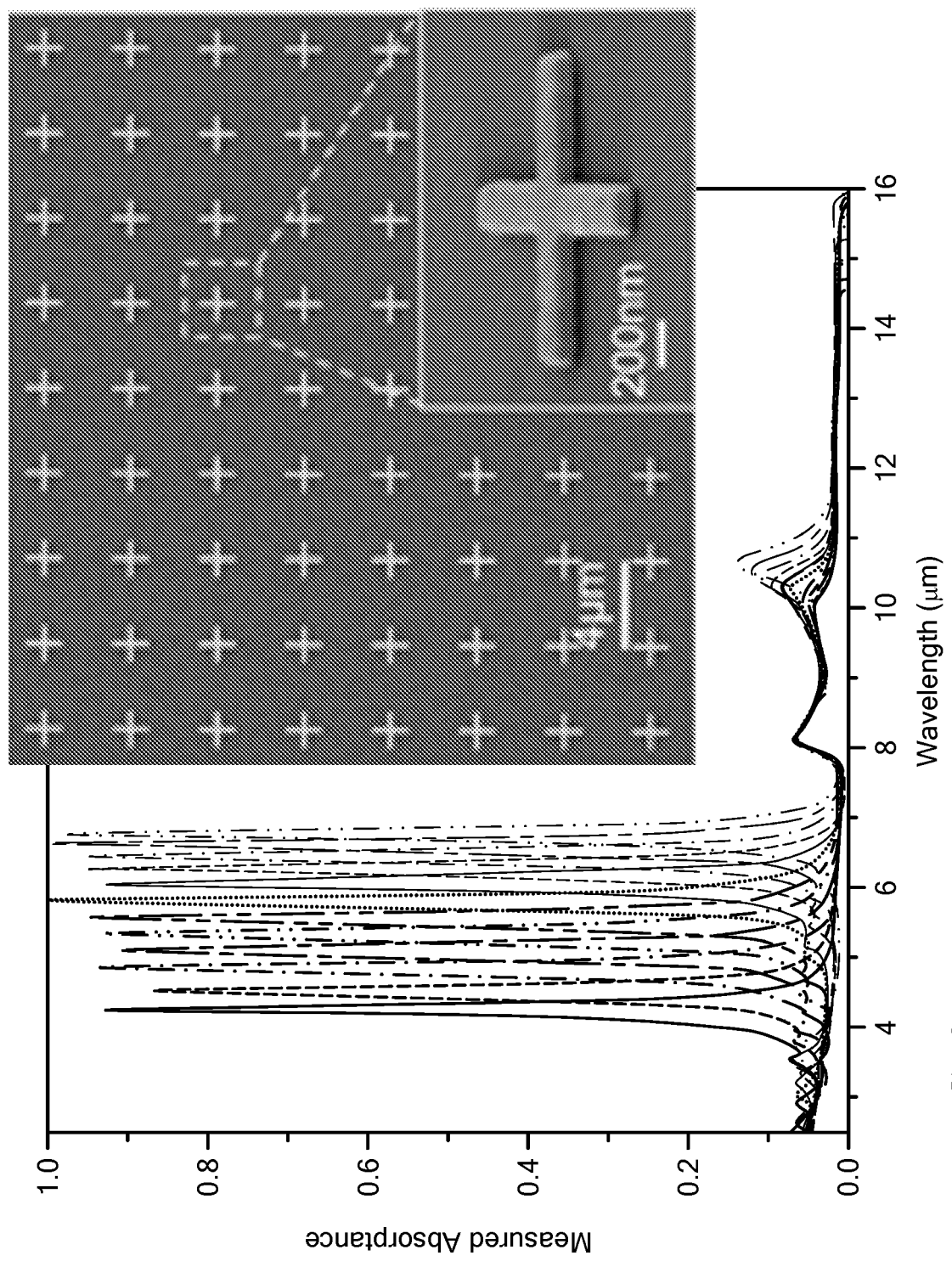
FIG. 35 shows specific IR absorption spectra for different plasmonic heads which can be employed in zero power IR sensors of the present technology.
Figure 36:
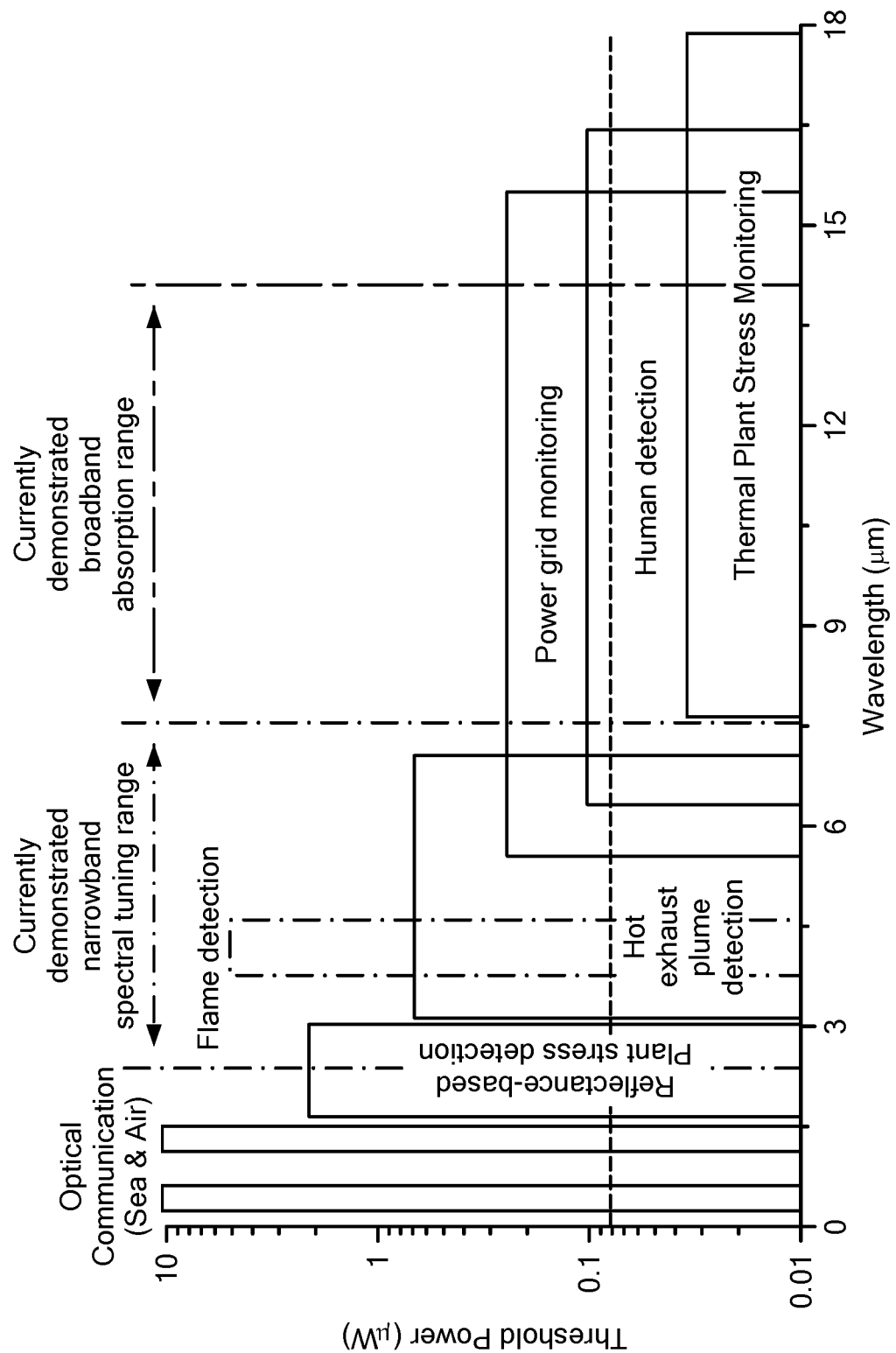
FIG. 36 illustrates certain IR wavelengths and their uses in conjunction with zero power IR sensors.

Several MWR plasmonic absorbers were fabricated to target wavelengths from about 4 microns to 7 microns. The measured absorbance of the absorbers is shown in FIG. 35. In FIG. 35, measured absorbance is plotted versus wavelength for 12 different plasmonic absorbers. For broadband LWIR absorbance, a $SiO_2$ based IR absorber with a Pt reflective backing was fabricated. FIG. 35 shows, in the top plot, absorbance of the broadband LWIR absorber versus wavelength in microns. The absorbance of the LWIR absorber shows a maximum absorbance between about 8-11 microns with broadband absorbance spanning up to about 15 microns, indicative of broadband LWIR performance.

Example 8: Hardware Logic and On-Board Logic for Reducing False Alarm Rate

Plasmonic tuning of absorbance head 1 was utilized to design $CO_2$ emission absorbance at about 4.25 μm to 4.5 μm. The emission of $CO_2$ is illustrated in FIG. 34A. The emission of $NO_2$ is about 2.75-3.5 μm (FIG. 34A). As illustrated in FIG. 34B, the plasmonic $CO_2$ absorber was placed as an IR absorber on the head 1 of a SWIR micromechanical photoswitch (MP) such that a bending down of the biomaterial beams would cause the first contact to make contact with the second contact (FIG. 34B, center). A $NO_2$ absorber was placed on head 2 of the SWR. In FIG. 34A, the combined emissions of $CO_2$ and $NO_2$ are indicative of exhaust from combustion. Engines that burn gasoline or diesel fuels can emit specific compounds in their exhaust gases. Among these compounds are $CO_2$, CO, $H_2O$, various oxides of nitrogen and sulfur (NOx and SOx, respectively), and hydrocarbons such as methane. As a result, the infrared emission spectra of the heated tailpipe gases coming out of vehicles such as trucks, cars or aircraft can by themselves act as a signature specific to a vehicle type. By tuning absorption as illustrated in FIG. 34A and FIG. 34B, the MPs can be utilized to detect specific types of vehicles with high sensitivity. In this example, both heads were designed to bend down when the device is illuminated by $CO_2$ and $NO_2$ IR radiation. By placing a $NO_2$ absorber on head 2, the response to presence of both $NO_2$ and $CO_2$ resulted in the electrical contacts being open, as is illustrated at the bottom of FIG. 34B. The logic of the device is illustrated by the schematic at the top of FIG. 34A. The device can be utilized to prevent false alarms due to exhaust.

Figure 28:
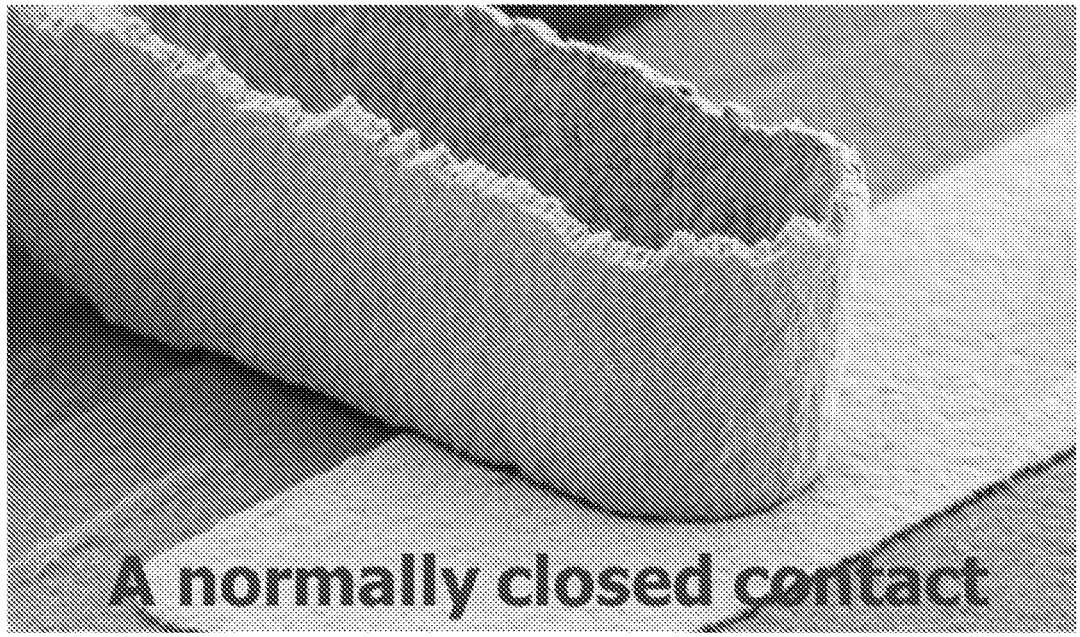
FIG. 28 illustrates a normally closed contact (switch) in a ZIR sensor.
Figure 29:
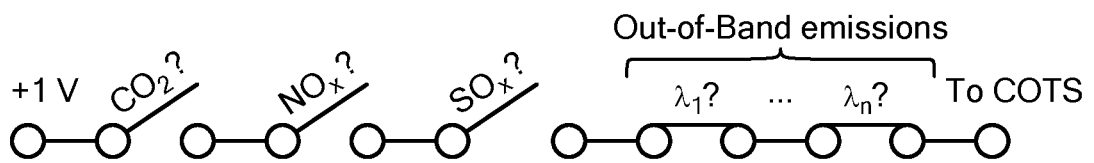
FIG. 29 shows a schematic representation of a device containing two or more normally closed switches in a series circuit used to detect one or more out of range parameters (COTS=a commercial off the shelf device).
Figure 30:
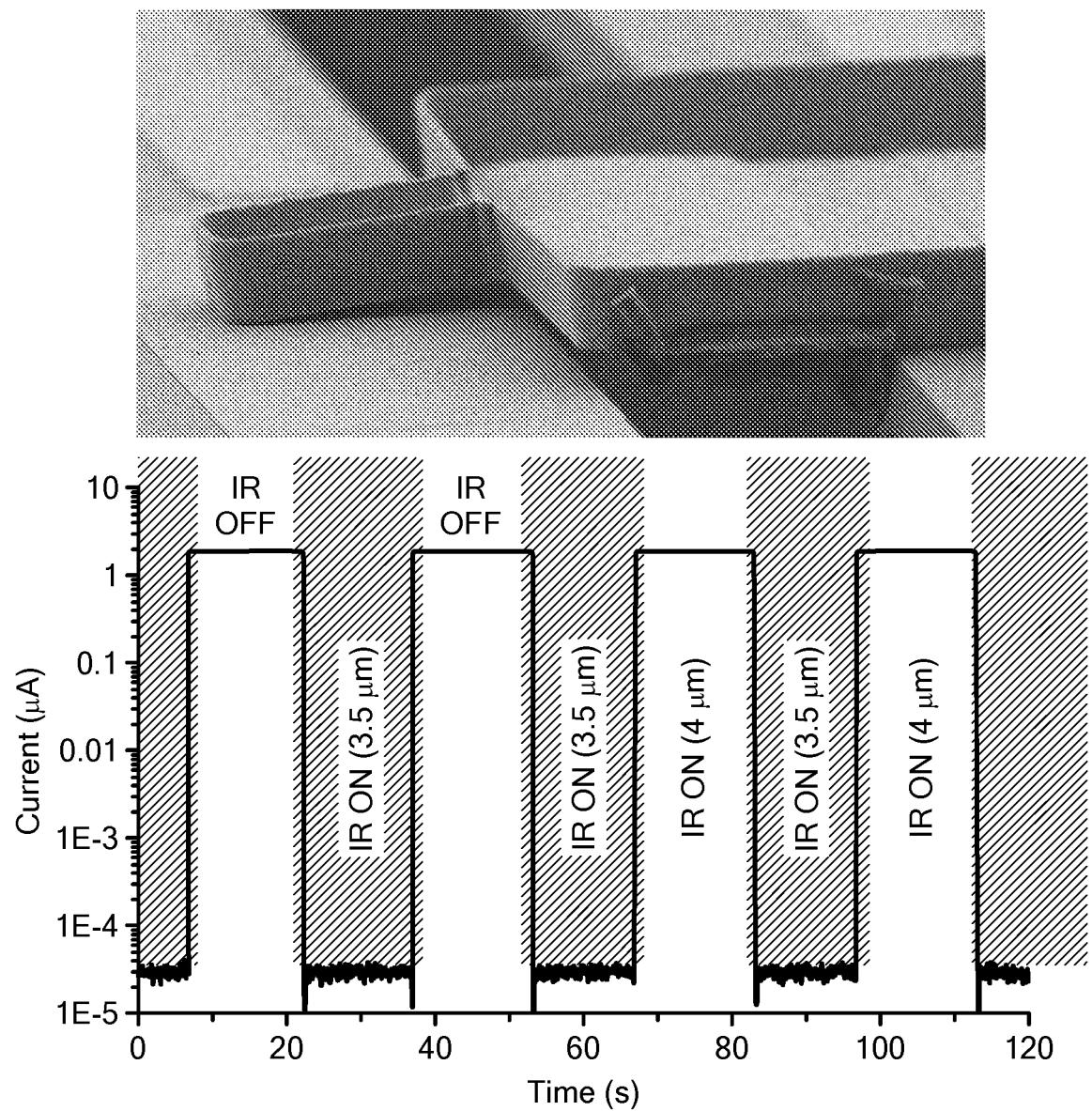
FIG. 30 shows at the top portion a stressed Pt metal contact that is designed to curve down after release from the initial closed position after fabrication for a normally closed device. The Pt metal contact can be made by a post-fabrication thermal actuation just beyond its plastic limit which restores the tip to a lower point. The normally closed devices prevent alteration of an in-band threshold, and allow out-of-band wavelength detection for better false-alarm rate. At bottom of FIG. 30, current is shown versus time when IR at 3.5 µm and 4 µm are alternated, demonstrating the specificity of the device for a targeted wavelength.

A normally-closed switch was designed by providing an ultra-thin sacrificial layer between the upper ($1^{st}$) electrical contact and the lower ($2^{nd}$) electrical contact, and the normally-closed switch is shown in FIG. 28. The sacrificial layer is shown as under the first (upper) electrical contact in FIG. 28. The normally-closed switches can be designed to stay normally closed after initial contact and release, due to bending caused by residual stress. An example of a false-alarm circuit comprising normally-closed switches is shown in FIG. 29. A normally closed switch, after the first electrical contact was bent downwards is shown in the SEM image at top of FIG. 30. At the bottom of FIG. 30, the normally closed switch was demonstrated by current measurements exceeding 1 pA when the IR is off and current several of orders of magnitude lower (off) when the IR is on. The current measurements at the bottom of FIG. 30 demonstrate rejection of IR at 3.5 microns with a threshold of about 1.2 microwatts. It was determined that for absorber-absorber devices, in-band radiation causes increases in the threshold for rejecting out of band IR radiation. By utilizing the normally-closed (NC) device demonstrated in FIG. 30, rejection of out-of-band radiation could be kept at very low thresholds and impact on in-band thresholds would be prevented. By utilizing NC devices, more out-of-band wavelengths could be added for better false-alarm rates (schematic, FIG. 34A).

Example 9: Zero Battery IR Sensor Tags

Figure 31:
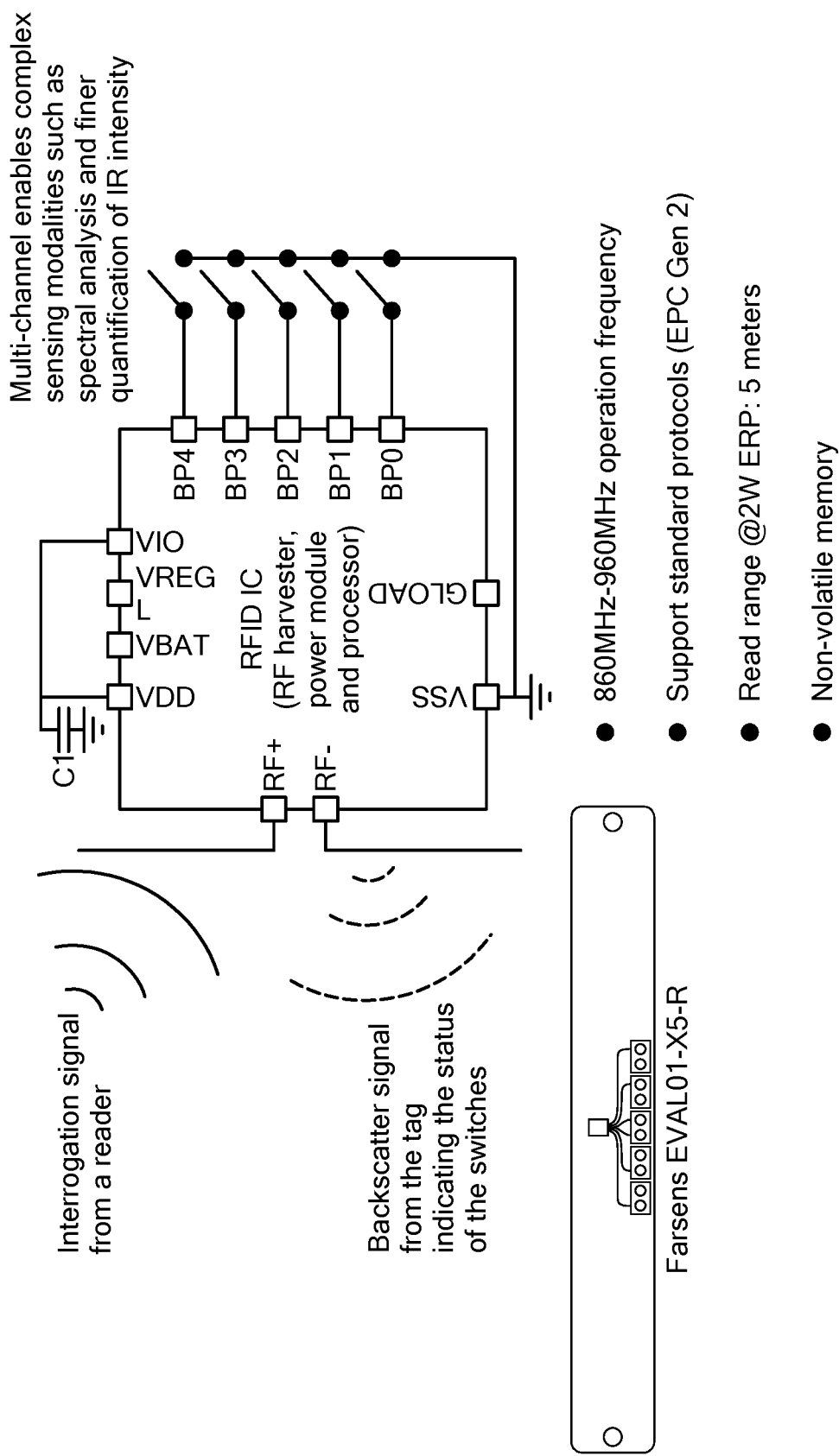
FIG. 31 shows an RFID system using zero power IR sensors of the present technology. The system contains a commercial off the shelf RFID circuit attached to zero power IR sensors using different sensing modalities. The zero power and abrupt switching properties enable seamless integration with off the shelf RFID tags.

An RFID tag was configured in the schematic shown in FIG. 31. The RFID tag was commercial off the shelf (COTS) equipment. The five switches to the right of FIG. 31, all shown in the open position, indicate 5 contacts acceptable for the micromechanical photoswitch (MP) circuits. The RFID tag was the Farsens™ EVAL01-X5R, which is a UHF RFID battery-free contact detection tag with a switch monitor that allows for determining the status of up to 5 associated circuits. The tag is compatible with EPC C1G2 RFID commercial readers. The multi-channel capability, enabled by incorporating numerous MPs, each with different sensing modalities, was shown to be fully compatible with off-the-shelf equipment.

Example 10: Latching MPs for Battery-Less RFID Sensor Tags

Figure 26:
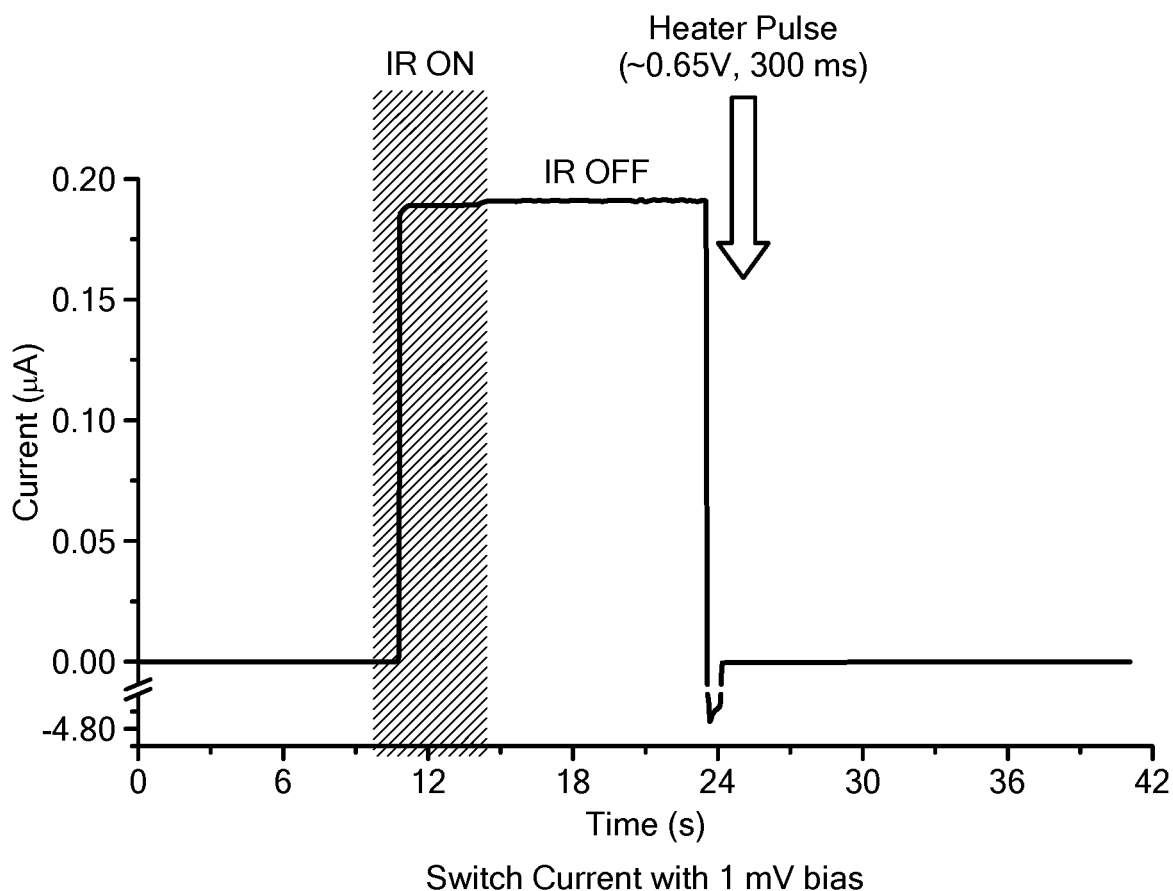
FIG. 26 shows a plot of current versus time for a latching PMP test utilizing a manual heater reset of latching electrical contacts in a latching plasmonically-enhanced micromechanical photoswitch.

RFID-based sensor tags with memory require a battery to actively power the sensor and to actively power a microchip in a tag, to save detection events in a memory. To enable battery-free memory function, sticky electrical contacts (i.e. latching electrical contacts) were designed to ensure IR exposures (in the targeted bandwidths) were captured between any RFID read events. FIG. 6B illustrates at top a pair of latched electrical contacts, then a heater actuates a biomaterial beam downwards, unlatching the pair of electrical contacts (see bottom, FIG. 6B). The functioning of an electrical heater on the head of a micromechanical photoswitch (MP) was tested utilizing a manual heater. FIG. 26 shows a plot of current versus time. An IR signal was turned on, closing (and latching) the electrical contacts of the MP at about 11 seconds. The current remained on after the IR signal was turned off, indicating the latching of the electrical contacts. Application of an electrical pulse of about 0.65V, for about 300 milliseconds, resulted in release of the latched electrical contacts at about 24 seconds (FIG. 26). The electrical contacts remained in the "open contact" position after the unlatching utilizing the electrical heater/pulse.

As used herein, the term "about" includes values close to the stated value as understood by one of ordinary skill. For example, the term "about" can refer to values within 10%, 5%, or 1%, of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expressions "consisting essentially of" or "consisting of".

REFERENCES

1. How to Feed the World in 2050: www.fao.org/fileadmin/templates/wsfs/docs/expert_paper/How_to_Feed_the_World_in_2050.pdf
2. APRA-E TERRA program, arpa-e.energy.gov/?q=arpa-e-programs/terra
3. Samuel O. Ihuoma, Chandra A. Madramootoo, "Recent advances in crop water stress detection", *Computers and Electronics in Agriculture*, Volume 141, 2017, Pages 267-275.
4. Is There an AgTech Bubble? fortune.com/2016/07/25/agriculture-farming-tech-startup-bubble/Ullah, 5. Saleem, et al. "Retrieval of leaf water content spanning the visible to thermal infrared spectra." *ISPRS journal of photogrammetry and remote sensing* 93 (2014): 56-64.
6. William J. Ripple, "Spectral Reflectance Relationships to Leaf Water Stress", *Photogrammetric Engineering and Remote Sensing*, Vol. 52, No. 10, October 1986, pp. 1669-1675.
7. C. Lin, et al. "A novel reflectance-based model for evaluating chlorophyll concentrations of fresh and water-stressed leaves" *Biogeosciences* 12.1 (2015): 49.
8. Cao, Zhenxing, Quan Wang, and Chaolei Zheng. "Best hyperspectral indices for tracing leaf water status as determined from leaf dehydration experiments." *Ecological indicators* 54 (2015): 96-107
9. J. A. J. Berni, P. J. Zarco-Tejada, L. Suarez and E. Fereres, "Thermal and Narrowband Multispectral Remote Sensing for Vegetation Monitoring From an Unmanned Aerial Vehicle," in *IEEE Transactions on Geoscience and Remote Sensing*, vol. 47, no. 3, pp. 722-738, March 2009.
10. J. Costa, et al. "Thermography to explore plant—environment interactions", *Journal of experimental botany* 64. 13 (2013): 3937-3949.
11. Z. Qian, S. Kang, V. Rajaram, C. Cassella, N. E. McGruer, and M. Rinaldi, "Zero-power infrared digitizers based on plasmonically enhanced micromechanical photoswitches", *Nature Nanotechnology* 12, 969-973, 2017.
12. V. Rajaram, Z. Qian, S. Kang, S. D. Calisgan, N. E. McGruer, and M. Rinaldi, "Zero-Power Electrically Tunable Micromechanical Photoswitches", IEEE Sensors Journal, 2018, DOI: 1109/JSEN.2018.2850898.
13. S. Kang, S. Calisgan, Z. Qian, V. Rajaram, N. McGruer and M. Rinaldi, "Broadband Long-Wavelength Infrared Micromechanical Photoswitch for Zero-Power Human Detection", *Hilton Head Workshop 2018: A Solid-State Sensors, Actuators and Microsystems Workshop, Hilton Head Island*, Jun. 3-7, 2018, in press.
14. V. Rajaram, Z. Qian, S. Kang, and M. Rinaldi, "MEMS-Based Near-Zero Power Infrared Wireless Sensor Node", *Proceedings of the 31st IEEE International Conference on Micro Electro Mechanical Systems (MEMS 2018)*, Belfast, UK, 21-25 Jan. 2018, pp. 17-20.
15. V. Rajaram, Z. Qian, S. Kang, S. Calisgan, N. McGruer and M. Rinaldi, "A False Alarm-Free Zero-Power Micromechanical Photoswitch", submitted to *IEEE Sensors* 2018.
16. S. Kang, Z. Qian, V. Rajaram, A. Alu, and M. Rinaldi, "Ultra Narrowband Infrared Absorbers for Omni-Directional and Polarization Insensitive Multi-Sepctral Sensing Microsystems", *Proceedings of the 19th International Conference on Solid-State Sensors, Actuators and Microsystems (Transducers 2017)*, Kaohsiung, Taiwan, Jun. 18-22, 2017, pp. 886-889.
17. Kim, Jagyeong, Kiwook Han, and Jae W. Hahn. "Selective dual-band metamaterial perfect absorber for infrared stealth technology." *Scientific reports* 7.1 (2017): 6740.
18. Ding, Fei, et al. "Broadband near-infrared metamaterial absorbers utilizing highly lossy metals." *Scientific reports* 6 (2016): 39445.
19. Chen, Yiting, et al. "Metal-insulator-metal plasmonic absorbers: influence of lattice." *Optics Express* 22.25 (2014): 30807-30814.
20. AM1GH solar spectral radiance data, coolcolors.lbl.gov/irradiance/21.
21. Bayat, Bagher, Christiaan van der Tol, and Wouter Verhoef. "Remote sensing of grass response to drought stress using spectroscopic techniques and canopy reflectance model inversion." *Remote sensing* 8.7 (2016): 557.
22. Baeg, K. J., Binda, M., Natali, D., Caironi, M. & Noh, Y. Y. Organic light detectors: photodiodes and phototransistors. *Advanced materials* 25, 4267-4295 (2013).
23. Noh, Y.-Y. et al. High-photosensitivity p-channel organic phototransistors based on a biphenyl end-capped fused bithiophene oligomer. *Applied Physics Letters* 86, 043501 (2005).
24. Shankar, M., Burchett, J. B., Hao, Q., Guenther, B. D. & Brady, D. J. Human-tracking systems using pyroelectric infrared detectors. Optical Engineering 45, 106401-106401-106410 (2006).
25. Texas Instruments. Low-Power PIR Motion Detector With Sub-1 GHz Wireless Connectivity Enabling 10-Year Coin Cell Battery Life, <http://www.ti.com/lit/ug/tiduau1b/tiduau1b.pdf> (2016).
26. Changhong Chen, Xinjian Yi, Xingrong Zhao & Xiong, B. Characterization of VO2 based uncooled microbolometer linear array. Sensors and Actuators A 90, 212-214 (2001).
27. Rogalski, A. HgCdTe infrared detector material: history, status and outlook. Reports on Progress in Physics 68, 2267 (2005).
28. Robert, P. et al. Low power consumption infrared thermal sensor array for smart detection and thermal imaging applications. Proceedings IRS$^2$ 2013, 24-27 (2013).
29. Zavracky, P. M., Majumder, S. & McGruer, N. E. Micromechanical switches fabricated using nickel surface micromachining. Journal of Microelectromechanical Systems 6, 3-9 (1997).
30. Loh, O. Y. & Espinosa, H. D. Nanoelectromechanical contact switches. Nature nanotechnology 7, 283-295 (2012).
31. Feng, X., Matheny, M., Zorman, C. A., Mehregany, M. & Roukes, M. Low voltage nanoelectromechanical switches based on silicon carbide nanowires. Nano letters 10, 2891-2896 (2010).
32. Lee, J. O. et al. A sub-1-volt nanoelectromechanical switching device. Nat Nano 8, 36-40 (2013).
33. Zaghloul, U. & Piazza, G. Sub-1-volt piezoelectric nanoelectromechanical relays with millivolt switching capability. IEEE Electron Device Letters 35, 669-671 (2014).
34. Shavezipur, M. et al. Partitioning electrostatic and mechanical domains in nanoelectromechanical relays. Journal of Microelectromechanical Systems 24, 592-598 (2015).
35. Becker, W., et al. "Black gold deposits as absorbers for far infrared radiation." *Physica status solidi* (b) 194.1 (1996): 241-255.
36. Sui, Yu, et al. "A thin-film infrared absorber using CNT/nanodiamond nanocomposite." *MRS Online Proceedings Library Archive* 1452 (2012).
37. Goldsmith, C., et al. "Lifetime characterization of capacitive RF MEMS switches." *Microwave Symposium Digest*, 2001 IEEE MTT-S International. Vol. 1. IEEE,
38. Mulloni, Viviana, M. Barbato, and G. Meneghesso. "Long-term lifetime prediction for RF-MEMS switches." *Journal of Micromechanics and Microengineering* 26.7 (2016): 074004.

The invention claimed is:

1. A device for monitoring moisture content of a plant, the device comprising:
 (i) one or more zero power infrared (IR) sensors, each sensor comprising a first plasmonic absorber tuned to a selected wavelength range of IR radiation and comprising a switch actuatable using only energy of IR radiation absorbed by the plasmonic absorber; wherein the one or more zero power IR sensors are disposed within a circuit in series or in parallel, and wherein the circuit is interruptable by the switch of each sensor;

(ii) a transmitter disposed within the circuit and activatable by a selected configuration of said switches; and (iii) optionally a battery disposed within the circuit, the battery capable of powering the transmitter;

wherein absorption by the one or more sensors of selected wavelengths of IR radiation originating from a plant, characteristic of a selected moisture content of the plant, causes the transmitter to transmit an electromagnetic radiation signal.

2. The device of claim 1, wherein the device comprises four or more of said zero power IR sensors, each comprising a plasmonic absorber tuned to a different selected wavelength range of IR radiation, wherein the switch of each of the four or more sensors is set to a different selected activation power, and wherein the device functions as an IR analyzer with at least 4 bit resolution.

3. The device of claim 2, wherein the radio transmission from the device is activated when said IR radiation originating from a plant satisfies selected IR spectral criteria characteristic of low plant moisture content.

4. The device of claim 1, wherein the SWR radiation is centered at about 1.47 microns with a bandwidth of about 150 nm.

5. The device of claim 1, wherein at least one sensor of the device comprises a second plasmonic absorber tuned to a different IR wavelength range than the first plasmonic absorber, and relative absorption of IR radiation by the first and second plasmonic absorbers determines an open/closed state of the sensor switch.

6. The device of claim 1, wherein one or more of the sensors comprises a heater operative to reset the sensor switch.

7. The device of claim 1, wherein the sensors absorb IR radiation reflected from leaves of a plant within 5 meters from the device.

8. The device of claim 1, wherein the device is capable of transmitting a signal when a plant having a relative water content at or below a selected value in the range from 0% to about 70% is detected.

9. The device of claim 1, wherein a sensor of the device detects LWIR radiation as a measure of a temperature of a plant.

10. The device of claim 9, wherein the device transmits a signal in response to a temperature increase of the plant of about 5° C. or more.

11. The device of claim 1, wherein one or more of the sensors is insensitive to LWIR radiation.

12. The device of claim 1, wherein the sensors have an OFF-to-ON switch state transition with a conductance ratio $>10^{12}$.

13. The device of claim 1, further comprising a focusing lens for collecting said infrared radiation.

14. The device of claim 1, wherein the one or more sensors comprise switches that are always open or always closed in the absence of said selected range of IR radiation.

15. The device of claim 1, wherein the transmitter is an RFID tag activatable by an altered switch status of a sensor of the device.

16. The device of claim 15, wherein the device does not comprise a battery.

17. The device of claim 1, wherein the transmitter is a radio transmitter and the device comprises said battery.

18. The device of claim 1, further comprising a zero power sensor activatable by a plant-derived volatile organic compound.

19. The device of claim 1, wherein a sensor of the device comprises a switch having first and second contacts with an engineered adhesion force or latching force, such that the first contact and the second contact stably adhere after the contacts close, thereby providing a memory function wherein the sensor switch remains in the closed contact position after an incoming signal dissipates.

20. A system for monitoring plants, the system comprising:

(i) a plurality of devices of claim 1; and (ii) a receiver or RFID reader capable of monitoring transmissions from the plurality of devices.

21. A kit for monitoring plants, the kit comprising a plurality of devices of claim 1 and instructions for deploying and using the devices.

22. A method of monitoring plants in a field, the method comprising:

(a) deploying a plurality of devices of claim 1 in the field within a distance from the plants suitable for detecting a condition of the plants using the devices; and (b) periodically monitoring the devices.

* * * * *